(12) United States Patent
Rausch et al.

(10) Patent No.: US 11,809,460 B1
(45) Date of Patent: Nov. 7, 2023

(54) SYSTEMS, METHODS, AND GRAPHICAL USER INTERFACES FOR TAXONOMY-BASED CLASSIFICATION OF UNLABELED STRUCTURED DATASETS

(71) Applicant: SAS INSTITUTE INC., Cary, NC (US)

(72) Inventors: Nancy Anne Rausch, Apex, NC (US); Ruth Oluwadamilola Akintunde, Raleigh, NC (US); Brant Nathan Kay, Pittsboro, NC (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 18/221,695

(22) Filed: Jul. 13, 2023

Related U.S. Application Data

(60) Provisional application No. 63/398,827, filed on Aug. 17, 2022, provisional application No. 63/391,772, filed on Jul. 24, 2022.

(51) Int. Cl.
*G06F 16/28* (2019.01)

(52) U.S. Cl.
CPC ................. *G06F 16/287* (2019.01)

(58) Field of Classification Search
CPC .................................................. G06F 16/287
See application file for complete search history.

(56) References Cited

U.S. PATENT DOCUMENTS

2002/0198873 A1* 12/2002 Chu-Carroll .............. G06F 8/36
2023/0004723 A1* 1/2023 Ekmekci ............... G06F 40/284

OTHER PUBLICATIONS

Ramirez et al., "Natural Language Inference over Tables: Enabling Explainable Data Exploration on Data Lakes," The Semantic Web, vol. 12731, May 2021, pp. 304-320.

* cited by examiner

*Primary Examiner* — Cam Y T Truong
(74) *Attorney, Agent, or Firm* — Padowithz Alce; Quintin Scheitlin; Chandler Scheitlin

(57) ABSTRACT

A computer-implemented system includes identifying a target hierarchical taxonomy comprising a plurality of distinct hierarchical taxonomy categories; extracting a plurality of distinct taxonomy tokens from the plurality of distinct hierarchical taxonomy categories; computing a taxonomy vector corpus based on the plurality of distinct taxonomy tokens; computing a plurality of distinct taxonomy clusters based on an input of the taxonomy vector corpus; constructing a hierarchical taxonomy classifier based on the plurality of distinct taxonomy clusters; converting a volume of unlabeled structured datasets to a plurality of distinct corpora of taxonomy-labeled structured datasets based on the hierarchical taxonomy classifier; and outputting at least one corpus of taxonomy-labeled structured datasets of the plurality of distinct corpora of taxonomy-labeled structured datasets based on an input of a data classification query.

27 Claims, 34 Drawing Sheets

SYSTEMS, METHODS, AND GRAPHICAL USER INTERFACES FOR TAXONOMY-BASED CLASSIFICATION OF UNLABELED STRUCTURED DATASETS

CROSS-REFERENCE TO RELATED APPLICATIONS

This application claims the benefit of U.S. Provisional Application No. 63/391,772, filed on 24 Jul. 2022, and U.S. Provisional Application No. 63/398,827, filed on 17 Aug. 2022, which are incorporated in their entireties by this reference.

TECHNICAL FIELD

This invention relates generally to the data management field, and more specifically, to new and useful systems and methods for classifying and labeling unlabeled structured datasets according to a taxonomy.

BACKGROUND

The amount of data an organization collects has increased significantly in recent years. Typically, this data is stored in a large-scale data repository, such as a data lake, a data warehouse, or the like. These large-scale data repositories, over time, may grow exponentially in size as more and more data is stored within such data repositories (e.g., grow to store terabytes of data, petabytes of data, or the like). However, this surge in size has made locating useful or relevant data within a respective data repository more difficult as data stored within these data repositories are often unlabeled or unclassified.

Accordingly, to efficiently locate useful or relevant data within a respective data repository, it would be advantageous to have systems and methods for automatically classifying unlabeled structured datasets. The embodiments of the present application provide technical solutions that address, at least, the needs described above, as well as the deficiencies of the start of the art.

BRIEF SUMMARY OF THE INVENTION(S)

In some embodiments, a computer-program product embodied in a non-transitory machine-readable storage medium stores computer instructions that, when executed by one or more processors, perform operations comprising: identifying, from a memory, a target hierarchical taxonomy including a plurality of distinct hierarchical taxonomy categories; extracting, by the one or more processors, a plurality of distinct taxonomy tokens from the plurality of distinct hierarchical taxonomy categories; computing, by a token vectorization model, a taxonomy vector corpus based on the plurality of distinct taxonomy tokens, the taxonomy vector corpus including a distinct taxonomy embedding for each distinct taxonomy token of the plurality of distinct hierarchical taxonomy tokens; computing, by a machine learning model, a plurality of distinct taxonomy clusters based on an input of the taxonomy vector corpus; constructing a hierarchical taxonomy classifier based on the plurality of distinct taxonomy clusters, wherein the hierarchical taxonomy classifier is configured to classify unlabeled structured datasets to one of the plurality of distinct hierarchical taxonomy categories; converting a volume of unlabeled structured datasets to a plurality of distinct corpora of taxonomy-labeled structured datasets based on the hierarchical taxonomy classifier; and outputting, via a graphical user interface, at least one corpus of taxonomy-labeled structured datasets of the plurality of distinct corpora of taxonomy-labeled structured datasets based on an input of a data classification query.

In some embodiments, the machine learning model includes an unsupervised machine learning model implementing a k-means clustering algorithm. In some embodiments, the computer-program product further includes computer instructions for performing operations including identifying a total number of hypernyms within the plurality of distinct hierarchical taxonomy categories; and configuring the unsupervised machine learning model to compute a total number of taxonomy clusters equivalent to the total number of distinct hypernyms by setting a value of k of the k-means clustering algorithm to the total number of hypernyms.

In some embodiments, the machine learning model includes an unsupervised machine learning model implementing a k-means clustering algorithm. In some embodiments, the computer-program product further includes computer instructions for performing operations including identifying a total number of distinct hierarchical categories within the plurality of distinct hierarchical taxonomy categories, wherein a distinct hierarchical category includes a hypernym and one or more hyponyms; and configuring the unsupervised machine learning model to compute a total number of taxonomy clusters equivalent to the total number of distinct hierarchical taxonomy categories by setting a value of k of the k-means clustering algorithm to the total number of hierarchical taxonomy categories.

In some embodiments, identifying the target hierarchical taxonomy includes receiving, via a network, the target taxonomy from a remote source of taxonomy data storing a plurality of pre-determined taxonomies, and the target taxonomy relates to a taxonomy that is likely germane to structured datasets associated with a subscriber.

In some embodiments, extracting the plurality of distinct taxonomy tokens from the plurality of distinct hierarchical taxonomy categories includes tokenizing at least one word of each hypernym of a plurality of distinct hypernyms within the plurality of distinct hierarchical categories, and tokenizing at least one word of each hyponym of a plurality of distinct hyponyms within the plurality of distinct hierarchical categories.

In some embodiments, the token vectorization model includes a pre-trained word embeddings model that has been trained to produce embedding values within a n-dimensional space, and the embedding values produced by the token vectorization model are at least informed by vocabulary associated with the target taxonomy.

In some embodiments, each distinct taxonomy cluster of the plurality of distinct taxonomy clusters relates to a distinct taxonomy category and includes a plurality of taxonomy embedding values of hyponyms associated with the distinct taxonomy category.

In some embodiments, the computer-program product further includes computer instructions for performing operations including computing, by the one or more processors, a distinct centroid for each of the plurality of distinct taxonomy clusters. In some embodiments, the hierarchical taxonomy classifier converts the volume of unlabeled structured datasets to the plurality of distinct corpora of taxonomy-labeled structured datasets by mapping each unlabeled structured dataset of the volume to at least one of the plurality of taxonomy clusters of the hierarchical taxonomy classifier; and mapping each unlabeled structured dataset of the volume to the at least one of the plurality of hierarchical taxonomy clusters includes computing, by the token vectorization model, an embedding for a target unlabeled structured data set of the volume, calculating a plurality of distinct distance metrics based on a distance computation between the embedding of the target unlabeled structured data set and the distinct centroid for each of the plurality of distinct taxonomy clusters, identifying a distinct distance metric of the plurality of distinct distance metrics having a smallest distance value between the embedding of the target unlabeled structured data set and the distinct centroid of one distinct taxonomy cluster of the plurality of distinct taxonomy clusters, and associating the target unlabeled structured data set to the one distinct taxonomy cluster based on the identifying the distance metric.

In some embodiments, the hierarchical taxonomy classifier converts the volume of unlabeled structured datasets to the plurality of distinct corpora of taxonomy-labeled structured datasets by mapping each unlabeled structured dataset of the volume to at least of the plurality of taxonomy clusters of the hierarchical taxonomy classifier; and mapping each unlabeled structured dataset of the volume to the at least one of the plurality of hierarchical taxonomy clusters includes computing, by the token vectorization model, an embedding for a target unlabeled structured data set of the volume, calculating a plurality of distinct distance metrics based on a distance computation between the embedding of the target unlabeled structured data set and an embedding of a distinct hypernym associated with each of the plurality of distinct taxonomy clusters, identifying a distinct distance metric of the plurality of distinct distance metrics having a smallest distance value between the embedding of the target unlabeled structured data set and the distinct hypernym of one distinct taxonomy cluster of the plurality of distinct taxonomy clusters, and associating the target unlabeled structured data set to the distinct taxonomy cluster based on the identifying the distance metric.

In some embodiments, the hierarchical taxonomy classifier converts the volume of unlabeled structured datasets to the plurality of distinct corpora of taxonomy-labeled structured datasets by mapping each unlabeled structured dataset of the volume to at least of the plurality of taxonomy clusters of the hierarchical taxonomy classifier; and mapping each unlabeled structured dataset of the volume to the at least one of the plurality of taxonomy clusters includes computing, by the token vectorization model, an embedding for a target unlabeled structured data set of the volume, calculating a plurality of distinct distance metrics based on a distance computation between the embedding of the target unlabeled structured data set and embedding of distinct hyponyms associated with each of the plurality of distinct taxonomy clusters, identifying a distinct distance metric of the plurality of distinct distance metrics having a smallest distance value between the embedding of the target unlabeled structured data set and one distinct hyponym of one distinct taxonomy cluster of the plurality of distinct hierarchical taxonomy clusters, and associating the target unlabeled structured data set to the distinct taxonomy cluster based on the identifying the distance metric.

In some embodiments, a computer-implemented method includes identifying, from a memory, a target hierarchical taxonomy including a plurality of distinct hierarchical taxonomy categories; extracting, by one or more processors, a plurality of distinct taxonomy tokens from the plurality of distinct hierarchical taxonomy categories; computing, by a token vectorization model, a taxonomy vector corpus based on the plurality of distinct taxonomy tokens, the taxonomy vector corpus including a distinct taxonomy embedding for each distinct taxonomy token of the plurality of distinct hierarchical taxonomy tokens; computing, by a machine learning model, a plurality of distinct taxonomy clusters based on an input of the taxonomy vector corpus; constructing a hierarchical taxonomy classifier based on the plurality of distinct taxonomy clusters, wherein the hierarchical taxonomy classifier is configured to classify unlabeled structured datasets to one of the plurality of distinct hierarchical taxonomy categories; converting a volume of unlabeled structured datasets to a plurality of distinct corpora of taxonomy-labeled structured datasets based on the hierarchical taxonomy classifier; and outputting, via a graphical user interface, at least one corpus of taxonomy-labeled structured datasets of the plurality of distinct corpora of taxonomy-labeled structured datasets based on an input of a data classification query.

In some embodiments, the machine learning model includes an unsupervised machine learning model implementing a k-means clustering algorithm. In some embodiments, the computer-implemented method further includes identifying a total number of hypernyms within the plurality of distinct hierarchical taxonomy categories; and configuring the unsupervised machine learning model to compute a total number of taxonomy clusters equivalent to the total number of distinct hypernyms by setting a value of k of the k-means clustering algorithm to the total number of hypernyms.

In some embodiments, the machine learning model includes an unsupervised machine learning model implementing a k-means clustering algorithm. In some embodiments, the computer-implemented method further includes identifying a total number of distinct hierarchical categories within the plurality of distinct hierarchical taxonomy categories, wherein a distinct hierarchical category includes a hypernym and one or more hyponyms; and configuring the unsupervised machine learning model to compute a total number of taxonomy clusters equivalent to the total number of distinct hierarchical taxonomy categories by setting a value of k of the k-means clustering algorithm to the total number of hierarchical taxonomy categories.

In some embodiments, identifying the target hierarchical taxonomy includes receiving, via a network, the target taxonomy from a remote source of taxonomy data storing a plurality of pre-determined taxonomies, and the target taxonomy relates to a taxonomy that is likely germane to structured datasets associated with the subscriber.

In some embodiments, extracting the plurality of distinct taxonomy tokens from the plurality of distinct hierarchical taxonomy categories includes tokenizing at least one word of each hypernym of a plurality of distinct hypernyms within the plurality of distinct hierarchical categories, and tokenizing at least one word of each hyponym of a plurality of distinct hyponyms within the plurality of distinct hierarchical categories.

In some embodiments, the token vectorization model includes a pre-trained word embeddings model that has been trained to produce embedding values within a n-dimensional space, and the embedding values produced by the token vectorization model are at least informed by vocabulary associated with the target taxonomy.

In some embodiments, each distinct taxonomy cluster of the plurality of distinct taxonomy clusters relates to a distinct taxonomy category and includes a plurality of taxonomy embedding values of hyponyms associated with the distinct taxonomy category.

In some embodiments, the computer-implemented method further includes computing, by the one or more processors, a distinct centroid for each of the plurality of distinct taxonomy clusters. In some embodiments, the hierarchical taxonomy classifier converts the volume of unlabeled structured datasets to the plurality of distinct corpora of taxonomy-labeled structured datasets by mapping each unlabeled structured dataset of the volume to at least of the plurality of taxonomy clusters of the hierarchical taxonomy classifier; and mapping each unlabeled structured dataset of the volume to the at least one of the plurality of hierarchical taxonomy clusters includes computing, by the token vectorization model, an embedding for a target unlabeled structured data set of the volume, calculating a plurality of distinct distance metrics based on a distance computation between the embedding of the target unlabeled structured data set and the distinct centroid for each of the plurality of distinct taxonomy clusters, identifying a distinct distance metric of the plurality of distinct distance metrics having a smallest distance value between the embedding of the target unlabeled structured data set and the distinct centroid of one distinct taxonomy cluster of the plurality of distinct taxonomy clusters, and associating the target unlabeled structured data set to the one distinct taxonomy cluster based on the identifying the distance metric.

In some embodiments, the hierarchical taxonomy classifier converts the volume of unlabeled structured datasets to the plurality of distinct corpora of taxonomy-labeled structured datasets by mapping each unlabeled structured dataset of the volume to at least of the plurality of taxonomy clusters of the hierarchical taxonomy classifier; and mapping each unlabeled structured dataset of the volume to the at least one of the plurality of hierarchical taxonomy clusters includes computing, by the token vectorization model, an embedding for a target unlabeled structured data set of the volume, calculating a plurality of distinct distance metrics based on a distance computation between the embedding of the target unlabeled structured data set and an embedding of a distinct hypernym associated with each of the plurality of distinct taxonomy clusters, identifying a distinct distance metric of the plurality of distinct distance metrics having a smallest distance value between the embedding of the target unlabeled structured data set and the distinct hypernym of one distinct taxonomy cluster of the plurality of distinct taxonomy clusters, and associating the target unlabeled structured data set to the distinct taxonomy cluster based on the identifying the distance metric.

In some embodiments, the hierarchical taxonomy classifier converts the volume of unlabeled structured datasets to the plurality of distinct corpora of taxonomy-labeled structured datasets by mapping each unlabeled structured dataset of the volume to at least of the plurality of taxonomy clusters of the hierarchical taxonomy classifier; and mapping each unlabeled structured dataset of the volume to the at least one of the plurality of hierarchical taxonomy clusters includes computing, by the token vectorization model, an embedding for a target unlabeled structured data set of the volume, calculating a plurality of distinct distance metrics based on a distance computation between the embedding of the target unlabeled structured data set and embedding of distinct hyponyms associated with each of the plurality of distinct taxonomy clusters, identifying a distinct distance metric of the plurality of distinct distance metrics having a smallest distance value between the embedding of the target unlabeled structured data set and one distinct hyponym of one distinct taxonomy cluster of the plurality of distinct hierarchical taxonomy clusters, and associating the target unlabeled structured data set to the distinct taxonomy cluster based on the identifying the distance metric.

In some embodiments, a computer-implemented system includes one or more processors; a memory; a computer-readable medium operably coupled to the one or more processors, the computer-readable medium having computer-readable instructions stored thereon that, when executed by the one or more processors, cause the computing device to perform operations including identifying, from the memory, a target hierarchical taxonomy including a plurality of distinct hierarchical taxonomy categories; extracting, by the one or more processors, a plurality of distinct taxonomy tokens from the plurality of distinct hierarchical taxonomy categories; computing, by a token vectorization model, a taxonomy vector corpus based on the plurality of distinct taxonomy tokens, the taxonomy vector corpus including a distinct taxonomy embedding for each distinct taxonomy token of the plurality of distinct hierarchical taxonomy tokens; computing, by a machine learning model, a plurality of distinct taxonomy clusters based on an input of the taxonomy vector corpus; constructing a hierarchical taxonomy classifier based on the plurality of distinct taxonomy clusters, wherein the hierarchical taxonomy classifier is configured to classify unlabeled structured datasets to one of the plurality of distinct hierarchical taxonomy categories; converting a volume of unlabeled structured datasets to a plurality of distinct corpora of taxonomy-labeled structured datasets based on the hierarchical taxonomy classifier; and outputting, via a graphical user interface, at least one corpus of taxonomy-labeled structured datasets of the plurality of distinct corpora of taxonomy-labeled structured datasets based on an input of a data classification query.

In some embodiments, the machine learning model includes an unsupervised machine learning model implementing a k-means clustering algorithm. In some embodiments, the computer-readable medium further includes computer-readable instructions that, when executed by the one or more processors, performing operations including identifying a total number of hypernyms within the plurality of distinct hierarchical taxonomy categories; and configuring the unsupervised machine learning model to compute a total number of taxonomy clusters equivalent to the total number of distinct hypernyms by setting a value of k of the k-means clustering algorithm to the total number of hypernyms.

In some embodiments, the machine learning model includes an unsupervised machine learning model implementing a k-means clustering algorithm. In some embodiments, the computer-readable medium further includes computer-readable instructions that, when executed by the one or more processors, perform operations including identifying a total number of distinct hierarchical categories within the plurality of distinct hierarchical taxonomy categories, wherein a distinct hierarchical category includes a hypernym and one or more hyponyms; and configuring the unsupervised machine learning model to compute a total number of taxonomy clusters equivalent to the total number of distinct hierarchical taxonomy categories by setting a value of k of the k-means clustering algorithm to the total number of hierarchical taxonomy categories.

In some embodiments, identifying the target hierarchical taxonomy includes receiving, via a network, the target taxonomy from a remote source of taxonomy data storing a plurality of pre-determined taxonomies, and the target taxonomy relates to a taxonomy that is likely germane to structured datasets associated with the subscriber.

In some embodiments, extracting the plurality of distinct taxonomy tokens from the plurality of distinct hierarchical taxonomy categories includes tokenizing at least one word of each hypernym of a plurality of distinct hypernyms within the plurality of distinct hierarchical categories, and tokenizing at least one word of each hyponym of a plurality of distinct hyponyms within the plurality of distinct hierarchical categories.

In some embodiments, the token vectorization model includes a pre-trained word embeddings model that has been trained to produce embedding values within a n-dimensional space, and the embedding values produced by the token vectorization model are at least informed by vocabulary associated with the target taxonomy.

In some embodiments, each distinct taxonomy cluster of the plurality of distinct taxonomy clusters relates to a distinct taxonomy category and includes a plurality of taxonomy embedding values of hyponyms associated with the distinct taxonomy category.

In some embodiments, the computer-readable medium further includes computer-readable instructions that, when executed by the one or more processors, perform operations including computing, by the one or more processors, a distinct centroid for each of the plurality of distinct taxonomy clusters, wherein: the hierarchical taxonomy classifier converts the volume of unlabeled structured datasets to the plurality of distinct corpora of taxonomy-labeled structured datasets by mapping each unlabeled structured dataset of the volume to at least of the plurality of taxonomy clusters of the hierarchical taxonomy classifier; and mapping each unlabeled structured dataset of the volume to the at least one of the plurality of hierarchical taxonomy clusters includes computing, by the token vectorization model, an embedding for a target unlabeled structured data set of the volume, calculating a plurality of distinct distance metrics based on a distance computation between the embedding of the target unlabeled structured data set and the distinct centroid for each of the plurality of distinct taxonomy clusters, identifying a distinct distance metric of the plurality of distinct distance metrics having a smallest distance value between the embedding of the target unlabeled structured data set and the distinct centroid of one distinct taxonomy cluster of the plurality of distinct taxonomy clusters, and associating the target unlabeled structured data set to the one distinct taxonomy cluster based on the identifying the distance metric.

In some embodiments, the hierarchical taxonomy classifier converts the volume of unlabeled structured datasets to the plurality of distinct corpora of taxonomy-labeled structured datasets by mapping each unlabeled structured dataset of the volume to at least of the plurality of taxonomy clusters of the hierarchical taxonomy classifier; and mapping each unlabeled structured dataset of the volume to the at least one of the plurality of hierarchical taxonomy clusters includes computing, by the token vectorization model, an embedding for a target unlabeled structured data set of the volume, calculating a plurality of distinct distance metrics based on a distance computation between the embedding of the target unlabeled structured data set and an embedding of a distinct hypernym associated with each of the plurality of distinct taxonomy clusters, identifying a distinct distance metric of the plurality of distinct distance metrics having a smallest distance value between the embedding of the target unlabeled structured data set and the distinct hypernym of one distinct taxonomy cluster of the plurality of distinct taxonomy clusters, and associating the target unlabeled structured data set to the distinct taxonomy cluster based on the identifying the distance metric.

In some embodiments, the hierarchical taxonomy classifier converts the volume of unlabeled structured datasets to the plurality of distinct corpora of taxonomy-labeled structured datasets by mapping each unlabeled structured dataset of the volume to at least of the plurality of taxonomy clusters of the hierarchical taxonomy classifier; and mapping each unlabeled structured dataset of the volume to the at least one of the plurality of taxonomy clusters includes computing, by the token vectorization model, an embedding for a target unlabeled structured data set of the volume, calculating a plurality of distinct distance metrics based on a distance computation between the embedding of the target unlabeled structured data set and embedding of distinct hyponyms associated with each of the plurality of distinct taxonomy clusters, identifying a distinct distance metric of the plurality of distinct distance metrics having a smallest distance value between the embedding of the target unlabeled structured data set and one distinct hyponym of one distinct taxonomy cluster of the plurality of distinct hierarchical taxonomy clusters, and associating the target unlabeled structured data set to the distinct taxonomy cluster based on the identifying the distance metric.

In some embodiments, a computer-program product embodied in a non-transitory machine-readable storage medium stores computer instructions that, when executed by one or more processors, perform operations including identifying, from a database, a structured data corpus including a plurality of distinct, unlabeled structured datasets; for each distinct, unlabeled structured dataset of the plurality of distinct, unlabeled structured datasets: tokenizing, via one or more tokenization algorithms, a target distinct, unlabeled structured dataset into a plurality of distinct feature tokens; computing, by a token vectorization model, an embedding value for the target distinct, unlabeled structured dataset based on the plurality of distinct feature tokens; computing, by a taxonomy classification model, a taxonomy category label for the target distinct, unlabeled structured dataset based on an input of the embedding value; associating the taxonomy category label with the target distinct, unlabeled structured dataset; and outputting, to the database, a plurality of distinct corpora of taxonomy-labeled structured datasets based on the taxonomy category label computed for each of the plurality of distinct unlabeled, structured datasets, wherein each distinct corpus of the plurality of distinct corpora of taxonomy-labeled structured datasets relates to a distinct taxonomy category label and includes structured datasets classified to the distinct taxonomy category label.

In some embodiments, computing, by the taxonomy classification model, the taxonomy category label for the target distinct, unlabeled structured dataset includes computing a plurality of distinct n-dimensional distances between the embedding value for the target distinct, unlabeled structured dataset and a plurality of distinct clusters associated with the taxonomy classification model; identifying a distinct cluster of the plurality of distinct clusters having a smallest distance to the embedding value for the target distinct, unlabeled structured dataset based on an assessment of the plurality of distinct n-dimensional distances; and predicting the taxonomy category label for the target distinct, unlabeled structured dataset based on a taxonomy category associated with the distinct cluster.

In some embodiments, computing, by the taxonomy classification model, the taxonomy category label for the target distinct, unlabeled structured dataset includes computing a plurality of distinct n-dimensional distances between the embedding value for the target distinct, unlabeled structured dataset and a plurality of distinct clusters associated with the taxonomy classification model; identifying a distinct cluster of the plurality of distinct clusters having a smallest distance to the embedding value for the target distinct, unlabeled structured dataset based on an assessment of the plurality of distinct n-dimensional distances; and predicting the taxonomy category label for the target distinct, unlabeled structured dataset based on hypernym data associated with the distinct cluster.

In some embodiments, the computer-program product further includes computer instructions for performing operations including routing one or more distinct, unlabeled structured datasets to a taxonomy-labeling workflow including a reclassification labeling workflow based on computing a taxonomy category label for each of the one or more distinct, unlabeled structured datasets with less than a threshold amount of confidence.

In some embodiments, a taxonomy category label is computed with less than a threshold amount of confidence when the taxonomy classification models determines that zero (o) clusters of the taxonomy classification model are within a threshold distance of an embedding value of a given unlabeled structured dataset.

In some embodiments, the computer-program product further includes computer instructions for performing operations including executing the reclassification workflow to generate a reclassification taxonomy category label that reclassifies the given unlabeled structured dataset to one of the plurality of distinct hierarchical clusters, wherein executing the reclassification workflow includes generating an annotation request to a labeling source requesting an augmentation of additional feature data to the given unlabeled structured dataset; and computing, by the taxonomy classification model, the reclassification taxonomy category label for the given unlabeled structured dataset based on the augmentation of the additional feature data.

In some embodiments, the computer-program product further includes computer instructions for performing operations including routing one or more distinct, unlabeled structured datasets to a taxonomy-labeling workflow including an active learning-based labeling workflow based on computing ambiguous taxonomy category labels for each of the one or more distinct, unlabeled unstructured datasets.

In some embodiments, the ambiguous taxonomy category labels relate to multiple taxonomy category labels having distinct n-dimensional distances between an embedding value of a given unlabeled structured dataset and a plurality of distinct clusters associated with the taxonomy classification model that satisfy a taxonomy classification threshold.

In some embodiments, the computer-program product further includes computer instructions for performing operations including computing a distinct accuracy metric value for each of the multiple taxonomy category labels, wherein the distinct accuracy metric value relates to a confidence value or a likelihood value that a given taxonomy category label accurately categorizes the given unlabeled structured dataset; executing the active learning-based labeling workflow including providing the distinct accuracy metric value for each of the multiple taxonomy label inferences; generating a validation request to a label validation source requesting a validation of one of the taxonomy category labels of the multiple taxonomy category labels based at least on the computing of the distinct accuracy metric value for each of the multiple taxonomy category labels; and exclusively associating the one of the taxonomy label inferences of the multiple taxonomy category labels to the given unlabeled structured dataset based on the validation request.

In some embodiments, the token vectorization model includes a pre-trained word embeddings model that has been trained to produce embeddings inferences within a n-dimensional space based at least on vocabulary associated with a target hierarchical taxonomy.

In some embodiments, a computer-implemented method includes identifying, from a database, a structured data corpus including a plurality of distinct, unlabeled structured datasets; for each distinct, unlabeled structured dataset of the plurality of distinct, unlabeled structured datasets: tokenizing, via one or more tokenization algorithms, a target distinct, unlabeled structured dataset into a plurality of distinct feature tokens; computing, by a token vectorization model, an embedding value for the target distinct, unlabeled structured dataset based on the plurality of distinct feature tokens; computing, by a taxonomy classification model, a taxonomy category label for the target distinct, unlabeled structured dataset based on an input of the embedding value; associating the taxonomy category label with the target distinct, unlabeled structured dataset; and outputting, to the database, a plurality of distinct corpora of taxonomy-labeled structured datasets based on the taxonomy category label computed for each of the plurality of distinct unlabeled, structured datasets, wherein each distinct corpus of the plurality of distinct corpora of taxonomy-labeled structured datasets relates to a distinct taxonomy category label and includes structured datasets classified to the distinct taxonomy category label.

In some embodiments, computing, by the taxonomy classification model, the taxonomy category label for the target distinct, unlabeled structured dataset includes computing a plurality of distinct n-dimensional distances between the embedding value for the target distinct, unlabeled structured dataset and a plurality of distinct clusters associated with the taxonomy classification model; identifying a distinct cluster of the plurality of distinct clusters having a smallest distance to the embedding value for the target distinct, unlabeled structured dataset based on an assessment of the plurality of distinct n-dimensional distances; and predicting the taxonomy category label for the target distinct, unlabeled structured dataset based on a taxonomy category associated with the distinct cluster.

In some embodiments, computing, by the taxonomy classification model, the taxonomy category label for the target distinct, unlabeled structured dataset includes computing a plurality of distinct n-dimensional distances between the embedding value for the target distinct, unlabeled structured dataset and a plurality of distinct clusters associated with the taxonomy classification model; identifying a distinct cluster of the plurality of distinct clusters having a smallest distance to the embedding value for the target distinct, unlabeled structured dataset based on an assessment of the plurality of distinct n-dimensional distances; and predicting the taxonomy category label for the target distinct, unlabeled structured dataset based on hypernym data associated with the distinct cluster.

In some embodiments, the computer-implemented method further includes routing one or more distinct, unlabeled structured datasets to a taxonomy-labeling workflow including a reclassification labeling workflow based on computing a taxonomy category label for each of the one or more distinct, unlabeled structured datasets with less than a threshold amount of confidence.

In some embodiments, a taxonomy category label is computed with less than a threshold amount of confidence when the taxonomy classification models determines that zero (o) clusters of the taxonomy classification model are within a threshold distance of an embedding value of a given unlabeled structured dataset.

In some embodiments, the computer-implemented method further includes executing the reclassification workflow to generate a reclassification taxonomy category label that reclassifies the given unlabeled structured dataset to one of the plurality of distinct hierarchical clusters, wherein executing the reclassification workflow includes generating an annotation request to a labeling source requesting an augmentation of additional feature data to the given unlabeled structured dataset; and computing, by the taxonomy classification model, the reclassification taxonomy category label for the given unlabeled structured dataset based on the augmentation of the additional feature data.

In some embodiments, the computer-implemented method further includes routing one or more distinct, unlabeled structured datasets to a taxonomy-labeling workflow including an active learning-based labeling workflow based on computing ambiguous taxonomy category labels for each of the one or more distinct, unlabeled unstructured datasets.

In some embodiments, the ambiguous taxonomy category labels relate to multiple taxonomy category labels having distinct n-dimensional distances between an embedding value of a given unlabeled structured dataset and a plurality of distinct clusters associated with the taxonomy classification model that satisfy a taxonomy classification threshold.

In some embodiments, the computer-implemented method further includes computing a distinct accuracy metric value for each of the multiple taxonomy category labels, wherein the distinct accuracy metric value relates to a confidence value or a likelihood value that a given taxonomy category label accurately categorizes the given unlabeled structured dataset; executing the active learning-based labeling workflow including providing the distinct accuracy metric value for each of the multiple taxonomy label inferences; generating a validation request to a label validation source requesting a validation of one of the taxonomy category labels of the multiple taxonomy category labels based at least on the computing of the distinct accuracy metric value for each of the multiple taxonomy category labels; and exclusively associating the one of the taxonomy label inferences of the multiple taxonomy category labels to the given unlabeled structured dataset based on the validation request.

In some embodiments, the token vectorization model includes a pre-trained word embeddings model that has been trained to produce embeddings inferences within a n-dimensional space based at least on vocabulary associated with a target hierarchical taxonomy.

In some embodiments, a computer-implemented system includes one or more processors; a database; a computer-readable medium operably coupled to the one or more processors, the computer-readable medium having computer-readable instructions stored thereon that, when executed by the one or more processors, cause the computing device to perform operations including identifying, from the database, a structured data corpus including a plurality of distinct, unlabeled structured datasets; for each distinct, unlabeled structured dataset of the plurality of distinct, unlabeled structured datasets: tokenizing, via one or more tokenization algorithms, a target distinct, unlabeled structured dataset into a plurality of distinct feature tokens; computing, by a token vectorization model, an embedding value for the target distinct, unlabeled structured dataset based on the plurality of distinct feature tokens; computing, by a taxonomy classification model, a taxonomy category label for the target distinct, unlabeled structured dataset based on an input of the embedding value; associating the taxonomy category label with the target distinct, unlabeled structured dataset; and outputting, to the database, a plurality of distinct corpora of taxonomy-labeled structured datasets based on the taxonomy category label computed for each of the plurality of distinct unlabeled, structured datasets, wherein each distinct corpus of the plurality of distinct corpora of taxonomy-labeled structured datasets relates to a distinct taxonomy category label and includes structured datasets classified to the distinct taxonomy category label.

In some embodiments, computing, by the taxonomy classification model, the taxonomy category label for the target distinct, unlabeled structured dataset includes computing a plurality of distinct n-dimensional distances between the embedding value for the target distinct, unlabeled structured dataset and a plurality of distinct clusters associated with the taxonomy classification model; identifying a distinct cluster of the plurality of distinct clusters having a smallest distance to the embedding value for the target distinct, unlabeled structured dataset based on an assessment of the plurality of distinct n-dimensional distances; and predicting the taxonomy category label for the target distinct, unlabeled structured dataset based on a taxonomy category associated with the distinct cluster.

In some embodiments, computing, by the taxonomy classification model, the taxonomy category label for the target distinct, unlabeled structured dataset includes computing a plurality of distinct n-dimensional distances between the embedding value for the target distinct, unlabeled structured dataset and a plurality of distinct clusters associated with the taxonomy classification model; identifying a distinct cluster of the plurality of distinct clusters having a smallest distance to the embedding value for the target distinct, unlabeled structured dataset based on an assessment of the plurality of distinct n-dimensional distances; and predicting the taxonomy category label for the target distinct, unlabeled structured dataset based on hypernym data associated with the distinct cluster.

In some embodiments, the computer-readable medium further includes computer-readable instructions that, when executed by the one or more processors, perform operations including routing one or more distinct, unlabeled structured datasets to a taxonomy-labeling workflow including a reclassification labeling workflow based on computing a taxonomy category label for each of the one or more distinct, unlabeled structured datasets with less than a threshold amount of confidence.

In some embodiments, a taxonomy category label is computed with less than a threshold amount of confidence when the taxonomy classification models determines that zero (o) clusters of the taxonomy classification model are within a threshold distance of an embedding value of a given unlabeled structured dataset.

In some embodiments, the computer-readable medium further includes computer-readable instructions that, when executed by the one or more processors, perform operations including executing the reclassification workflow to generate a reclassification taxonomy category label that reclassifies the given unlabeled structured dataset to one of the plurality of distinct hierarchical clusters, wherein executing the reclassification workflow includes generating an annotation request to a labeling source requesting an augmentation of additional feature data to the given unlabeled structured dataset; and computing, by the taxonomy classification model, the reclassification taxonomy category label for the given unlabeled structured dataset based on the augmentation of the additional feature data.

In some embodiments, the computer-readable medium further includes computer-readable instructions that, when executed by the one or more processors, perform operations including routing one or more distinct, unlabeled structured datasets to a taxonomy-labeling workflow including an active learning-based labeling workflow based on computing ambiguous taxonomy category labels for each of the one or more distinct, unlabeled unstructured datasets.

In some embodiments, the ambiguous taxonomy category labels relate to multiple taxonomy category labels having distinct n-dimensional distances between an embedding value of a given unlabeled structured dataset and a plurality of distinct clusters associated with the taxonomy classification model that satisfy a taxonomy classification threshold.

In some embodiments, the computer-readable medium further includes computer-readable instructions that, when executed by the one or more processors, perform operations including computing a distinct accuracy metric value for each of the multiple taxonomy category labels, wherein the distinct accuracy metric value relates to a confidence value or a likelihood value that a given taxonomy category label accurately categorizes the given unlabeled structured dataset; executing the active learning-based labeling workflow including providing the distinct accuracy metric value for each of the multiple taxonomy label inferences; generating a validation request to a label validation source requesting a validation of one of the taxonomy category labels of the multiple taxonomy category labels based at least on the computing of the distinct accuracy metric value for each of the multiple taxonomy category labels; and exclusively associating the one of the taxonomy label inferences of the multiple taxonomy category labels to the given unlabeled structured dataset based on the validation request.

In some embodiments, the token vectorization model includes a pre-trained word embeddings model that has been trained to produce embeddings inferences within a n-dimensional space based at least on vocabulary associated with a target hierarchical taxonomy.

In some embodiments, a computer-program product embodied in a non-transitory machine-readable storage medium stores computer instructions that, when executed by one or more processors, perform operations including obtaining, via a graphical user interface (GUI), a GUI request for one or more taxonomy-labeled structured datasets; extracting, from the GUI request, one or more taxonomy tokens; defining a taxonomy token-informed search operation based on the one or more taxonomy tokens; executing, by one or more processors, the taxonomy token-informed search operation for searching a database including a plurality of distinct corpora of labeled structured datasets, wherein each distinct corpus of the plurality of distinct corpora of labeled structured datasets includes a grouping of taxonomy-labeled structured datasets having an attribution of distinct hierarchical taxonomy metadata; identifying a target corpus of taxonomy-labeled structured datasets of the plurality of distinct corpora of labeled structured datasets based on the execution of the taxonomy token-informed search operation; computing contemporaneously with the execution of taxonomy-token informed search operation, by the one or more processors, a summary artifact that is derived based on the distinct hierarchical taxonomy metadata attributed to the target corpus of labeled structured datasets, wherein the summary artifact includes a computer-generated precis derived based on content included in the target corpus of taxonomy-labeled structured datasets; and returning, via a display of the GUI, a response to the GUI request that includes a plurality of taxonomy-labeled structured datasets from the target corpus of taxonomy-labeled structured datasets and the summary artifact based on the identification of the target corpus of taxonomy-labeled structured datasets and the computing of the summary artifact.

In some embodiments, executing the taxonomy token-informed search operation includes computing, by a token vectorization model, an embeddings value for each of the one or more taxonomy tokens of the GUI request, wherein the token vectorization model includes a word embeddings model that has been trained to produce embeddings values within a n-dimensional space informed at least by vocabulary associated with a target hierarchical taxonomy; evaluating the embeddings values for each of the one or more taxonomy tokens against embeddings values associated with each of the plurality of distinct corpora of labeled structured datasets; and identifying one or more exact matches or one or more semantic matches between the embeddings value for each of the one or more taxonomy tokens and the embedding values for each of the one or more taxonomy tokens; and identifying the target corpus of taxonomy-labeled structured datasets is further based on selecting the target corpus of taxonomy-labeled structured datasets having one or more embeddings values causing the one or more exact matches or the one or more semantic matches.

In some embodiments, the computer-program product further includes computer instructions for performing operations including sampling a subset of taxonomy-labeled structured datasets from the target corpus of taxonomy-labeled structured datasets based on the one or more exact matches or the one or more semantic matches, wherein the plurality of taxonomy-labeled structured datasets of the response includes the subset of taxonomy-labeled structured datasets.

In some embodiments, the computer-program product further includes computer instructions for performing operations including computing a taxonomy match metric value for each of the plurality of distinct corpora of labeled structured datasets based on the one or more exact matches or the one or more semantic matches for each of the plurality of distinct corpora of labeled structured datasets, wherein computing the taxonomy match metric value is based on a cumulative embeddings distance between the embeddings value for each of the one or more taxonomy tokens and the embedding values for each of the one or more taxonomy tokens; and prioritizing the plurality of distinct corpora of labeled structured datasets based on the taxonomy match metric value computed for each of the plurality of distinct corpora of labeled structured datasets, wherein returning, via the display of the web-accessible GUI, the response includes displaying each distinct corpus of the plurality of distinct corpora of labeled structured datasets in an arrangement informed by the prioritization.

In some embodiments, executing the taxonomy token-informed search operation includes evaluating the one or more taxonomy tokens of the GUI request against a distinct set of taxonomy tokens attributed to each of the plurality of distinct corpora of labeled structured datasets, and identifying one or more taxonomy token matches including one or more exact matches or one or more semantic matches between the one or more taxonomy tokens of the GUI request and the distinct set of taxonomy tokens attributed to each of the plurality of distinct corpora of labeled structured datasets; and identifying the target corpus of taxonomy-labeled structured datasets is further based on selecting the target corpus of taxonomy labeled structured datasets having a subject distinct set of taxonomy tokens contributing to the one or more taxonomy token matches.

In some embodiments, defining the taxonomy token-informed search operation includes constructing a cosine similarity search using embeddings values of the one or more taxonomy tokens for performing the search of the database, constructing a Boolean search using two or more taxonomy tokens extracted from the GUI request for performing the search of the database, or constructing a regular expression search using the one or more taxonomy tokens for performing the search of the database.

In some embodiments, the computer-program product further includes computer instructions for performing operations including extracting, from the distinct hierarchical taxonomy metadata associated with the target corpus of taxonomy-labeled structured datasets, a hierarchical taxonomy label pair, wherein the hierarchical taxonomy label pair includes a taxonomy hypernym label and a taxonomy hyponym label attributed to the target corpus, wherein computing the summary artifact includes interleaving into two or more slots of a precis template the hierarchical taxonomy label pair including filling a first slot of the two or more slots with the taxonomy hyponym label and filling a second slot of the two or more slots with the taxonomy hypernym label.

In some embodiments, the computer-program product further includes computer instructions for performing operations including computing taxonomy metrics for the target corpus of taxonomy-labeled structured datasets, wherein computing the taxonomy metrics includes computing, for each distinct hyponym taxonomy label associated with the target corpus, a count of a number of taxonomy-labeled structured datasets having an attribution of a target hyponym taxonomy label, wherein returning, via the display of the web-accessible GUI, includes outputting each distinct hyponym taxonomy label associated with the target corpus associatively with the count of the number of taxonomy-labeled structured datasets having the each distinct hyponym taxonomy label.

In some embodiments, the computer-program product further includes computer instructions for performing operations including evaluating the distinct hierarchical metadata attributed to the target corpus of taxonomy-labeled structured datasets against a subscriber data governance policy; and identifying whether one or more taxonomy-labeled structured datasets of the target corpus includes sensitive data based on the evaluation of the subscriber data governance policy, wherein sensitive data relates to data that is within a purview of access restrictions as defined by a subscriber associated with the subscriber data governance policy, wherein if the one or more taxonomy-labeled structured datasets satisfy sensitive data criteria of the subscriber data governance policy, automatically indicating, via the GUI, the one or more labeled structured datasets as including sensitive data.

In some embodiments, the display of the GUI includes multiple distinct sections including a first section dedicated to the automated summary artifact and a second section dedicated to the plurality of taxonomy-labeled structured datasets, and returning, via the display of the GUI, the response includes automatically populating the computer-generated precis to the first section of the display of the GUI, and automatically populating the plurality of taxonomy-labeled structured datasets to the second section of the display of the GUI.

In some embodiments, a computer-implemented method includes obtaining, via a graphical user interface (GUI), a GUI request for one or more taxonomy-labeled structured datasets; extracting, from the GUI request, one or more taxonomy tokens; defining a taxonomy token-informed search operation based on the one or more taxonomy tokens; executing, by one or more processors, the taxonomy token-informed search operation for searching a database including a plurality of distinct corpora of labeled structured datasets, wherein each distinct corpus of the plurality of distinct corpora of labeled structured datasets includes a grouping of taxonomy-labeled structured datasets having an attribution of distinct hierarchical taxonomy metadata; identifying a target corpus of taxonomy-labeled structured datasets of the plurality of distinct corpora of labeled structured datasets based on the execution of the taxonomy token-informed search operation; computing contemporaneously with the execution of taxonomy-token informed search operation, by the one or more processors, a summary artifact that is derived based on the distinct hierarchical taxonomy metadata attributed to the target corpus of labeled structured datasets, wherein the summary artifact includes a computer-generated precis derived based on content included in the target corpus of taxonomy-labeled structured datasets; and returning, via a display of the GUI, a response to the GUI request that includes a plurality of taxonomy-labeled structured datasets from the target corpus of taxonomy-labeled structured datasets and the summary artifact based on the identification of the target corpus of taxonomy-labeled structured datasets and the computing of the summary artifact.

In some embodiments, executing the taxonomy token-informed search operation includes computing, by a token vectorization model, an embeddings value for each of the one or more taxonomy tokens of the GUI request, wherein the token vectorization model includes a word embeddings model that has been trained to produce embeddings values within a n-dimensional space informed at least by vocabulary associated with a target hierarchical taxonomy; evaluating the embeddings values for each of the one or more taxonomy tokens against embeddings values associated with each of the plurality of distinct corpora of labeled structured datasets; and identifying one or more exact matches or one or more semantic matches between the embeddings value for each of the one or more taxonomy tokens and the embedding values for each of the one or more taxonomy tokens; and identifying the target corpus of taxonomy-labeled structured datasets is further based on selecting the target corpus of taxonomy-labeled structured datasets having one or more embeddings values causing the one or more exact matches or the one or more semantic matches.

In some embodiments, the computer-implemented method further includes sampling a subset of taxonomy-labeled structured datasets from the target corpus of taxonomy-labeled structured datasets based on the one or more exact matches or the one or more semantic matches, wherein the plurality of taxonomy-labeled structured datasets of the response includes the subset of taxonomy-labeled structured datasets.

In some embodiments, the computer-implemented method further includes computing a taxonomy match metric value for each of the plurality of distinct corpora of labeled structured datasets based on the one or more exact matches or the one or more semantic matches for each of the plurality of distinct corpora of labeled structured datasets, wherein computing the taxonomy match metric value is based on a cumulative embeddings distance between the embeddings value for each of the one or more taxonomy tokens and the embedding values for each of the one or more taxonomy tokens; and prioritizing the plurality of distinct corpora of labeled structured datasets based on the taxonomy match metric value computed for each of the plurality of distinct corpora of labeled structured datasets, wherein returning, via the display of the web-accessible GUI, the response includes displaying each distinct corpus of the plurality of distinct corpora of labeled structured datasets in an arrangement informed by the prioritization.

In some embodiments, executing the taxonomy token-informed search operation includes evaluating the one or more taxonomy tokens of the GUI request against a distinct set of taxonomy tokens attributed to each of the plurality of distinct corpora of labeled structured datasets, and identifying one or more taxonomy token matches including one or more exact matches or one or more semantic matches between the one or more taxonomy tokens of the GUI request and the distinct set of taxonomy tokens attributed to each of the plurality of distinct corpora of labeled structured datasets; and identifying the target corpus of taxonomy-labeled structured datasets is further based on selecting the target corpus of taxonomy labeled structured datasets having a subject distinct set of taxonomy tokens contributing to the one or more taxonomy token matches.

In some embodiments, defining the taxonomy token-informed search operation includes constructing a cosine similarity search using embeddings values of the one or more taxonomy tokens for performing the search of the database, constructing a Boolean search using two or more taxonomy tokens extracted from the GUI request for performing the search of the database, or constructing a regular expression search using the one or more taxonomy tokens for performing the search of the database.

In some embodiments, the computer-implemented method further includes extracting, from the distinct hierarchical taxonomy metadata associated with the target corpus of taxonomy-labeled structured datasets, a hierarchical taxonomy label pair, wherein the hierarchical taxonomy label pair includes a taxonomy hypernym label and a taxonomy hyponym label attributed to the target corpus, wherein computing the summary artifact includes interleaving into two or more slots of a precis template the hierarchical taxonomy label pair including filling a first slot of the two or more slots with the taxonomy hyponym label and filling a second slot of the two or more slots with the taxonomy hypernym label.

In some embodiments, the computer-implemented method further includes computing taxonomy metrics for the target corpus of taxonomy-labeled structured datasets, wherein computing the taxonomy metrics includes computing, for each distinct hyponym taxonomy label associated with the target corpus, a count of a number of taxonomy-labeled structured datasets having an attribution of a target hyponym taxonomy label, wherein returning, via the display of the web-accessible GUI, includes outputting each distinct hyponym taxonomy label associated with the target corpus associatively with the count of the number of taxonomy-labeled structured datasets having the each distinct hyponym taxonomy label.

In some embodiments, the computer-implemented method further includes evaluating the distinct hierarchical metadata attributed to the target corpus of taxonomy-labeled structured datasets against a subscriber data governance policy; and identifying whether one or more taxonomy-labeled structured datasets of the target corpus includes sensitive data based on the evaluation of the subscriber data governance policy, wherein sensitive data relates to data that is within a purview of access restrictions as defined by a subscriber associated with the subscriber data governance policy, wherein if the one or more taxonomy-labeled structured datasets satisfy sensitive data criteria of the subscriber data governance policy, automatically indicating, via the GUI, the one or more labeled structured datasets as including sensitive data.

In some embodiments, the display of the GUI includes multiple distinct sections including a first section dedicated to the automated summary artifact and a second section dedicated to the plurality of taxonomy-labeled structured datasets, and returning, via the display of the GUI, the response includes automatically populating the computer-generated precis to the first section of the display of the GUI, and automatically populating the plurality of taxonomy-labeled structured datasets to the second section of the display of the GUI.

In some embodiments, a computer-implemented system includes one or more processors; a computer-readable medium operably coupled to the one or more processors, the computer-readable medium having computer-readable instructions stored thereon that, when executed by the one or more processors, cause the computing device to perform operations including obtaining, via a graphical user interface (GUI), a GUI request for one or more taxonomy-labeled structured datasets; extracting, from the GUI request, one or more taxonomy tokens; defining a taxonomy token-informed search operation based on the one or more taxonomy tokens; executing, by one or more processors, the taxonomy token-informed search operation for searching a database including a plurality of distinct corpora of labeled structured datasets, wherein each distinct corpus of the plurality of distinct corpora of labeled structured datasets includes a grouping of taxonomy-labeled structured datasets having an attribution of distinct hierarchical taxonomy metadata; identifying a target corpus of taxonomy-labeled structured datasets of the plurality of distinct corpora of labeled structured datasets based on the execution of the taxonomy token-informed search operation; computing contemporaneously with the execution of taxonomy-token informed search operation, by the one or more processors, a summary artifact that is derived based on the distinct hierarchical taxonomy metadata attributed to the target corpus of labeled structured datasets, wherein the summary artifact includes a computer-generated precis derived based on content included in the target corpus of taxonomy-labeled structured datasets; and returning, via a display of the GUI, a response to the GUI request that includes a plurality of taxonomy-labeled structured datasets from the target corpus of taxonomy-labeled structured datasets and the summary artifact based on the identification of the target corpus of taxonomy-labeled structured datasets and the computing of the summary artifact.

In some embodiments, executing the taxonomy token-informed search operation includes computing, by a token vectorization model, an embeddings value for each of the one or more taxonomy tokens of the GUI request, wherein the token vectorization model includes a word embeddings model that has been trained to produce embeddings values within a n-dimensional space informed at least by vocabulary associated with a target hierarchical taxonomy; evaluating the embeddings values for each of the one or more taxonomy tokens against embeddings values associated with each of the plurality of distinct corpora of labeled structured datasets; and identifying one or more exact matches or one or more semantic matches between the embeddings value for each of the one or more taxonomy tokens and the embedding values for each of the one or more taxonomy tokens; and identifying the target corpus of taxonomy-labeled structured datasets is further based on selecting the target corpus of taxonomy-labeled structured datasets having one or more embeddings values causing the one or more exact matches or the one or more semantic matches.

In some embodiments, the computer-readable medium further includes computer-readable instructions that, when executed by the one or more processors, perform operations including sampling a subset of taxonomy-labeled structured datasets from the target corpus of taxonomy-labeled structured datasets based on the one or more exact matches or the one or more semantic matches, wherein the plurality of taxonomy-labeled structured datasets of the response includes the subset of taxonomy-labeled structured datasets.

In some embodiments, the computer-readable medium further includes computer-readable instructions that, when executed by the one or more processors, perform operations including computing a taxonomy match metric value for each of the plurality of distinct corpora of labeled structured datasets based on the one or more exact matches or the one or more semantic matches for each of the plurality of distinct corpora of labeled structured datasets, wherein computing the taxonomy match metric value is based on a cumulative embeddings distance between the embeddings value for each of the one or more taxonomy tokens and the embedding values for each of the one or more taxonomy tokens; and prioritizing the plurality of distinct corpora of labeled structured datasets based on the taxonomy match metric value computed for each of the plurality of distinct corpora of labeled structured datasets, wherein returning, via the display of the web-accessible GUI, the response includes displaying each distinct corpus of the plurality of distinct corpora of labeled structured datasets in an arrangement informed by the prioritization.

In some embodiments, executing the taxonomy token-informed search operation includes evaluating the one or more taxonomy tokens of the GUI request against a distinct set of taxonomy tokens attributed to each of the plurality of distinct corpora of labeled structured datasets, and identifying one or more taxonomy token matches including one or more exact matches or one or more semantic matches between the one or more taxonomy tokens of the GUI request and the distinct set of taxonomy tokens attributed to each of the plurality of distinct corpora of labeled structured datasets; and identifying the target corpus of taxonomy-labeled structured datasets is further based on selecting the target corpus of taxonomy labeled structured datasets having a subject distinct set of taxonomy tokens contributing to the one or more taxonomy token matches.

In some embodiments, defining the taxonomy token-informed search operation includes constructing a cosine similarity search using embeddings values of the one or more taxonomy tokens for performing the search of the database, constructing a Boolean search using two or more taxonomy tokens extracted from the GUI request for performing the search of the database, or constructing a regular expression search using the one or more taxonomy tokens for performing the search of the database.

In some embodiments, the computer-readable medium further includes computer-readable instructions that, when executed by the one or more processors, perform operations including extracting, from the distinct hierarchical taxonomy metadata associated with the target corpus of taxonomy-labeled structured datasets, a hierarchical taxonomy label pair, wherein the hierarchical taxonomy label pair includes a taxonomy hypernym label and a taxonomy hyponym label attributed to the target corpus, wherein computing the summary artifact includes interleaving into two or more slots of a precis template the hierarchical taxonomy label pair including filling a first slot of the two or more slots with the taxonomy hyponym label and filling a second slot of the two or more slots with the taxonomy hypernym label.

In some embodiments, the computer-readable medium further includes computer-readable instructions that, when executed by the one or more processors, perform operations including computing taxonomy metrics for the target corpus of taxonomy-labeled structured datasets, wherein computing the taxonomy metrics includes computing, for each distinct hyponym taxonomy label associated with the target corpus, a count of a number of taxonomy-labeled structured datasets having an attribution of a target hyponym taxonomy label, wherein returning, via the display of the web-accessible GUI, includes outputting each distinct hyponym taxonomy label associated with the target corpus associatively with the count of the number of taxonomy-labeled structured datasets having the each distinct hyponym taxonomy label.

In some embodiments, the computer-readable medium further includes computer-readable instructions that, when executed by the one or more processors, perform operations including evaluating the distinct hierarchical metadata attributed to the target corpus of taxonomy-labeled structured datasets against a subscriber data governance policy; and identifying whether one or more taxonomy-labeled structured datasets of the target corpus includes sensitive data based on the evaluation of the subscriber data governance policy, wherein sensitive data relates to data that is within a purview of access restrictions as defined by a subscriber associated with the subscriber data governance policy, wherein if the one or more taxonomy-labeled structured datasets satisfy sensitive data criteria of the subscriber data governance policy, automatically indicating, via the GUI, the one or more labeled structured datasets as including sensitive data.

In some embodiments, the display of the GUI includes multiple distinct sections including a first section dedicated to the automated summary artifact and a second section dedicated to the plurality of taxonomy-labeled structured datasets, and returning, via the display of the GUI, the response includes automatically populating the computer-generated precis to the first section of the display of the web-accessible GUI, and automatically populating the plurality of taxonomy-labeled structured datasets to the second section of the display of the GUI.

BRIEF DESCRIPTION OF THE FIGURES

FIGS. 27 and 28 illustrate example graphical user interface for displaying an automated summary artifact associated with a target taxonomy-labeled dataset, according to some embodiments of the present technology;

Figure 30:
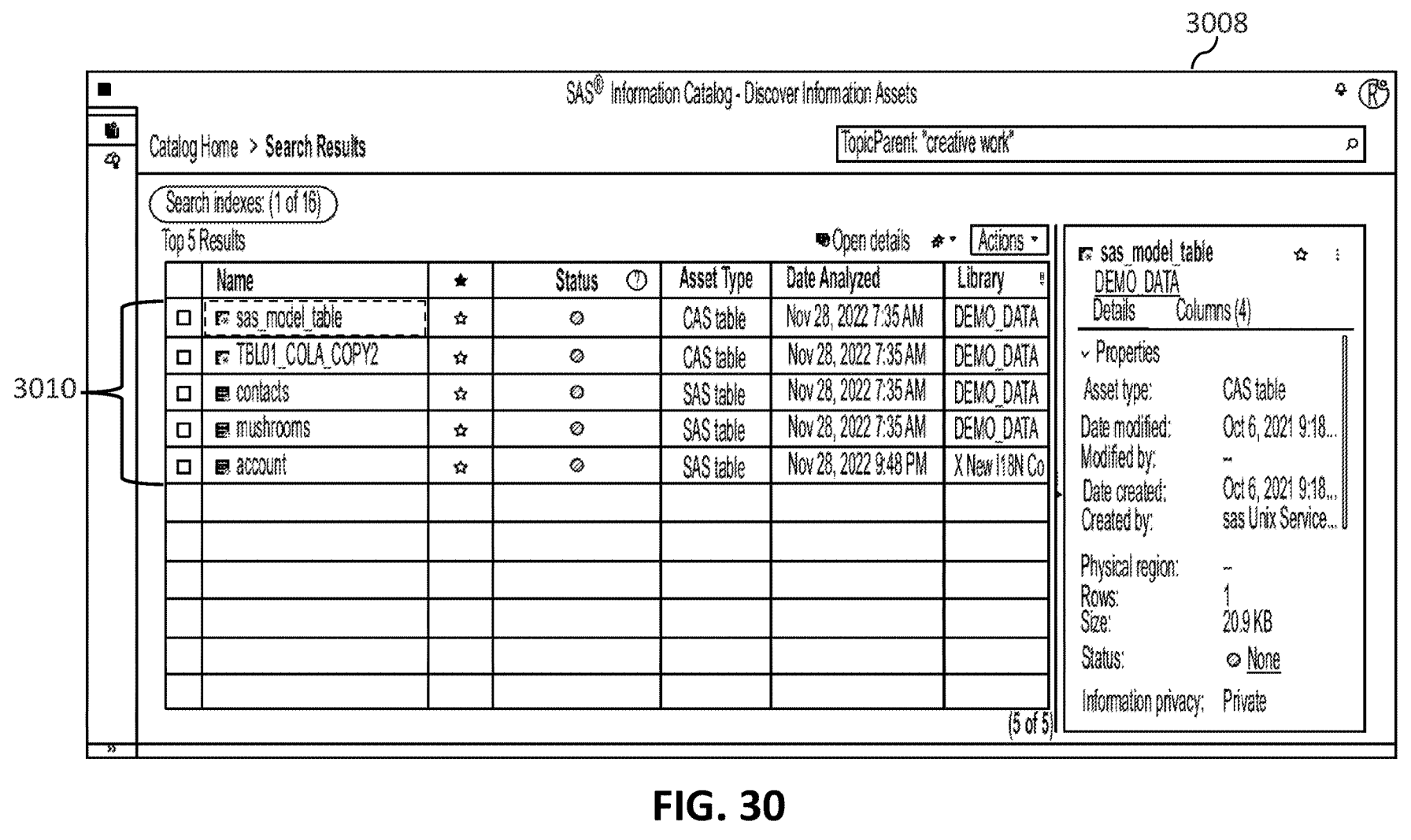

FIGS. 30-32 illustrate example graphical user interfaces for defining and executing one or more taxonomy token-informed search operations, according to some embodiments of the present technology; and FIGS. 33 and 34 illustrate additional example graphical user interfaces for displaying an automated summary artifact associated with a target taxonomy-labeled dataset, according to some embodiments of the present technology.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

Figure 1:
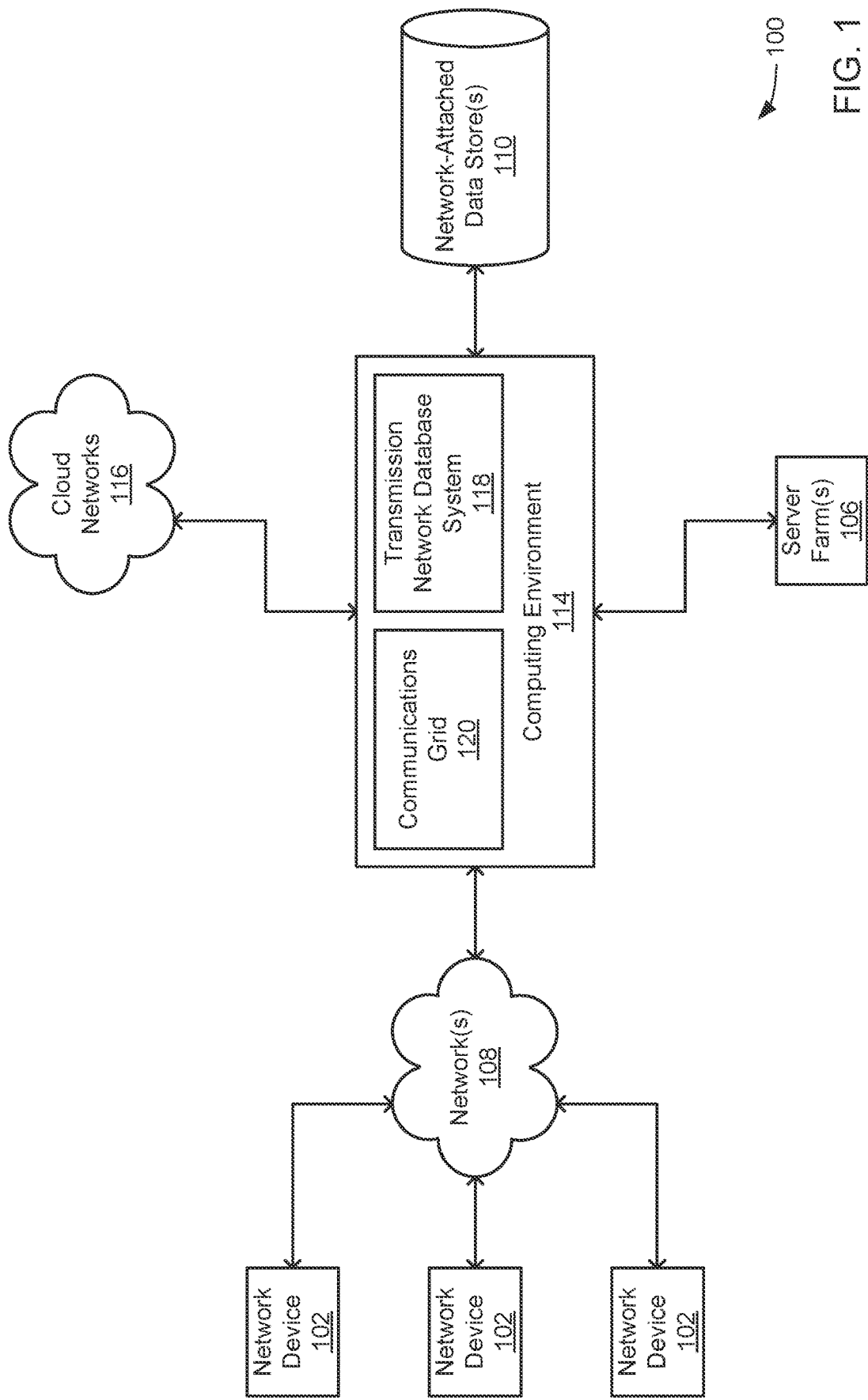
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
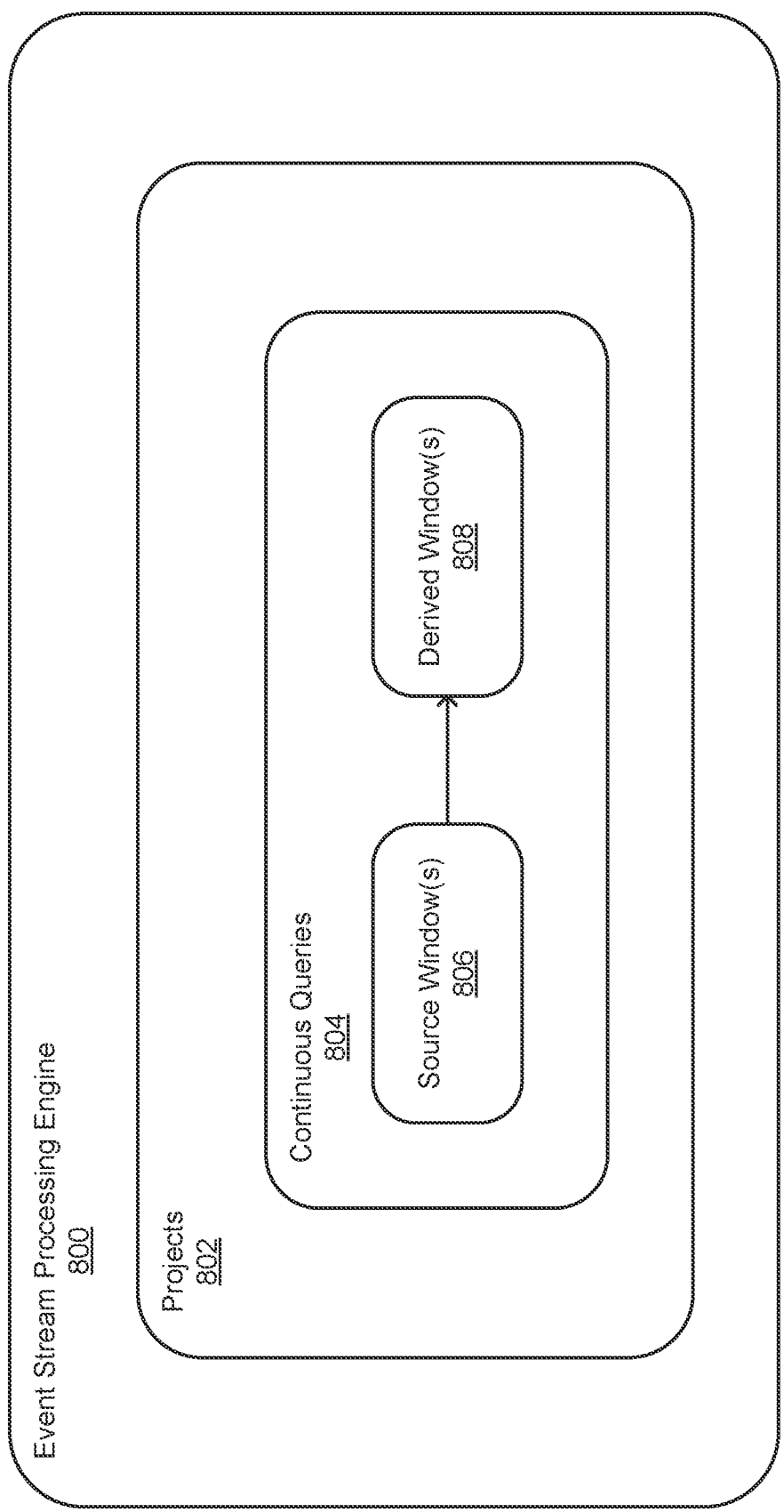
FIG. 8 illustrates a block diagram including components of an Event Stream Processing Engine (ESPE), according to embodiments of the present technology.
Figure 9:
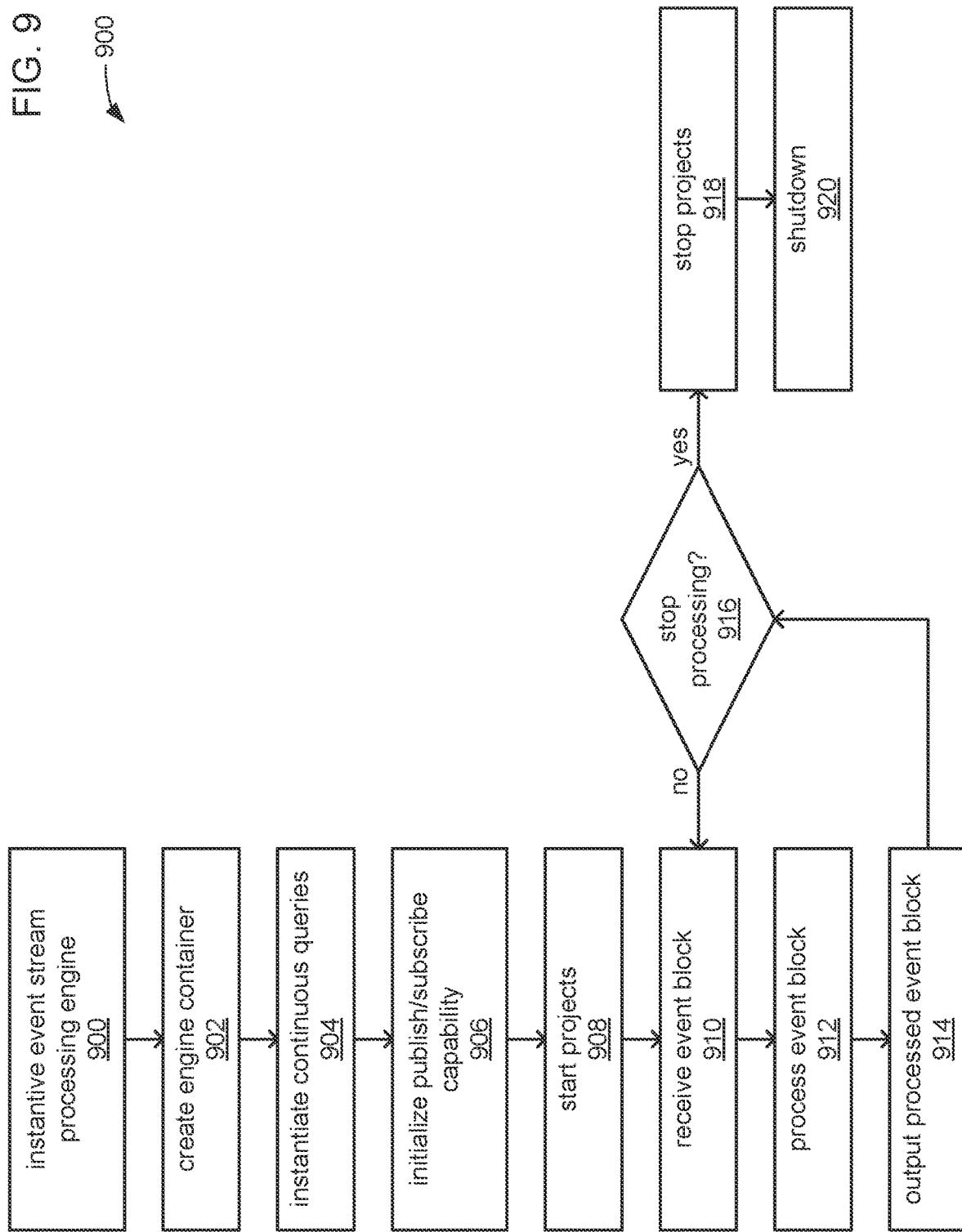
FIG. 9 illustrates a flow chart showing an example process including operations performed by an event stream processing engine, according to some embodiments of the present technology.
Figure 10:
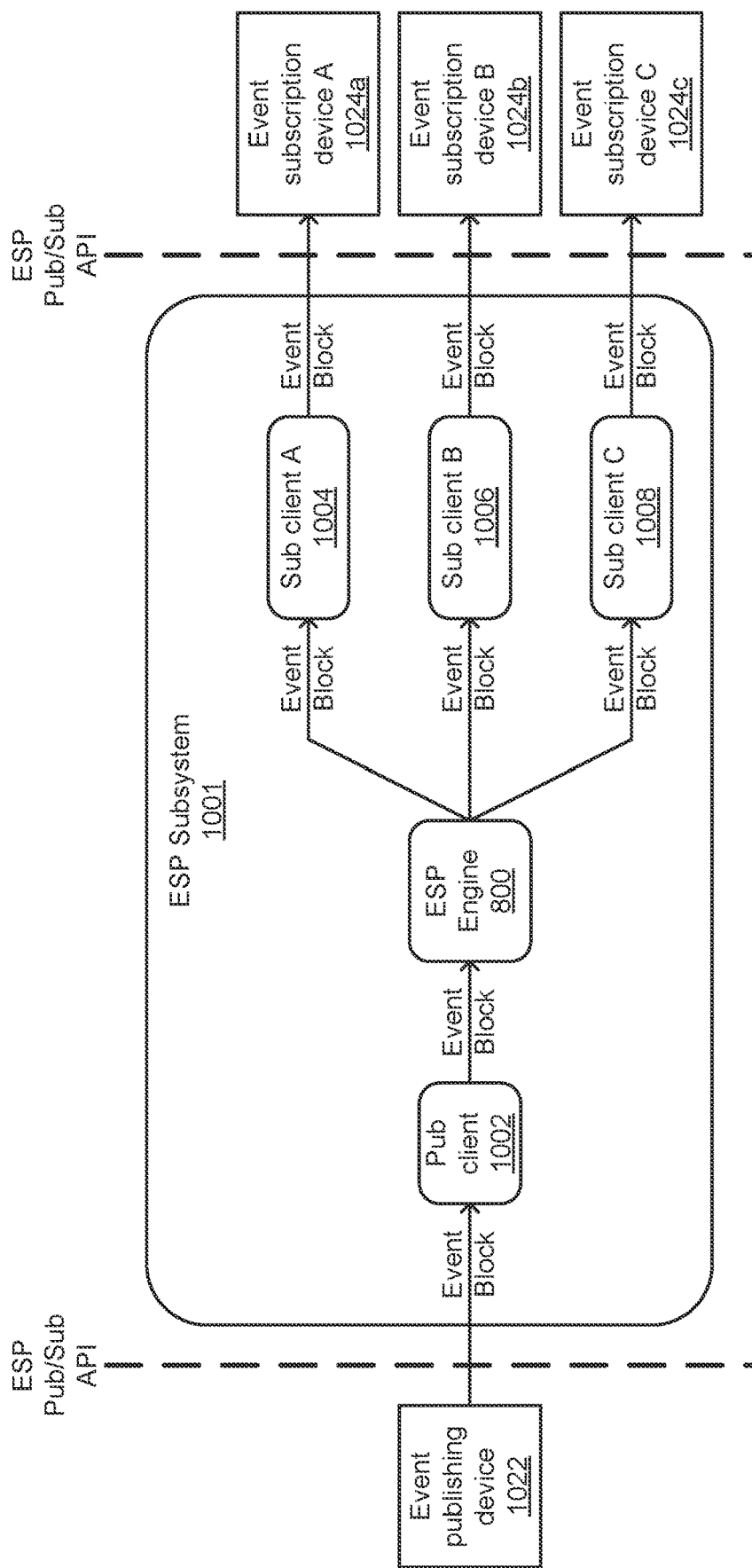
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores no. Network-attached data stores no are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms.

Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
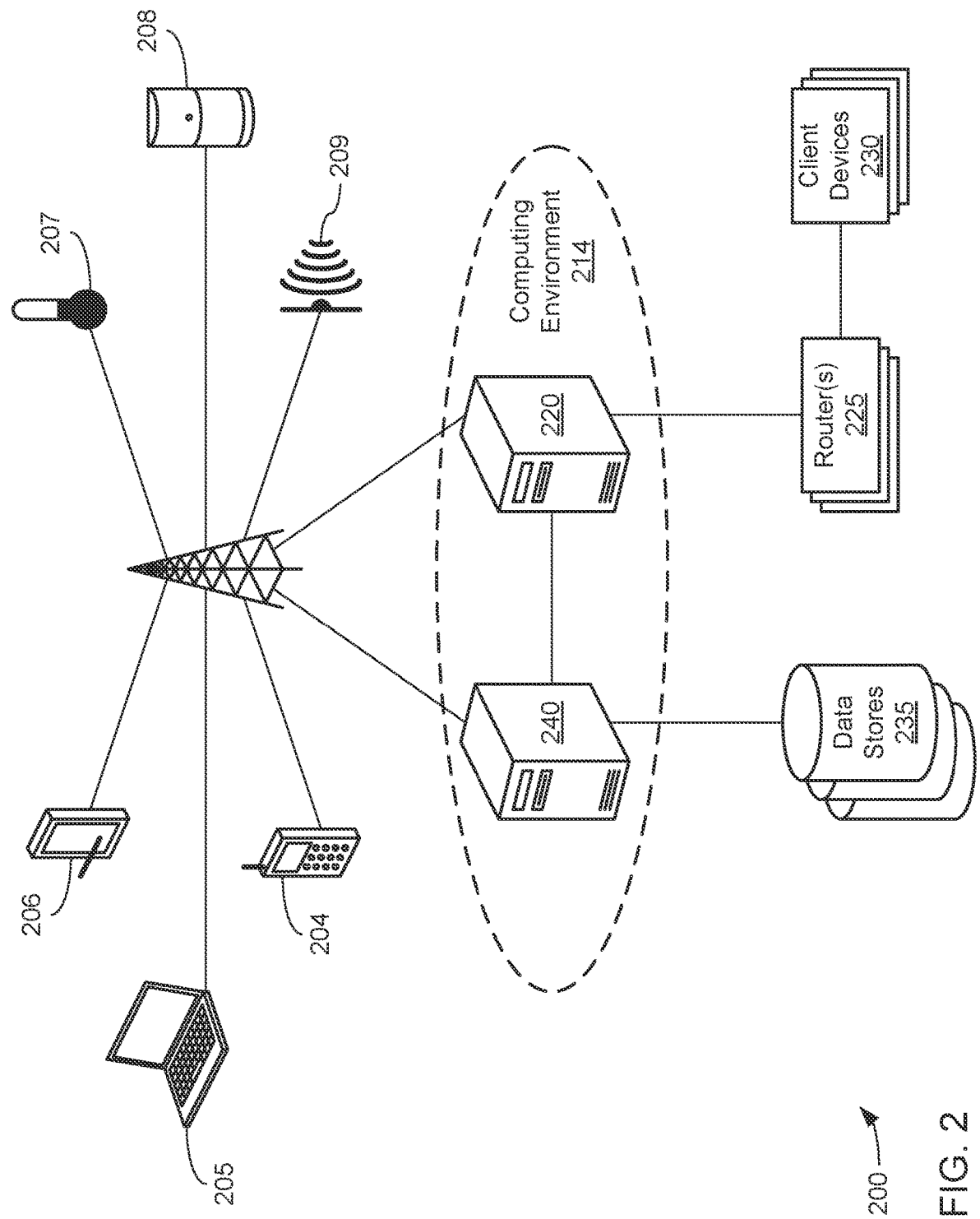
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
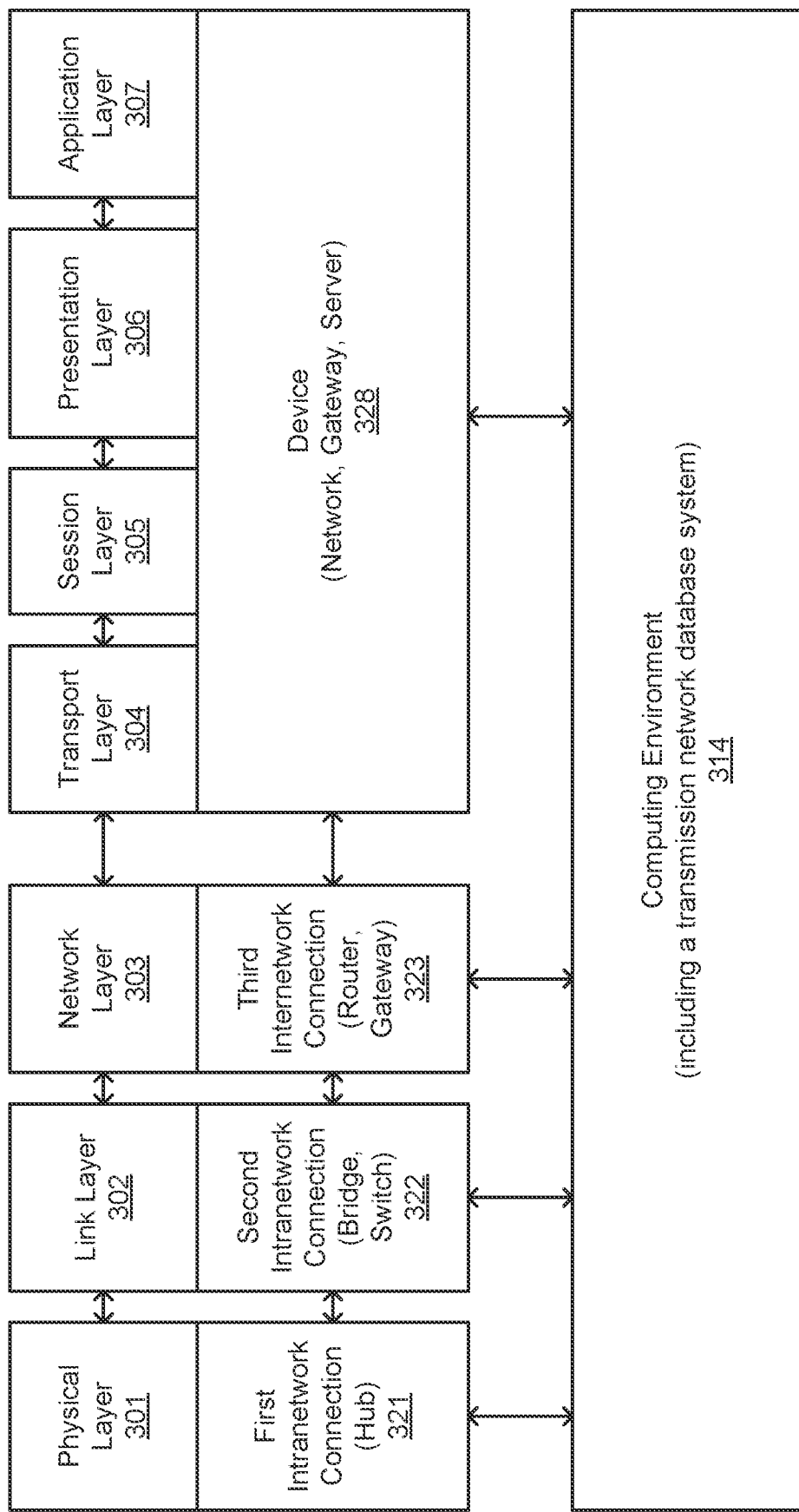
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
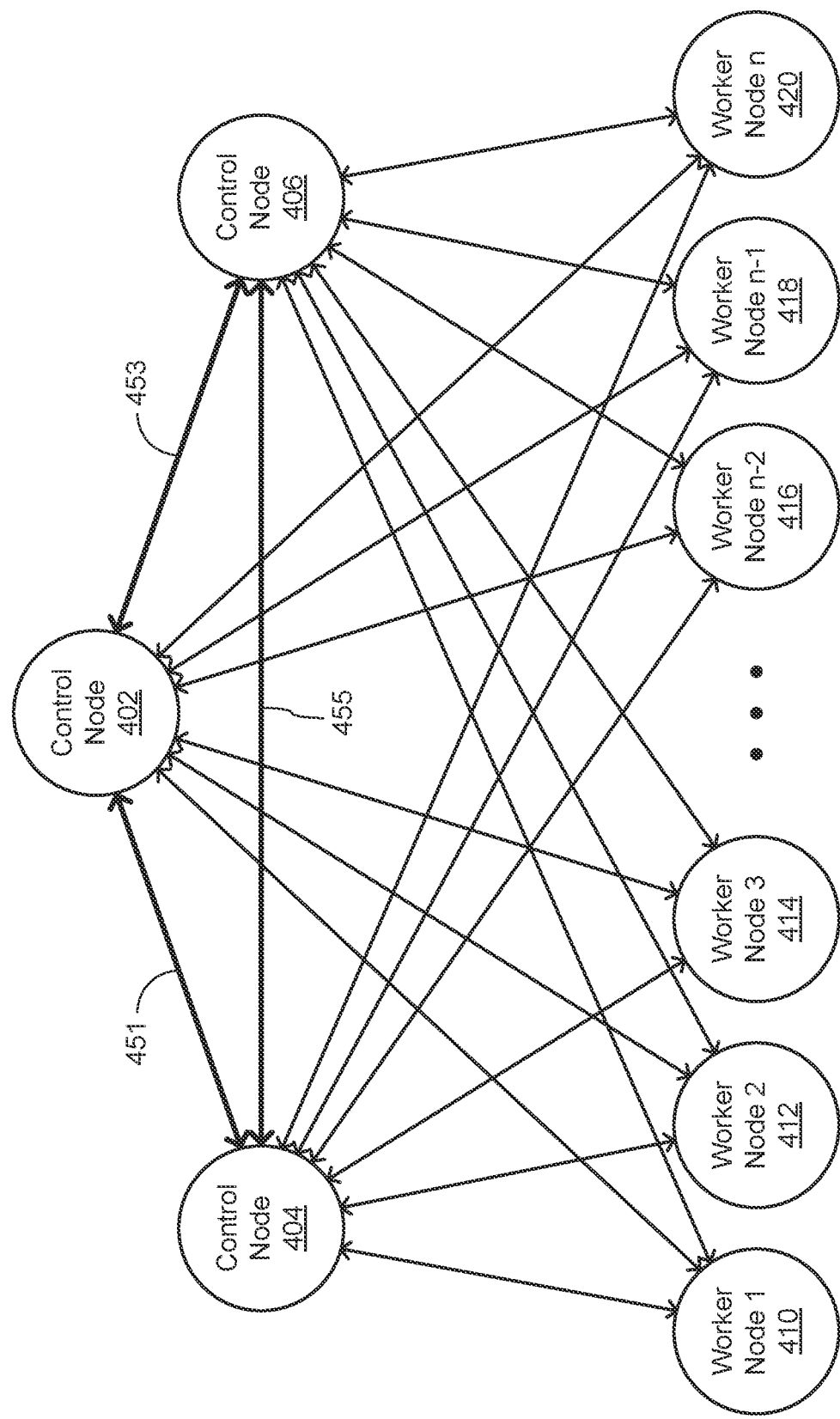
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
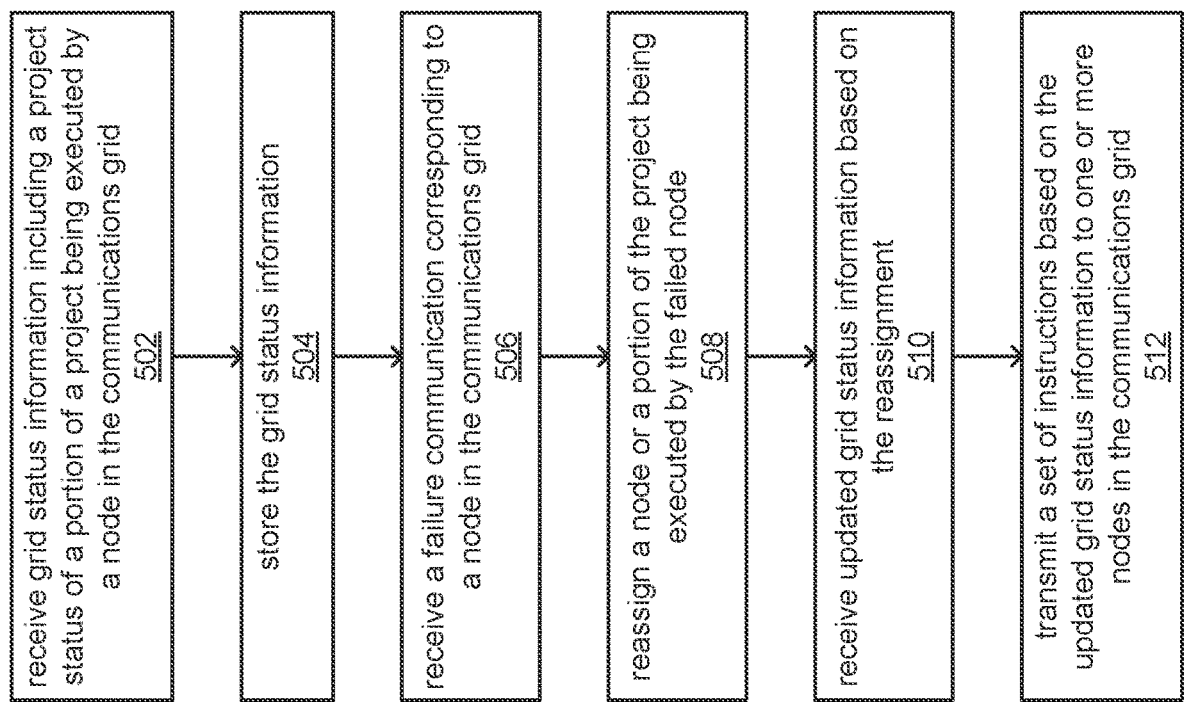
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
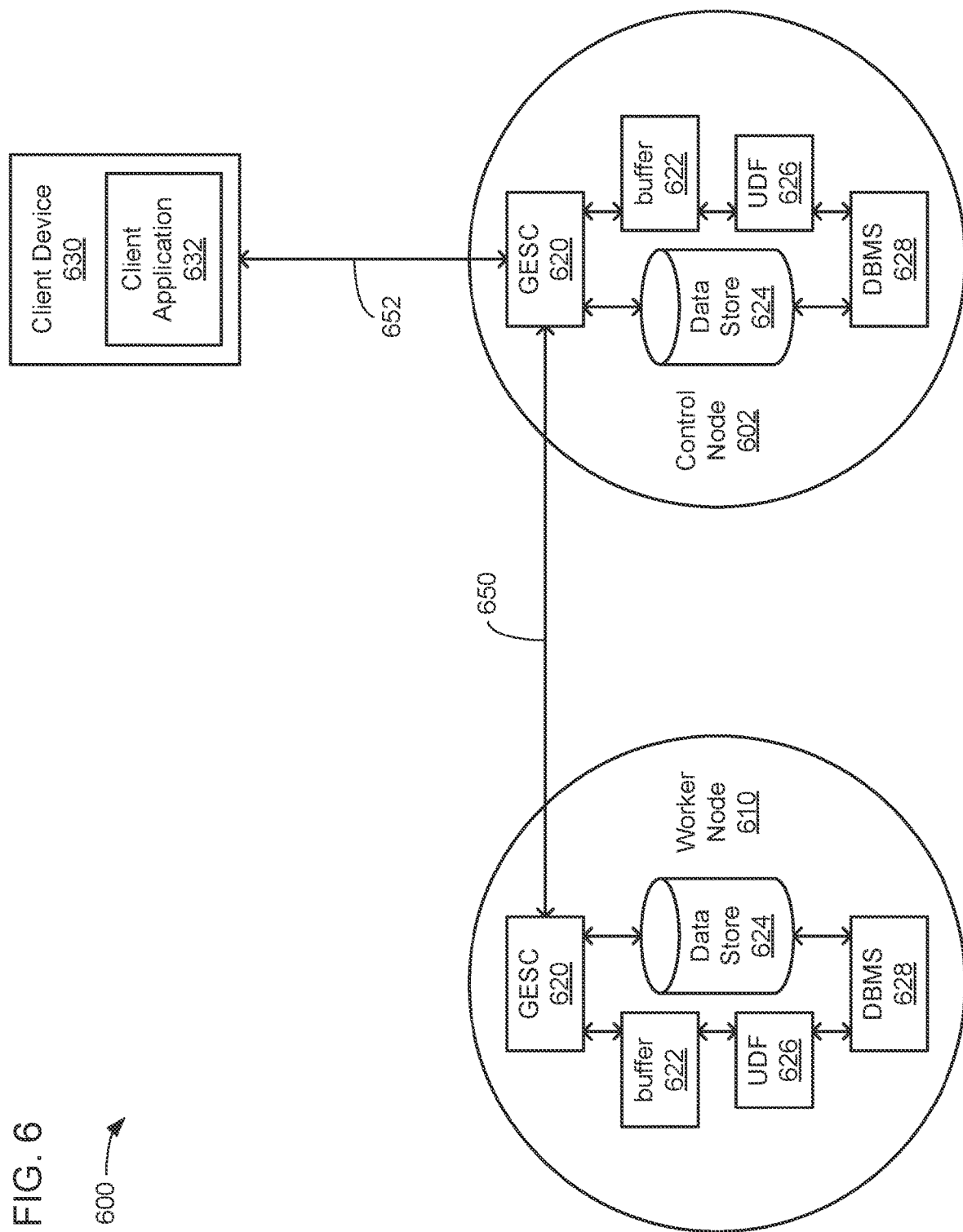
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
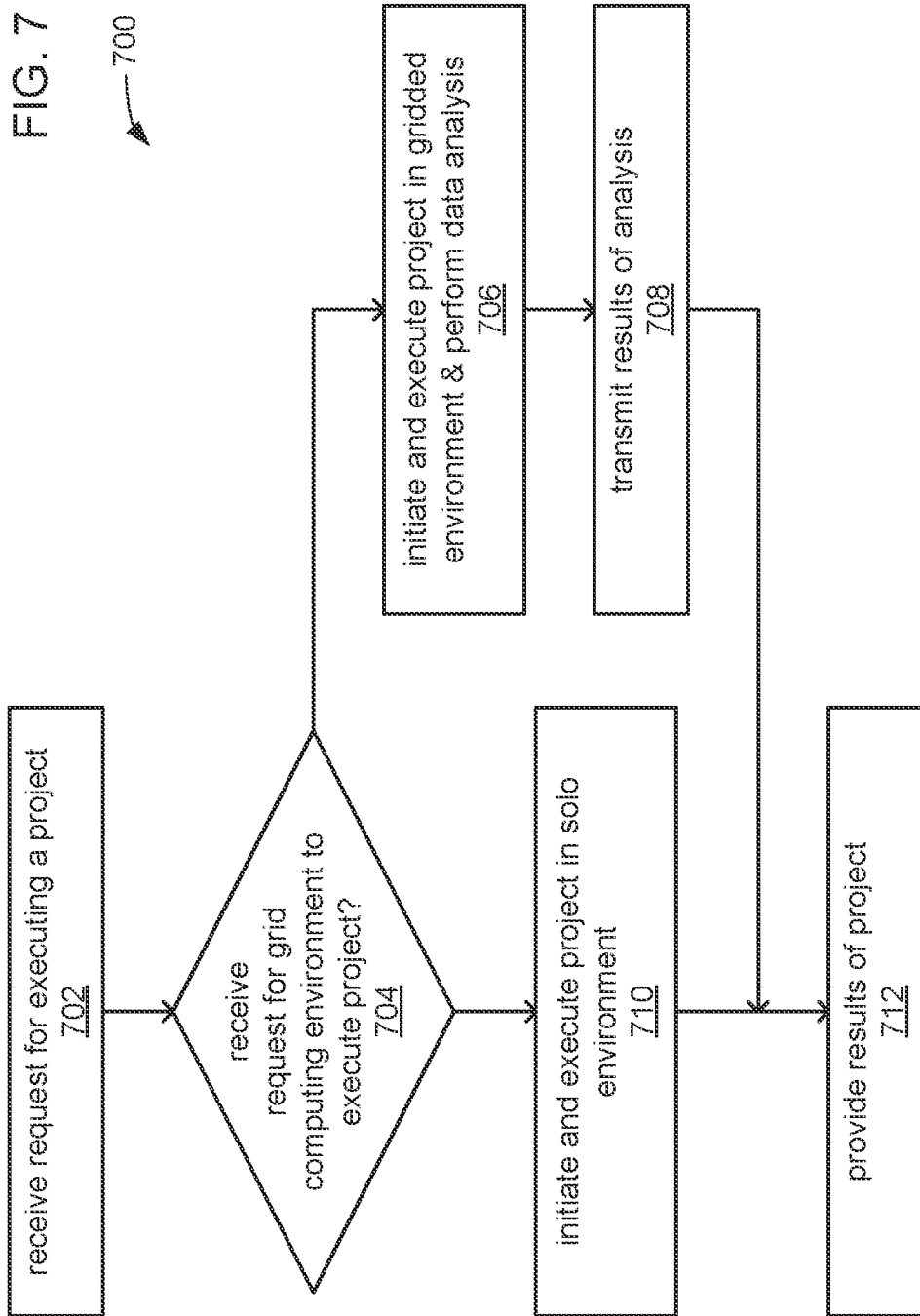
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a*-*c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE Boo may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device.

The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
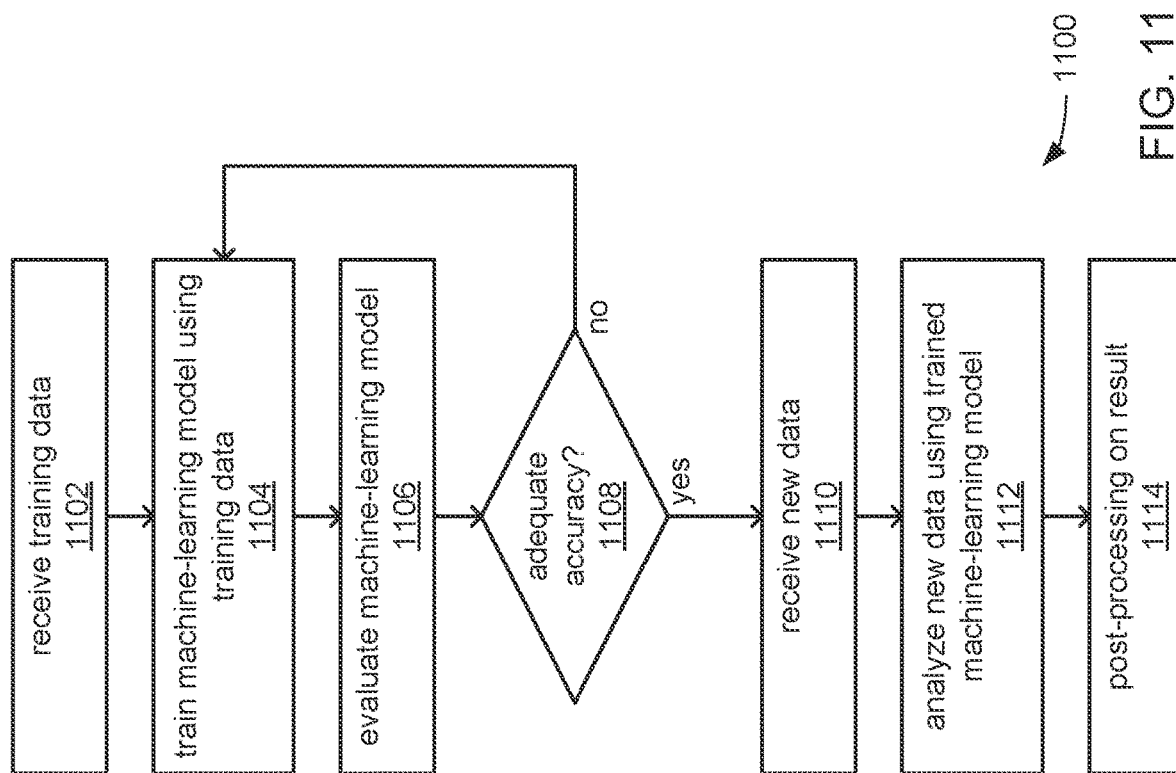
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
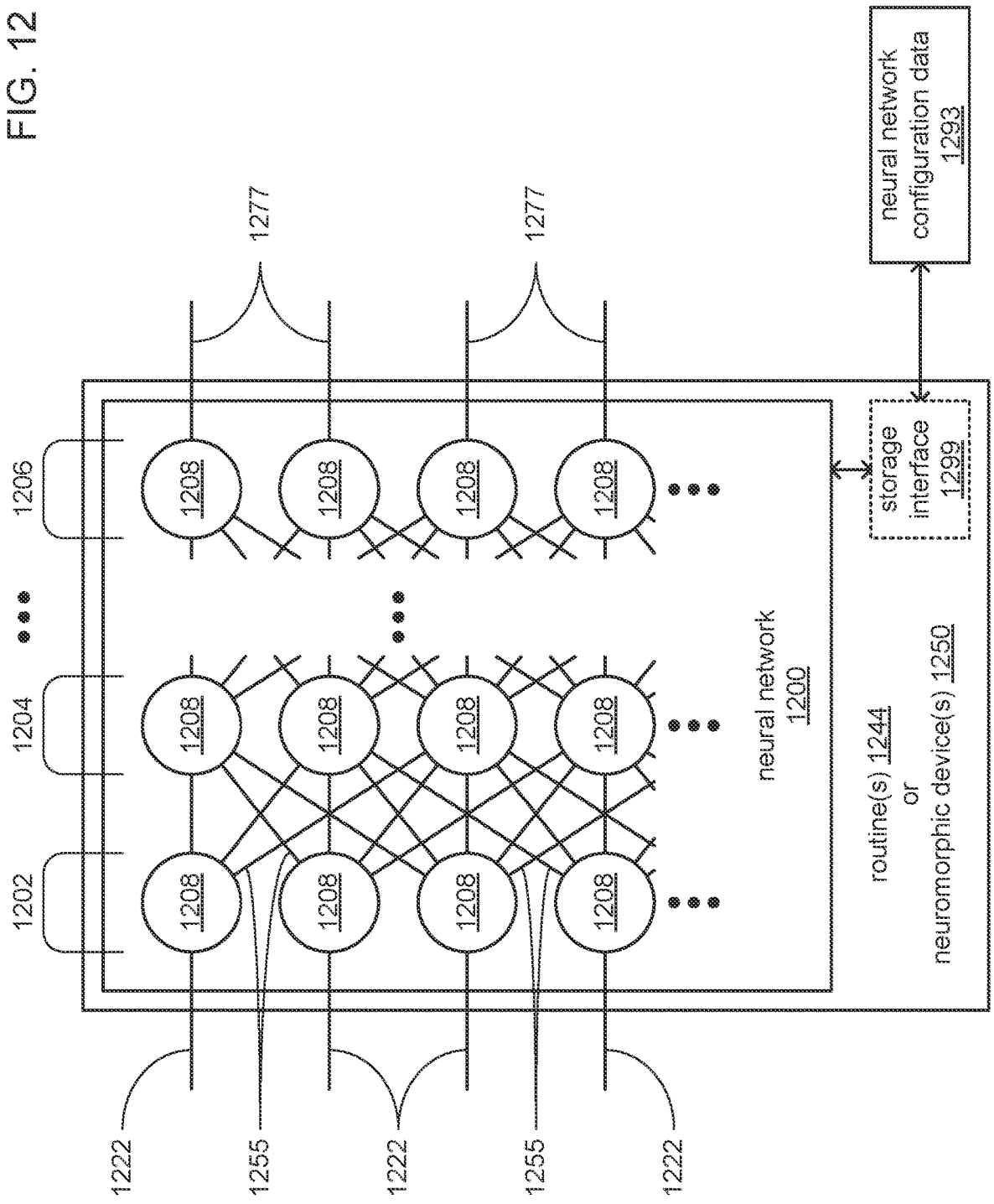
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
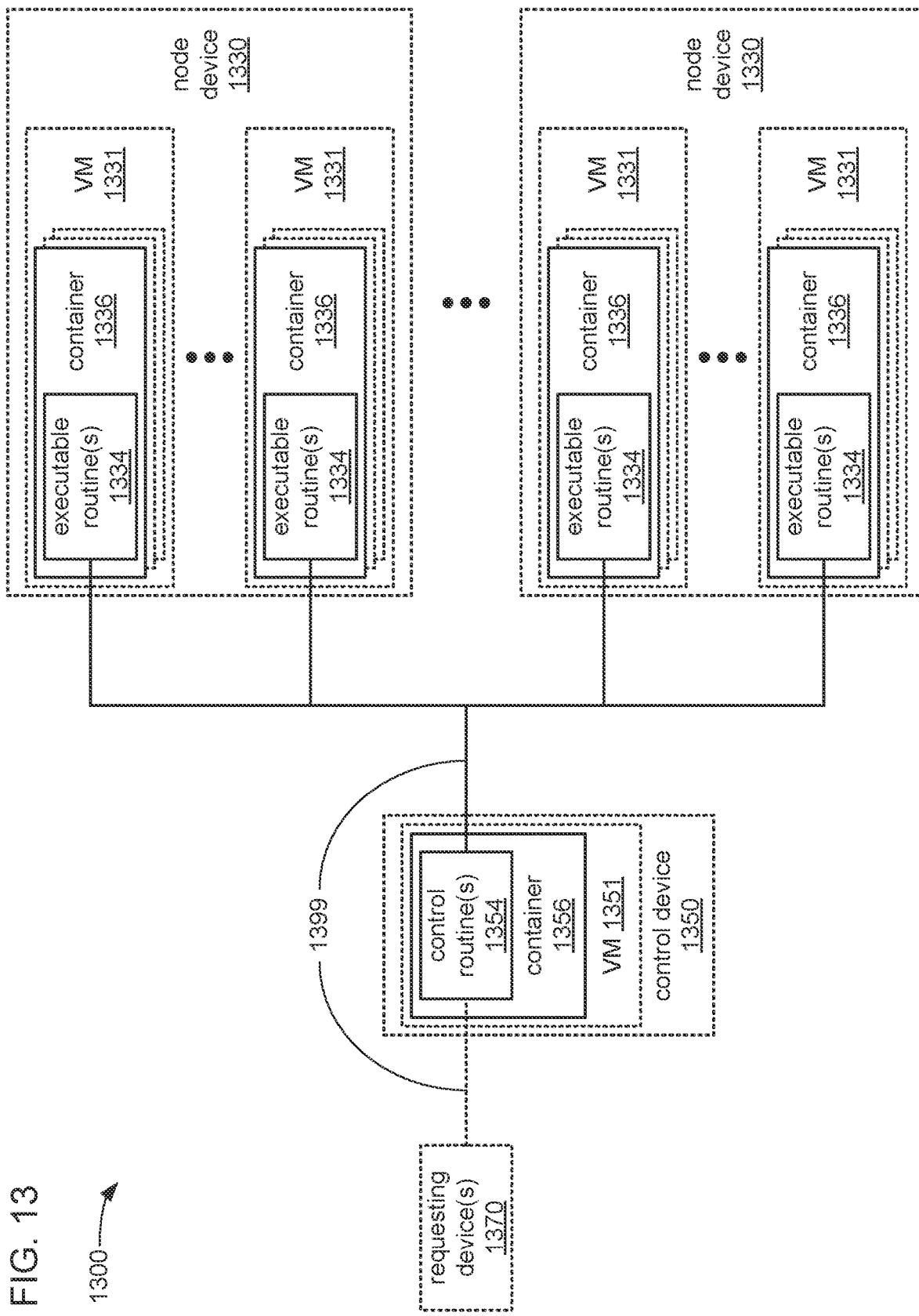
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

Method for Configuring a Machine Learning-Based Taxonomy Classifier

Figure 14:
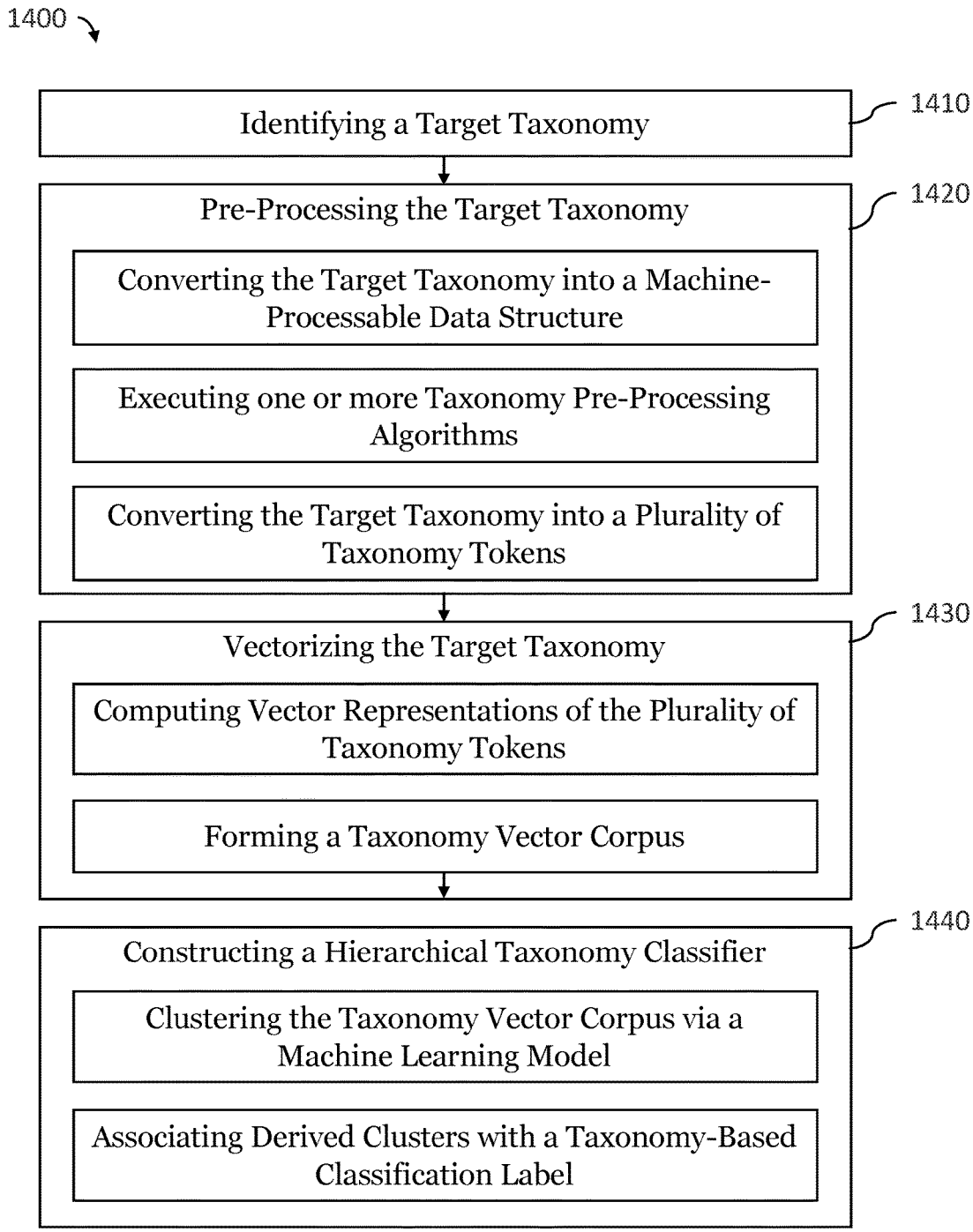
FIG. 14 illustrates a flow chart showing an example process for configuring a machine learning-based taxonomy classifier, according to some embodiments of the present technology.

FIG. 14 illustrates one embodiment of a method 1400 for configuring a machine learning-based taxonomy classifier. It will be appreciated that other examples contemplated within the scope of the present disclosure may involve more operations, fewer operations, different operations, or a different order of operations than is shown in FIG. 14.

Identifying a Target Taxonomy

In some embodiments, the method 1400 may include process 1410. Process 1410, which may include identifying a target taxonomy, may function to source or obtain a pre-constructed taxonomy for classifying one or more unlabeled structured datasets. In some embodiments, a pre-constructed taxonomy (or sometimes referred to herein as "target taxonomy"), as generally referred to herein, may relate to a scheme of categorization (or classification) in which one or more categories, entities, hypernyms, hyponyms, and/or the like are organized according to their relation to one another.

Figure 15:
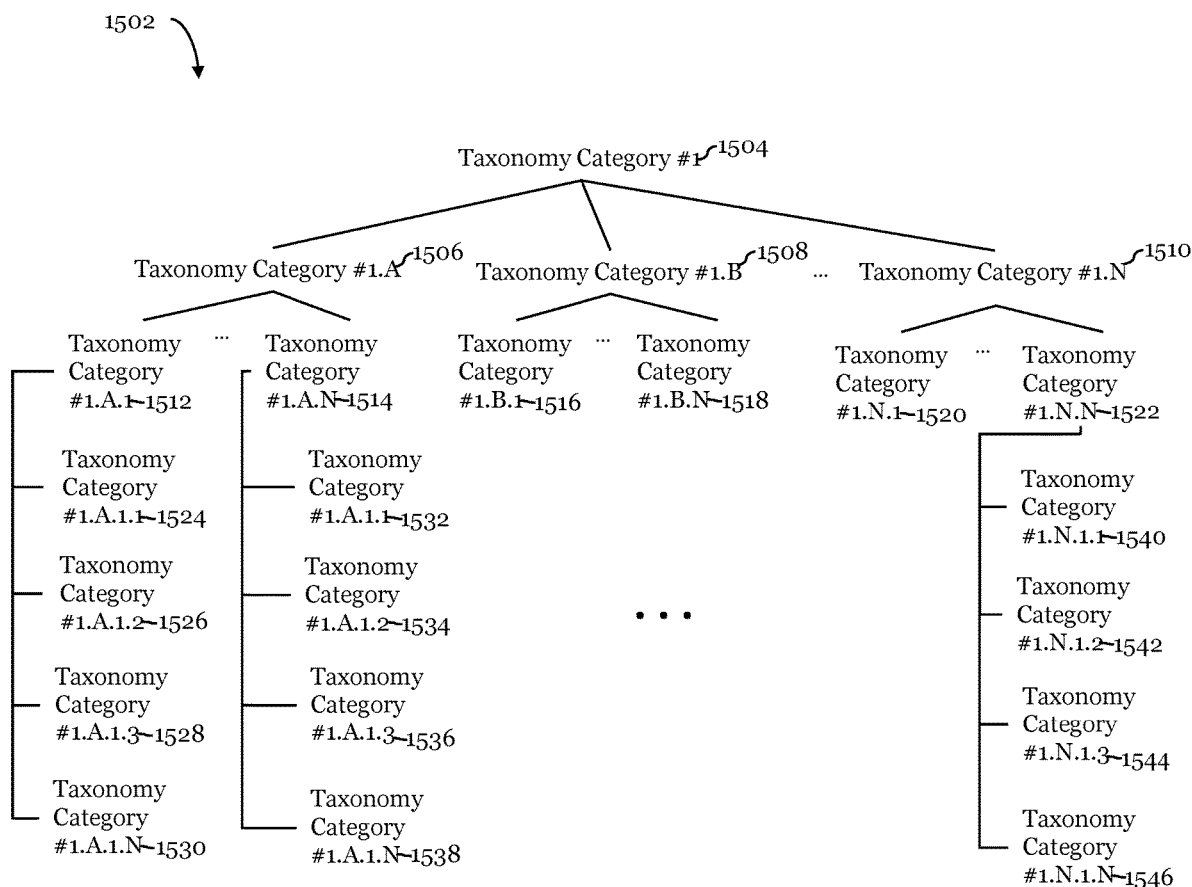
FIG. 15 illustrates an example structure of a taxonomy obtained by one or more processors, according to some embodiments of the present technology.

For instance, as generally illustrated in FIG. 15, in some embodiments, a target taxonomy 1502 identified via one or more processors of process 1410 may comprise one or more hierarchical taxonomy categories 1504-1546, including a root taxonomy category 1504 (e.g., Taxonomy Category #1) and/or one or more hierarchical taxonomy categories 1506-1546 directly (or indirectly) associated with the root taxonomy category 1504. It shall be noted that, in some portions of the disclosure, a location of a taxonomy category in the target taxonomy 1502 may be defined by its respective position in the target taxonomy 1502. For instance, in a non-limiting example, the root taxonomy category 1504 (e.g., Taxonomy Category #1) may be described as being located at "level 0" in the target taxonomy 1502 and taxonomy categories 1506-1510 (e.g., Taxonomy Categories #1.A-#1.N) may be described as being located at "level 1" in the target taxonomy 1502.

Furthermore, in some embodiments, the root taxonomy category 1504 may be a hypernym that is related to one or more hyponyms in the target taxonomy 1502 (e.g., taxonomy categories 1506-1510). Thus, in general, a respective taxonomy category in the target taxonomy 1502 may be a root taxonomy category (e.g., is not a hyponym of another taxonomy category), may be a "leaf" taxonomy category (e.g., is not related to any hyponyms), may be a hypernym that is related to one or more hyponyms defined in the target taxonomy 1502, or may be a hyponym that is related to one or more hypernyms defined in the target taxonomy 1502.

Accordingly, in some embodiments, the one or more taxonomy categories 1504-1546 of the target taxonomy 1502 may be arranged or organized in a hierarchal manner, such that taxonomy categories located at a deeper level in the target taxonomy 1502 are a sub-domain (e.g., hyponym) of at least one of the taxonomy categories (e.g., hypernyms) located at a preceding level in the target taxonomy 1502.

System Default Taxonomy

In some embodiments, identifying the target taxonomy 1502 may include identifying (e.g., retrieving), via one or more processors of process 1410, a default taxonomy of a system or service implementing the method 1400. In one example of such embodiments, the default taxonomy of the system or service may be defined by a user of the system or service (e.g., the system described in FIGS. 1-13, a data quality and governance system, and/or the like). Additionally, or alternatively, in a second example of such embodiments, the default taxonomy of the system or service may be defined by a creator, administrator, or owner of the system or service.

In some embodiments, when the target taxonomy 1502 relates or corresponds to the default taxonomy of the system or service, the target taxonomy 1502 may be a comprehensive, general purpose taxonomy that can be used for classifying a diverse set of unlabeled structured datasets. For instance, in a non-limiting example, the target taxonomy 1502 may correspond or relate to a taxonomy maintained or created by Schema.org, may correspond or relate to an open-source taxonomy maintained by an industry consortium, may correspond or relate to a taxonomy maintained by a content developer (e.g., a curated GDPR taxonomy), and/or the like. Accordingly, in some embodiments, a target taxonomy 1502 may be sourced or derived from any suitable remote or external source of taxonomy data (e.g., a third-party creator of taxonomies) including pre-existing or pre-determined taxonomies, which is preferably distinct from taxonomies derived from sources of training data samples or the like. It shall be recognized that in such embodiments a target taxonomy may not be sourced from a corpus of unlabeled structured datasets, as sometimes referenced herein, but rather created or sourced independently of a dataset of samples that may be the subject of classification or the like. It shall also be noted that some of the technical advantages achieved by identifying a general purpose taxonomy may include, but may not be limited to, reducing the burden on a user to create a comprehensive taxonomy suitable for classifying a plurality of unlabeled structured datasets; reducing the total amount of (e.g., setup) time required until the system or service implementing the method 1400 is configured to classify a volume of unlabeled structured datasets, reducing or eliminating a need to source or create one or more training corpora of labeled data samples for training specific supervised or semi-supervised machine learning models for classifying a plurality of unlabeled structured datasets, which in turn preserves computing time and various computing resources required for sample labeling and machine learning algorithm or model training, and/or the like.

User-Defined Taxonomy

Additionally, or alternatively, in some embodiments, the target taxonomy 1502 may be identified based on the one or more processors of process 1410 detecting that a user has uploaded the target taxonomy 1502 to the system or service implementing the method 1400. In one example of such embodiments, to interface with a user, the one or more processors of process 1410, may implement one or more graphical user interfaces (GUIs), one or more command line interfaces (CLIs), one or more application programming interfaces (APIs), and/or the like that are specifically configured to obtain one or more taxonomies from a user.

In some embodiments, when the target taxonomy 1502 is provided by a user, the target taxonomy 1502 may have been specifically constructed by the user or by an entity associated with the user, may define a plurality of possible taxonomy classes or categories associated with (e.g., germane to) the user, and/or may define a plurality of taxonomic relationships between the plurality of possible taxonomy classes or categories (as described previously with respect to FIG. 15). It shall also be noted that some of the technical advantages achieved from obtaining the target taxonomy 1502 from a user may include, but may not be limited to, enabling a machine-learning based taxonomy classifier (as described in process 1440) to classify unlabeled structured datasets based on vocabulary (e.g., terminology) familiar to the user.

Pre-Processing the Target Taxonomy

In some embodiments, the method 1400 may include process 1420. Process 1420, which may include pre-processing the target taxonomy 1502, may function to prepare the target taxonomy 1502 for input into one or more downstream processes of the method 1400. That is, in some embodiments, one or more processors of process 1420 may function to transform, convert, and/or arrange at least a subset of the data underpinning the target taxonomy 1502 into an input data structure that can be provided to one or more machine learning models and/or algorithms implemented at process 1430 and/or process 1440.

Converting the Target Taxonomy into a Machine-Readable Format

Figure 16:
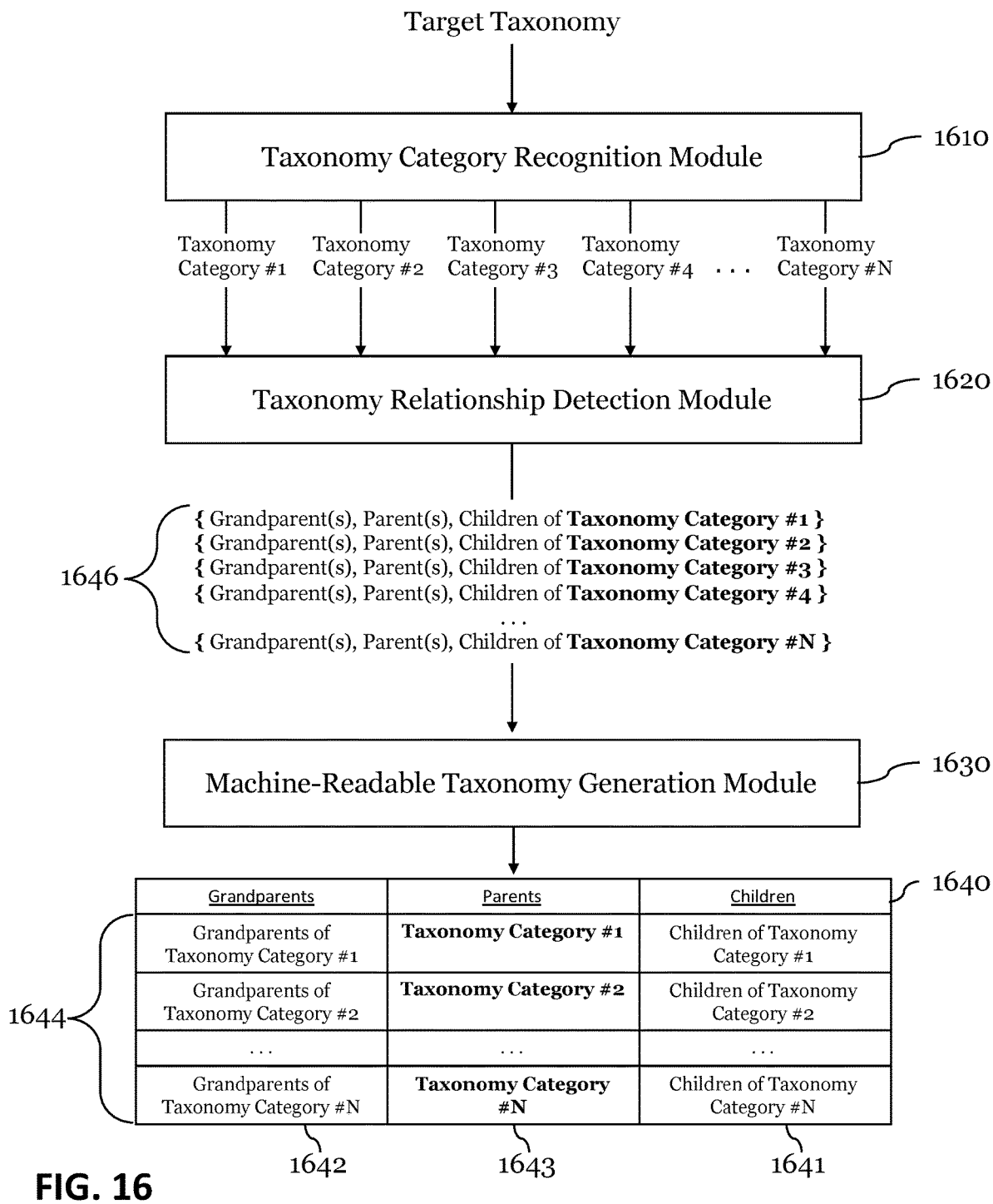
FIG. 16 illustrates an example schematic for converting a taxonomy into a machine-readable format, according to some embodiments of the present technology.

In some embodiments, as generally illustrated in FIG. 16, pre-processing the target taxonomy 1502 may include converting the target taxonomy 1502 into a machine-readable data structure. In one example of such embodiments, converting the target taxonomy 1502 into a machine-readable data structure may include instantiating, via one or more processors of process 1420, a data structure 1640 suitable for storing taxonomy data (e.g., attributes of the target taxonomy 1502, hypernyms defined in the target taxonomy 1502, hyponyms defined in the target taxonomy 1502, relationships defined in a target taxonomy 1502, etc.).

In some embodiments, instantiating the data structure 1640 via the one or more processors of process 1420 may include instantiating a tabular data structure, a data table, or any other suitable data structure comprising one or more rows and one or more columns. In one example of such embodiments, as generally illustrated in FIG. 16, the instantiated data structure 1640 may include a first column 1641 that stores the distinct children (e.g., hyponyms) related to a target taxonomy category, a second column 1642 that stores the distinct grandparents of a target taxonomy category (e.g., the hypernym(s) associated with a target taxonomy category), and/or a third column 1643 that stores an identifier (ID) associated with a target taxonomy category (e.g., a name of the target taxonomy category). Furthermore, in some embodiments, instantiating the data structure 1640 may include initializing the data structure 1640 to include a total number of rows 1644 equivalent to a total number of taxonomy categories included at a respective level in the target taxonomy 1502 and/or may include initializing the data structure 1640 to include a total number of rows 1644 equivalent to a total number of taxonomy categories included in the target taxonomy 1502.

It shall be noted that the above examples are not intended to be limiting and that the one or more processors of process 1420 may function to instantiate the data structure 1640 with additional, different, or fewer columns and rows without departing from the scope of the invention(s) contemplated herein. Similarly, it shall also be understood that other types of data structures may additionally, or alternatively, be instantiated by the one or more processors of process 1420 without departing from the scope of the invention(s) contemplated herein, including, but not limited, tuple-storing data structures, multi-reference data tables, and/or the like.

Taxonomy Category Recognition Module

In some embodiments, converting the target taxonomy 1502 into a machine-readable data structure may include implementing, via one or more processors of process 1420, a taxonomy category recognition module 1610. As generally illustrated in FIG. 16, the one or more processors of process 1420 may function to provide, as input to the taxonomy category recognition module 1610, a human-readable taxonomy or a machine-readable taxonomy (e.g., the target taxonomy 1502), which in turn, may cause the taxonomy category recognition module 1610 to output the one or more taxonomy categories defined in the inputted taxonomy.

In some embodiments, upon receiving the target taxonomy 1502 as input, the taxonomy category recognition module 1610 may function to detect the one or more hypernyms and/or the one or more hyponyms (e.g., taxonomy categories) existing in the target taxonomy 1502 via one or more optical character recognition (OCR) machine learning models, one or more word detection models, one or more phrase detection models, one or more word detection heuristics, one or more phrase detection heuristics, and/or the like.

Additionally, or alternatively, in some embodiments, if the target taxonomy 1502 is in a machine-readable format, the one or more processors of process 1420 may function to identify the one or more taxonomy categories (e.g., hypernyms and/or hyponyms) defined within the target taxonomy 1502 by referencing a metadata file associated with the target taxonomy 1502. For instance, in a non-limiting example, to identify the one or more taxonomy categories defined in the target taxonomy 1502, the one or more processors of process 1420 may function to search the metadata file for attributes or properties tagged as a "taxonomy category" (or the like).

Taxonomy Relationship Detection Module

Additionally, or alternatively, in some embodiments, converting the target taxonomy 1502 into a machine-readable data structure may include implementing a taxonomy relationship detection module 1620. As generally illustrated in FIG. 16, the one or more processors of process 1420 function to provide, as input to the taxonomy relationship detection module 1620, the one or taxonomy categories detected via the taxonomy category recognition module 1610. In some embodiments, based on receiving, as input, the one or taxonomy categories detected via the taxonomy category recognition module 1610, the taxonomy relationship detection module 1620 may function to compute, as output, the taxonomy relationships 1646 corresponding to each of the one or more taxonomy categories provided as input.

In some embodiments, to identify the taxonomy relationships 1646 for a target taxonomy category, the taxonomy relationship detection module 1620 may function to reference (e.g., access) a metadata file associated with the target taxonomy 1502. The metadata file associated with the target taxonomy 1502 may store data indicating the distinct parents (e.g., hypernyms) of a target taxonomy category and/or may store data indicating the distinct children (e.g., hyponyms) of a target taxonomy category—if such taxonomy relationships exist.

Accordingly, in such an example, the taxonomy relationship detection module 1620 may function to identify the parents and/or children of a respective taxonomy category by performing a search for such relationship data in the metadata file. It shall also be noted that additional, fewer, or different taxonomy relationships (e.g., grandparent relationships, grandchildren relationships, etc.) may be derived for a target taxonomy category by performing one or more searches for such relationships in the metadata file and/or by (recursively) deriving such relationship information based on the relationship data stored in the metadata file.

Machine-Readable Taxonomy Generation Module

Additionally, or alternatively, in some embodiments, converting the target taxonomy 1502 into a machine-readable data structure may include implementing a machine-readable taxonomy generation module 1630. The machine-readable taxonomy generation module 1630, as generally illustrated in FIG. 16, may function to receive, as input, one or more taxonomy relationships 1646 and, in turn, store each received taxonomy relationship in a distinct row of a machine-readable taxonomy data structure (e.g., data structure 1640).

In some embodiments, the machine-readable taxonomy generation module 1630 may function to install such taxonomy relationship data into a previously created machine-readable data structure (e.g., if one has been previously instantiated by the process 1420) or may function to install such taxonomy data into a newly instantiated machine-readable data structure (e.g., if one has not been previously instantiated by the process 1420).

Tokenizing the Target Taxonomy

Figure 17:
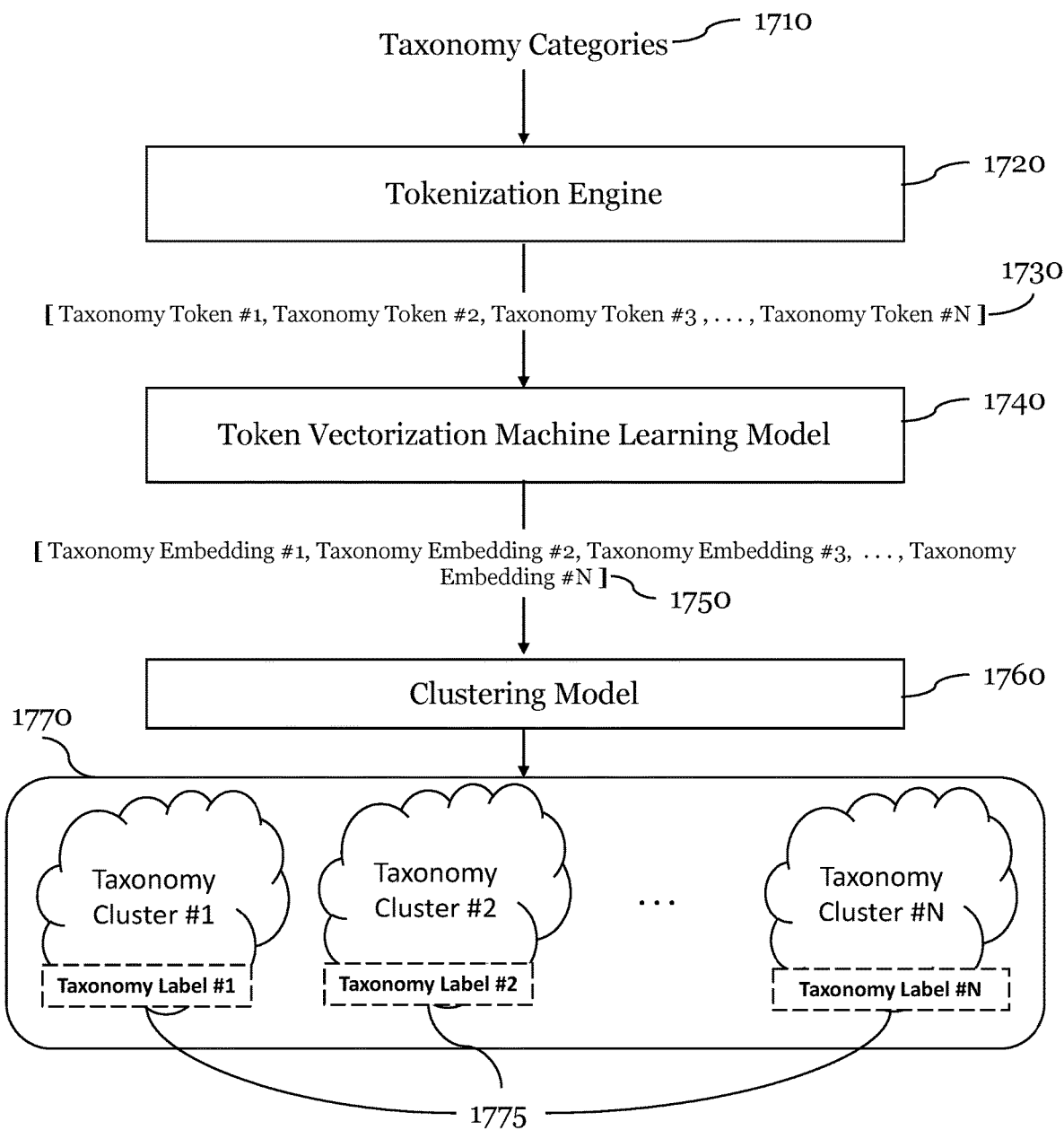
FIG. 17 illustrates an example schematic for constructing a taxonomy classifier, according to some embodiments of the present technology.

Additionally, or alternatively, in some embodiments and as generally illustrated in FIG. 17, preparing the target taxonomy 1502 for downstream processing may include tokenizing the target taxonomy 1502 into a plurality of distinct taxonomy tokens 1730. In one example of such embodiments, to tokenize the target taxonomy 1502, the one or more processors of process 1420 may route the one or more taxonomy categories 1710 defined in the target taxonomy 1502 to a tokenization engine 1720. The tokenization engine 1720, in turn, may function to convert the one or more taxonomy categories 1710 provided as input into a plurality of taxonomy tokens 1730 based on one or more tokenization heuristics governing the tokenization engine 1720.

Compound Taxonomy Category Splitting Heuristic

In some embodiments, the tokenization engine 1720 may function to implement a compound taxonomy category splitting heuristic. The compound taxonomy category splitting heuristic may be (e.g., selectively) activated for each taxonomy category, provided to the tokenization engine 1720, that includes a compound word. For instance, in a non-limiting example, if the tokenization engine 1720 identifies that a first taxonomy category and a second taxonomy category of the one or more taxonomy categories 1710 include at least one compound word, the tokenization engine 1720 may function to activate the taxonomy category splitting heuristic for the first taxonomy category and the second taxonomy category and, optionally, deactivate the compound taxonomy category splitting heuristic for other taxonomy categories of the one or more taxonomy categories 1710 that do not include at least one compound word.

Furthermore, in some embodiments, the compound taxonomy category splitting heuristic, when executed by the tokenization engine 1720, may function to decompose (e.g., split) a respective compound taxonomy category into a plurality of non-compound terms (e.g., words). For instance, in a non-limiting example, based on the tokenization engine 1720 receiving, sequentially or in bulk, a first and a second taxonomy category of the one or more taxonomy categories 1710 comprising the term(s) "bookstore" and "football stadium," respectively, the tokenization engine 1720 may tokenize the first taxonomy category to ["book", "store"] and tokenize the second taxonomy category to ["foot", "ball", "stadium"].

Thus, in some embodiments, the plurality of distinct taxonomy tokens 1730 outputted by the tokenization engine 1720 may include one or more taxonomy tokens derived from decomposing each provided compound taxonomy category into one or more non-compound taxonomy categories.

Lemmatization Algorithm and Stemming Algorithm

Additionally, or alternatively, in some embodiments, the tokenization engine 1720 may function to implement a lemmatization algorithm and/or a stemming algorithm. The lemmatization algorithm may function to convert each of the one or more taxonomy categories 1710 provided, as input, to the tokenization engine 1720 into its respective lemma. For instance, in a non-limiting example, based on the tokenization engine 1720 receiving, sequentially or in bulk, a first and a second taxonomy category of the one or more taxonomy categories 1710 comprising the term(s) "watches" and "earrings," respectively, the tokenization engine 1720 may tokenize the first taxonomy category to ["watch"] and tokenize the second taxonomy category to ["earring"].

Similarly, the stemming algorithm may function to convert each of the one or more taxonomy categories 1710 provided, as input, to the tokenization engine 1720 into its respective base or root. For instance, in a non-limiting example, based on the tokenization engine 1720 receiving, sequentially or in bulk, a first and a second taxonomy category of the one or more taxonomy categories 1710 comprising the term(s) "consulting" and "playing," respectively, the tokenization engine 1720 may tokenize the first taxonomy category to ["consult"] and tokenize the second taxonomy category to ["play"].

Thus, in some embodiments, the plurality of distinct taxonomy tokens 1730 outputted by the tokenization engine 1720 may include one or more taxonomy tokens derived from stemming and/or lemmatizing each taxonomy category provided to the tokenization engine 1720. Furthermore, it shall also be noted that, in some portions of the disclosure, the plurality of taxonomy tokens 1730 produced, by the tokenization engine 1720, may referred to as a "taxonomy token corpus."

Taxonomy Token Normalization

Additionally, or alternatively, in some embodiments, the one or more processors of process 1420 may function to normalize the plurality of taxonomy tokens 1730 produced by the tokenization engine 1720. In one example of such embodiments, normalizing the plurality of taxonomy tokens 1730 may include comparing each taxonomy token, produced by the tokenization engine 1720, against a target vocabulary corpus. That is, in some embodiments, the one or more processors of process 1420 may function to check the existence of each taxonomy token, produced by the tokenization engine 1720, in the target vocabulary corpus.

In some embodiments, if the one or more processors of process 1420 determine that a first subset of the plurality of distinct taxonomy tokens 1730 do not exist in the target vocabulary corpus, the one or more processors of process 1420 may function to remove the first subset of taxonomy tokens from the plurality of distinct taxonomy tokens 1730 (e.g., remove the first subset of taxonomy tokens from the taxonomy token corpus). Conversely, in some embodiments, if the one or more processors of process 1420 determine that all of the taxonomy tokens in the plurality of distinct taxonomy tokens 1730 (e.g., taxonomy token corpus) exist in the target vocabulary corpus, the one or more processors of process 1420 may function to forgo removing any taxonomy tokens from the plurality of distinct taxonomy tokens 1730 (e.g., taxonomy token corpus).

It shall be noted that, in some embodiments, the target vocabulary corpus referenced or accessed by the one or more processors of process 1420 may at least include a portion of the training corpora used for training one or more of the word embedding or vectorization models described herein.

Computing a Taxonomy Vector Corpus

In some embodiments, the method 1400 may include process 1430. Process 1430, which may include computing a taxonomy vector corpus 1750, may function to compute or generate the taxonomy vector corpus 1750 based on the plurality of distinct taxonomy tokens 1730 generated by the tokenization engine 1720. In some embodiments, as will be described in more detail herein, the taxonomy vector corpus 1750 may include a vector representation (e.g., embedding value) corresponding to each distinct taxonomy token in the plurality of distinct taxonomy tokens 1730.

In some embodiments, to compute the taxonomy vector corpus 1750, one or more processors of process 1430 may function to implement a token vectorization machine learning model 1740. In one example of such embodiments, the token vectorization machine learning model 1740 may be an unsupervised language model (e.g., a transformer model, embeddings model, GLOVE model, BERT model, FastText model, Elmo model, and/or the like) that is configured to receive one or more taxonomy tokens (e.g., words) as input and generate, as output, an embedding value corresponding to each of the one or more taxonomy tokens (e.g., words) provided as input. In some embodiments, the embedding value(s) computed by the token vectorization model 1740 may be an n-dimensional (e.g., numerical) vector whose values are based on an n-dimensional space familiar to, known, and/or used by the token vectorization machine learning model 1740.

Accordingly, in some embodiments, computing the taxonomy vector corpus 1750 may include providing, sequentially or in bulk, each taxonomy token included in the plurality of distinct taxonomy tokens 1730 to the token vectorization machine learning model 1740, which in turn, may cause the token vectorization machine learning model 1740 to convert each provided taxonomy token to a vector value in an n-dimensional space.

Forming the Taxonomy Vector Corpus

Furthermore, in some embodiments, the one or more processors of process 1430 may function to form (e.g., construct) the taxonomy vector corpus 1750. In one example of such embodiments, forming the taxonomy vector corpus 1750 may include collecting the one or more taxonomy embedding values generated by the token vectorization model 1740 and/or may include storing the collected taxonomy embedding values into a suitable data structure (e.g., a data structure capable of storing embedding values). It shall be noted that, in some embodiments, the collective output of the token vectorization machine learning model may, in some embodiments, form the taxonomy vector corpus 1750.

Constructing a Taxonomy Classifier

In some embodiments, the method 1400 may include process 1440. Process 1440 which may include constructing a taxonomy classifier, may function to configure a machine learning-based classifier to classify unlabeled structured datasets according to the target taxonomy 1502 (identified by process 1410). That is, in some embodiments, the one or more processors of process 1440 may function to construct a (e.g., hierarchal) taxonomy classifier that may be configured to classify an unlabeled structured dataset to at least one of the (e.g., hierarchal) taxonomy categories defined in the target taxonomy 1502. In a preferred embodiment, constructing a taxonomy classifier may include setting the target taxonomy 1502 as seeding for configuring a clustering model or clustering algorithm, as described herein with more details.

It shall be noted that an unlabeled structured dataset, as generally referred to herein, may relate to a dataset that stores data in a predefined format (e.g., a tabular format) and/or may relate to a dataset that has not yet been classified according to the target taxonomy 1502.

Clustering the Taxonomy Vector Corpus

In some embodiments, constructing the taxonomy classifier may include clustering the taxonomy vector corpus 1750 formed by process 1430 (as shown by way of example in FIG. 17). In one example of such embodiments, to cluster the taxonomy vector corpus 1750, the one or more processors of process 1440 may function to implement a clustering model 1760. The clustering model 1760, in some embodiments, may comprise or correspond to a k-means clustering algorithm that is configured to receive the taxonomy vector corpus 1750 as input and, in turn, cluster the taxonomy vector corpus 1750 into K taxonomy clusters.

In some embodiments, implementing the k-means clustering algorithm may include setting the value of K in the k-means clustering algorithm. In one example of such embodiments, the one or more processors of process 1440 may set the value of K based on a total number of taxonomy categories included in the target taxonomy 1502. For instance, in a non-limiting example, if the one or more processors of process 1440 compute or determine that the target taxonomy 1502 includes N taxonomy categories, the one or more processors of process 1440 may function to configure the k-means clustering algorithm to compute a total of N taxonomy clusters.

Additionally, or alternatively, in a second example of such embodiments, the one or more processors of process 1440 may set the value of K based on a total number of taxonomy categories included in a respective level of the target taxonomy 1502. For instance, in a non-limiting example, if the one or more processors of process 1440 compute or determine that a respective level of the target taxonomy 1502 includes M taxonomy categories, the one or more processors of process 1440 may function to configure the k-means clustering algorithm to compute a total of M taxonomy clusters.

Accordingly, in some embodiments, clustering the taxonomy vector corpus 1750 may include providing, via the one or more processors of process 1440, the taxonomy vector corpus 1750 to the k-means clustering algorithm. In turn, based on receiving the taxonomy vector corpus 1750 as input, the k-means clustering algorithm may function to cluster the taxonomy vector corpus 1750 into a predefined number of taxonomy clusters (e.g., based on the value set for K, as described above).

It shall be noted that, in some embodiments, the one or more processors of process 1440 may additionally, or alternatively, function to compute a centroid for each of the one or more taxonomy clusters 1770 generated by the clustering model 1760. A centroid of a target taxonomy cluster, as generally referred to herein, may relate to an imaginary or real location representing a center of a target taxonomy cluster.

It shall also be noted that, in some embodiments, the one or more processors of process 1440 may function to cluster the taxonomy vector corpus 1750 via other clustering algorithms, including, but not limited to, a density-based clustering algorithm, a distribution-based clustering algorithm, a fuzzy c-means clustering algorithm, a Latent Dirichlet Allocation (LDA) clustering algorithm, hierarchical clustering, Gaussian mixture models, PROC KCLUS, PROC CLUSTER, PROC, or any other suitable clustering algorithm.

Labeling the Taxonomy Clusters

Additionally, or alternatively, in some embodiments, constructing the taxonomy classifier may include assigning a distinct taxonomy category label 1775 to each of the taxonomy clusters 1770 computed via the clustering model 1760 (as illustrated by way of example in FIG. 17). In one example of such embodiments, the distinct taxonomy category label 1775 assigned to a respective taxonomy cluster may comprise the taxonomy category likely associated with (e.g., most similar to) the respective taxonomy cluster.

In some embodiments, assigning a taxonomy category label 1775 to a taxonomy cluster may include computing, via the token vectorization machine learning model 1740, an embedding value corresponding to the taxonomy category label 1775. Furthermore, in some embodiments, assigning a taxonomy category label 1775 to a taxonomy cluster may include computing a distance metric (e.g., cosine distance, Euclidean distance, or the like) between (e.g., a centroid of) the taxonomy cluster and a target set of taxonomy categories. In such an example, the taxonomy category label 1775 assigned to the taxonomy cluster may correspond to the taxonomy category that has the smallest distance to the taxonomy cluster as compared to the other taxonomy categories defined in the target taxonomy 1502.

Implementing the Taxonomy Classifier

Additionally, or alternatively, in some embodiments, the one or more processors of process 1440 may function to implement the constructed taxonomy classifier at a computer-implemented data classification system and/or may function to implement the constructed taxonomy classifier in at least one of the ways described in method 1800.

In some embodiments, implementing the taxonomy classifier at a computer-implemented data classification system may enable such a system to convert a plurality of unlabeled structured datasets to a plurality of taxonomy-labeled structured datasets (e.g., by mapping each unlabeled structured dataset to at least one of the plurality of distinct hierarchical taxonomy clusters of the hierarchical taxonomy classifier, as described in more detail in the method 1800).

Furthermore, in some embodiments, implementing the taxonomy classifier at the computer-implemented data classification system may enable such a system to output, to a graphical user interface in communication with the computer-implemented data classification system, at least one taxonomy-labeled structured dataset based on an input of a data classification query (as described in more detail in method 2300).

Method for Implementing a Machine Learning-Based Taxonomy Classifier

Figure 18:
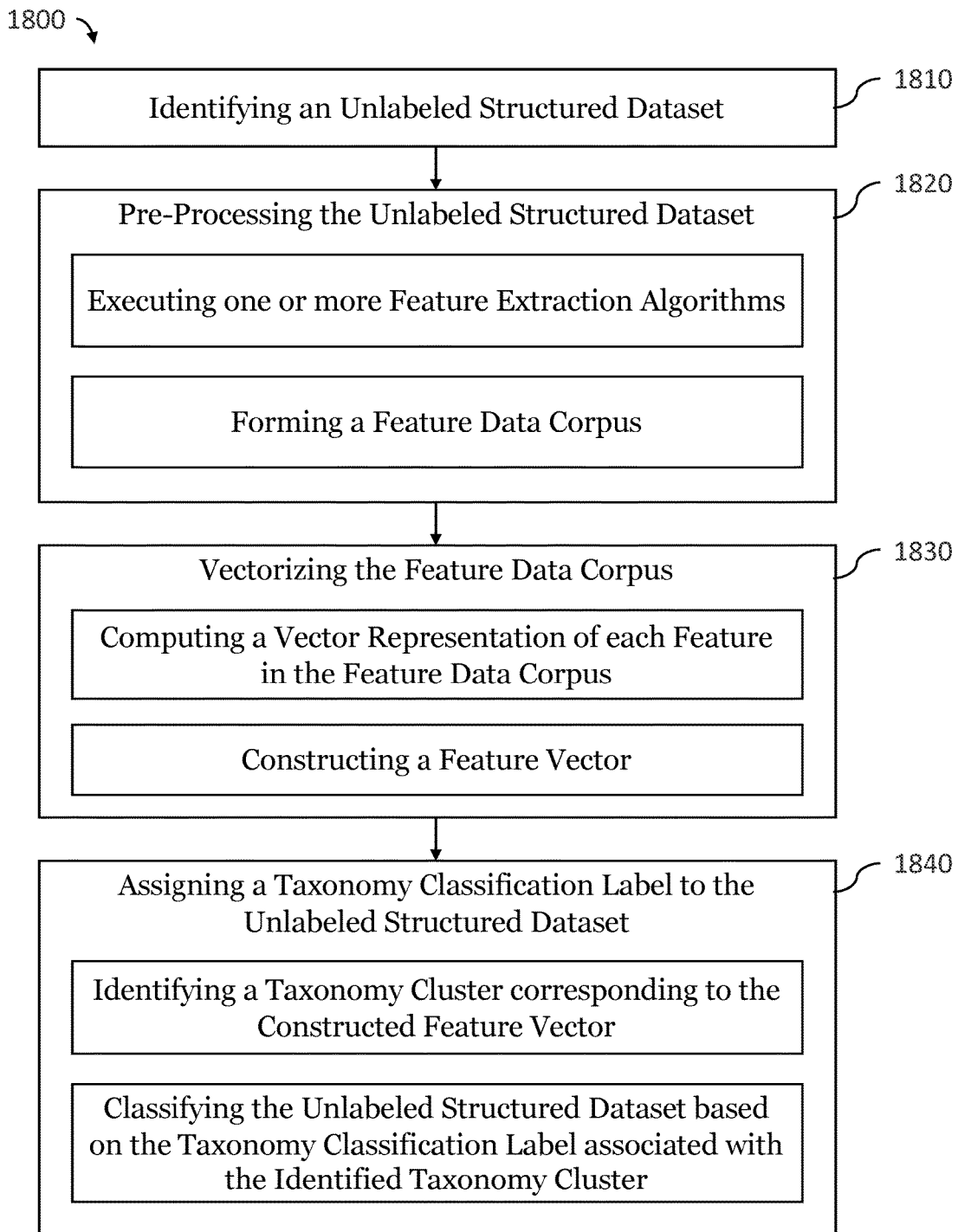
FIG. 18 illustrates a flow chart showing an example process for classifying one or more unlabeled structured datasets, according to some embodiments of the present technology.

FIG. 18 illustrates one embodiment of a method 1800 for implementing a machine learning-based taxonomy classifier. It will be appreciated that other examples contemplated within the scope of the present disclosure may involve more operations, fewer operations, different operations, or a different order of operations than is shown in FIG. 18.

Identifying a Structured Data Corpus

In some embodiments, the method 1800 may include process 1810. Process 1810, which may include identifying a structured data corpus 2110, may function to source or obtain a data corpus comprising one or more unlabeled structured datasets. In some examples, the one or more unlabeled structured datasets underpinning the structured data corpus 2110 may relate to datasets that have not yet been classified according to a target classification scheme or a target taxonomy (e.g., the target taxonomy 1502) and/or may relate to datasets that store data in a predefined manner (e.g., a tabular format).

For instance, in one embodiment, the structured data corpus 2110 may include one or more unlabeled tabular-based datasets, one or more unlabeled matrix-based datasets, one or more unlabeled multidimensional array-based datasets, one or more unlabeled CSV-based datasets, one or more unlabeled database tables, and/or the like. It shall also be noted that the above example is not intended to be limiting and that the structured data corpus 2110 may include additional, fewer, or different types of structured datasets without departing from the scope of the invention(s) contemplated herein.

System-Influenced Structured Data Corpus

In some embodiments, identifying the structured data corpus 2110 may include searching for one or more unlabeled structured datasets stored at one or more data sources (e.g., a database server, data warehouse, data lake, dataset hosting service, SAS® Viya™, and/or the like). In one example of such embodiments, to search for such unlabeled structured datasets, the one or more processors of process 1810 may function to execute an unlabeled structured dataset search operation at the one or more data sources. The unlabeled structured dataset search operation, when executed, may function to search for datasets according to system-generated or user-generated search criteria and/or may function to return one or more datasets matching such criteria as a result to the unlabeled structured dataset search operation. For instance, in a non-limiting example, the unlabeled structured dataset search operation may include search criteria that, when executed, causes the unlabeled structured dataset search operation to search for datasets by name, search for all (or a subset) of datasets stored in the one or more data sources, search for datasets relating to a target word or phrase, search for datasets created or modified during a target time window, and/or the like.

Accordingly, in some embodiments of the method 1800, the structured data corpus 2110 may include one or more datasets returned from the one or more search operation(s) executed by the one or more processors of process 1810. It shall also be noted that the above-described search criteria is not intended to be limiting and that the one or more processors of process 1810 may identify the structured data corpus 2110 by executing search operations with additional, different, or fewer search criteria.

User-Influenced Structured Data Corpus

Additionally, or alternatively, in some embodiments, the structured data corpus 2110 may be obtained from a user of a system or service implementing the method 1800. In one example of such embodiments, to obtain the structured data corpus 2110 from a user, the one or more processors of process 1810 may function to implement one or more graphical user interfaces (GUIs), one or more command line interfaces (CLIs), one or more application programming interfaces (APIs), and/or the like that are specifically configured to obtain or receive a structured data corpus from a user.

Accordingly, in some embodiments of the method 1800, the structured data corpus 2110 may include one or more datasets for which a user is explicitly requesting a taxonomy classification label.

Arrangement of the Structured Data Corpus

In some embodiments, each unlabeled structured dataset underpinning the structured data corpus 2110 may be stored or represented as a distinct entry in the structured data corpus 2110. For instance, in a non-limiting example, if the structured data corpus 2110 stores its respective data in a tabular arrangement (e.g., rows and columns), each row of the structured data corpus 2110 may correspond to a distinct unlabeled structured dataset.

Similarly, in some embodiments, the columns of the structured data corpus 2110 may correspond to distinct features or attributes of a target unlabeled structured dataset. For instance, in a non-limiting example, the structured data corpus 2110 may include a first column that stores a name associated with one or more columns in a respective unlabeled structured dataset, a second column that stores a description associated with the one or more columns in a respective unlabeled structured dataset, a third column that stores a name associated with a respective unlabeled structured dataset, a fourth column that stores a general description associated with a respective unlabeled structured dataset, a fifth column that stores one or more keywords associated with a respective unlabeled structured dataset, and/or the like.

Accordingly, in some embodiments, a respective row of the structured data corpus 2110 may store one or more features of a target unlabeled structured dataset, including, but not limited to, a name of one or more columns in the target unlabeled structured dataset, a description of one or more columns in the target unlabeled structured dataset, a name of the target unlabeled structured dataset, one or more keywords in the target unlabeled structured dataset, and/or the like.

It shall also be noted that the above examples are not intended to be limiting and that the structured data corpus 2110 may store one or more unlabeled structured datasets and the features associated with such datasets in a different manner without departing from the scope of the invention(s) contemplated herein.

Routing the Structured Data Corpus

Additionally, or alternatively, in some embodiments, upon or based on identifying the structured data corpus 2110, the one or more processors of process 1810 may function to route the structured data corpus 2110 to a taxonomy classification pipeline that may be configured to classify the one or more unlabeled structured datasets of the structured data corpus 2110 according to a target taxonomy (e.g., the target taxonomy 1502). Stated differently, once the structured data corpus 2110 is identified by the one or more processors of process 1810, the structured data corpus 2110 may be referenced or accessed by one or more downstream operations of the method 1800 (e.g., processes 1820, 1830, and/or 1840) for classifying the one or more unlabeled structured datasets to a target taxonomy.

Extracting Taxonomy-Aware Feature Data

In some embodiments, the method 1800 may include process 1820. Process 1820, which may include extracting taxonomy-aware feature data, may function to generate a distinct taxonomy-aware feature data corpus 1930 for each unlabeled structured dataset of the structured data corpus 2110. In some embodiments, a taxonomy-aware feature data corpus 1930 generated for a respective unlabeled structured dataset may include one or more pieces of data that relate to distinct features of the respective unlabeled structured dataset and/or may support a classification of the respective unlabeled structured dataset to a respective taxonomy category (as will be described in more detail herein).

Taxonomy-Aware Feature Extraction Module

Figure 19:
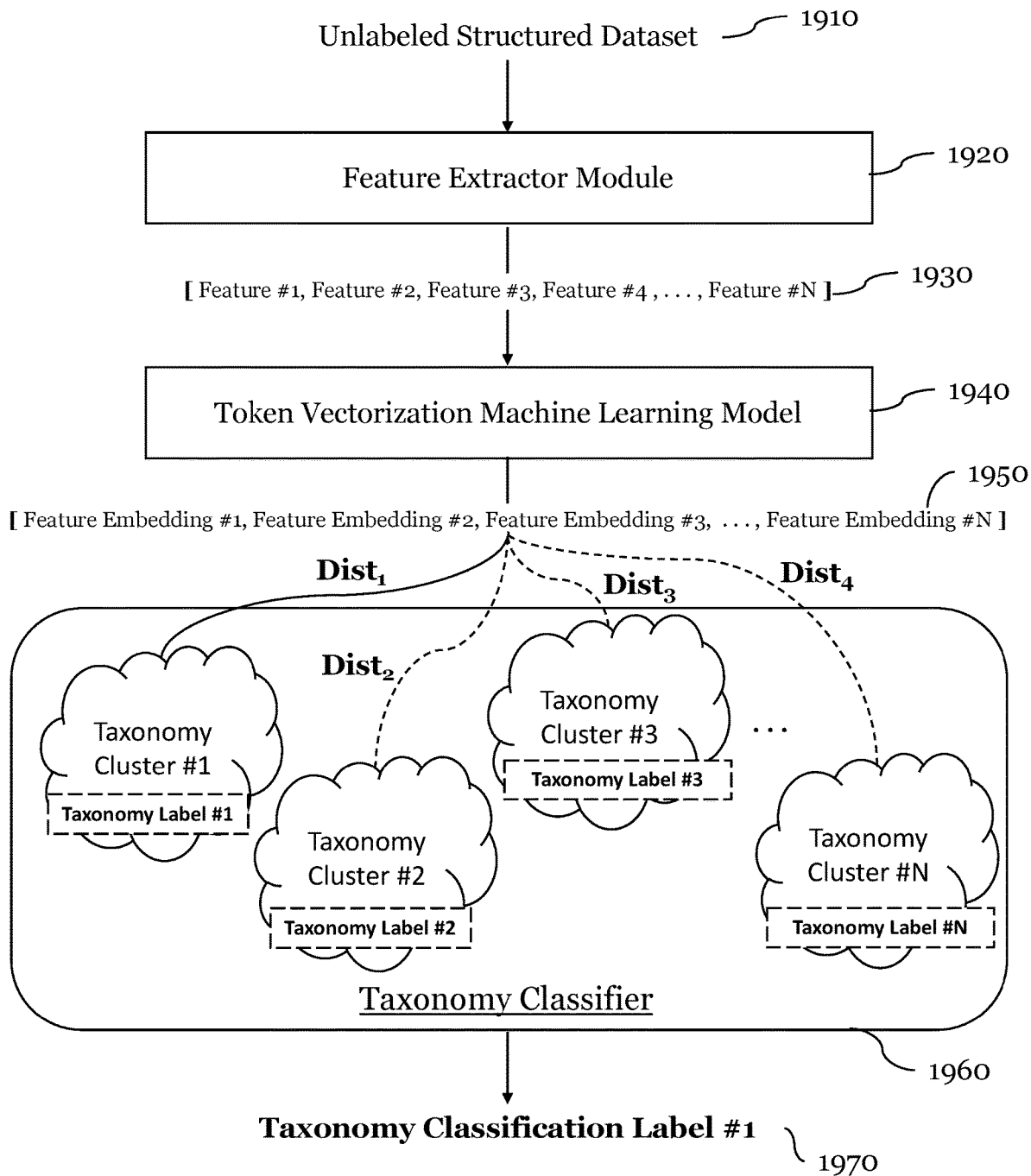
FIG. 19 illustrates an example schematic for computing a taxonomy category label for an unlabeled structured dataset, according to some embodiments of the present technology.

In some embodiments, as generally illustrated in FIG. 19, to generate the taxonomy-aware feature data corpus 1930 for the target unlabeled structured dataset 1910, the one or more processors of process 1810 may function to implement an automated taxonomy-aware feature extraction module 1920. In one example of such embodiments, the taxonomy-aware feature extraction module 1920, when implemented, may function to identify or collect at least a subset of the attributes, properties, and/or data records associated with the target unlabeled structured dataset 1910. It shall be noted that, in some embodiments, these attributes, properties, or data records may be obtained from the structured data corpus 2110 and/or may be obtained from a data storage service storing the target unlabeled structured dataset 1910 (e.g., such as a database or a server).

Figure 22:
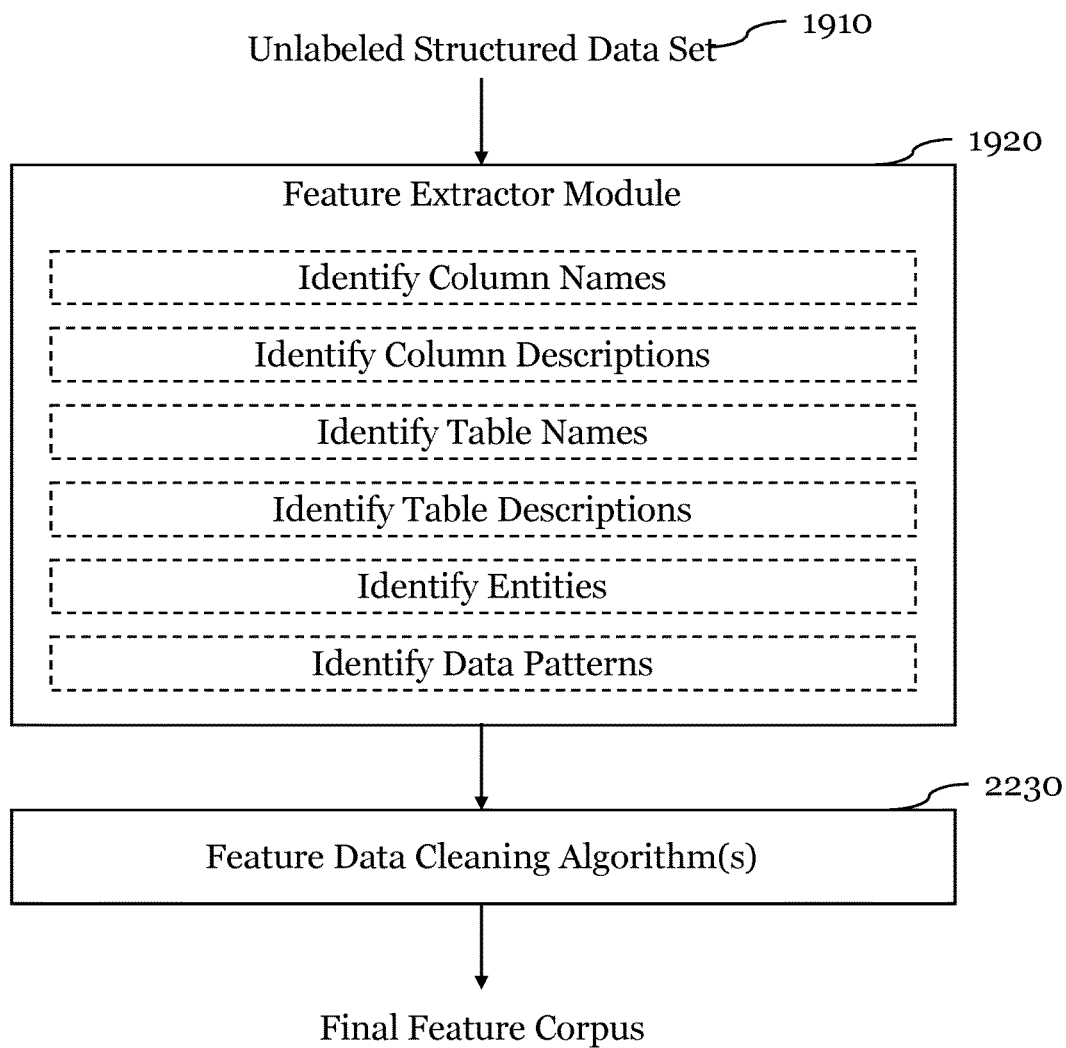
FIG. 22 illustrates an example schematic for generating a feature data corpus for a target unlabeled structured dataset, according to some embodiments of the present technology.

Furthermore, in some embodiments, the taxonomy-aware feature extraction module 1920 may function to implement one or more taxonomy-aware feature extraction algorithms that, when executed by the one or more processors of process 1810, extract one or more features from the target unlabeled structured dataset 1910. For instance, as generally illustrated in FIG. 22, the one or more taxonomy-aware feature extraction algorithms, when executed by the one or more processors of process 1810, may function to extract a name of one or more data fields (e.g., columns) associated with the target unlabeled structured dataset 1910, a description associated with the one or more data fields (e.g., column description), a name assigned to the target unlabeled structured dataset 1910 (e.g., database table), a description associated with the target unlabeled structured dataset 1910 (e.g., table description), and/or the like.

Furthermore, in some embodiments, the taxonomy-aware feature extraction module 1920 may additionally, or alternatively, implement a taxonomy-aware feature extraction algorithm that may evaluate one or more data records of the target unlabeled structured dataset 1910 against available data patterns and, in turn, return a list of data patterns detected in the target unlabeled structured dataset 1910. Some example data patterns that may be detected, by such a taxonomy-aware feature extraction algorithm, may include, but may not be limited to, credit card data patterns, phone number data patterns, mailing address data patterns, social security number data patterns, insurance number data patterns, vehicle identification number (VIN) data patterns, device serial number data patterns, bank account number data patterns, and/or the like.

Moreover, in some embodiments, the taxonomy-aware feature extraction module 1920 may additionally, or alternatively, function to implement an entity recognition machine learning model. In one example of such embodiments, the entity recognition machine learning model, when executed by the one or more processors of process 1820, may function to evaluate the one or more data records or entries of the target unlabeled structured dataset 1910 and, in turn, return a list of one or more entities detected in the target unlabeled structured dataset 1910.

It shall be noted that the above examples are not intended to be limiting and that the taxonomy-aware feature extraction module 1910 may function to extract different, additional, or fewer features from the target unlabeled structured dataset 1910 without departing from the scope of the inventions contemplated herein.

Producing a Feature Data Corpus

Additionally, as illustrated in FIG. 19, in some embodiments, the taxonomy-aware feature extraction module 1920 may function to produce, as output, a (e.g., combined) feature data corpus 1930 for the target unlabeled structured dataset 1910. In one example of such embodiments, producing the (e.g., combined) feature data corpus 1930 for the target unlabeled structured dataset 1910 may include instantiating a data structure suitable for storing a corpus of feature data (e.g., a list-like data structure, an array-like data structure, a table-like data structure, etc.) and/or may include storing the one or more extracted features from the target unlabeled structured dataset 1910 as distinct elements in the instantiated data structured.

For instance, in a non-limiting example, producing the (e.g., combined) feature data corpus 1930 for the target unlabeled structured dataset 1910 may include instantiating an array-like data structure and/or may include storing each of the features extracted from the target unlabeled structured dataset 1910 as a distinct element in the array-like data structure (e.g., [Feature 1, Feature 2, Feature 3, . . . , Feature N]). It shall be noted that, in some portions of the disclosure, a distinct element in the feature data corpus may referred to as a "feature token."

Feature Data Post-Processing

Additionally, or alternatively, in some embodiments, the one or more processors of process 1820 may function implement one or more feature data cleaning algorithms 2230. The one or more feature data cleaning algorithms 2230, when executed by the one or more processors of process 1820, may function to detect one or more features in the feature data corpus 1930 that may negatively impact an ability of a machine learning-based taxonomy classifier, such as the one described and constructed in process 1840, to accurately classify the target unlabeled structured dataset 1910.

In some embodiments, the one or more feature data cleaning algorithms 2230 may include, but may not be limited to, a first feature data cleaning algorithm that detects punctuation characters in the feature data corpus 1930 and, in turn, removes these punctuation characters from the feature data corpus 1930, a second feature data cleaning algorithm that detects duplicate spaces in the feature data corpus 1930 and, in turn, removes these duplicate spaces from the feature data corpus 1930, a third feature data cleaning algorithm that detects features in the feature data corpus 1930 that are less than a threshold length and, in turn, removes these features from the feature data corpus 1930, and/or the like.

Additionally, or alternatively, in some embodiments, the one or more feature data cleaning algorithms 2230 may include, but may not be limited to, a fourth feature data cleaning algorithm that detects numerical characters included in the feature data corpus 1930 and, in turn, removes these numerical characters from the feature data corpus 1930, a fifth feature data cleaning algorithm that detects stop words included in the feature data corpus 1930 (e.g., "a," "the," "is," "are," etc.) and, in turn, removes these stop words from the feature data corpus 1930, a sixth feature data cleaning algorithm that converts the features included in the feature data corpus 1930 to an equivalent case (e.g., uppercase or lowercase), a seventh feature data cleaning algorithm that detects typographical symbols included in the feature data corpus 1930 and, in turn, removes these typographical symbols from the feature data corpus 1930, and/or the like.

It shall be noted that the above examples are not intended to be limiting and that the one or more processors of process 1820 may implement different, additional, or fewer feature data cleaning algorithms without departing from the scope of the invention(s) contemplated herein. For instance, in a non-limiting example, the one or more processors of process 1820 may additionally, or alternatively, function to implement a stemming and/or a lemmatization algorithm that, when executed, stems the one or more features in the feature data corpus 1930 and/or converts the one or more features in the feature data corpus 1930 into its respective lemma, respectively, and/or implement one or more SAS software tools for cleaning the feature data corpus 1930 such as SAS® Viya™ (e.g., PROC TEXTMINE), SAS® Data Quality Knowledge Base, SAS® Data Quality Knowledge Base, or the like.

Furthermore, in some embodiments, in addition, or as an alternative, to the one or more feature data cleaning algorithms 2230 described above, the one or processors of process 1820 may function to implement one or more feature data post-processing algorithms. Example feature data post-processing algorithms that may be implemented by the one or more processors of process 1820 may include, but may not be limited to, a first feature data post-processing algorithm that applies a dictionary to the features included in the feature data corpus and, in turn, removes any words detected in the feature data corpus 1930 that are not in the dictionary, a second feature data post-processing algorithm that identifies the parts-of-speech of the features included in the feature data corpus 1930 and, in turn, removes any features from the feature data corpus 1930 that were not identified as nouns, verbs, etc., a third feature data post-processing algorithm that selectively applies weights to the features included in the feature data corpus 1930, and/or the like.

Generating a Feature Data Augmentation Request

Additionally, or alternatively, in some embodiments, the one or more processors of process 1820 may function to generate a feature data augmentation request for the target unlabeled structured dataset 1910 and, in turn, transmit the feature data augmentation request to a labeling source (e.g., user, subscriber, database administrator, data curator, or a third-party labeling service). In some embodiments, the feature data augmentation request, as generally referred to herein, may relate to a request, to the labeling source, for additional feature data for the target unlabeled structured dataset 1910, such as additional data records, table keywords, column descriptions, and/or the like.

In some embodiments, the one or more processors of process 1820 may function to generate the feature data augmentation for the target unlabeled structured dataset 1910 based on the one or more processors detecting that the feature data corpus 1930 produced for the target unlabeled structured dataset 1910 includes less than a threshold number of features. Conversely, in some embodiments, the one or more processors of process 1820 may function to forgo generating the feature data augmentation request for the target unlabeled structured dataset 1910 based on the one or more processors of process 1820 detecting that the feature data corpus 1930 includes more than the threshold number of features.

Computing Embedding Values

In some embodiments, the method 1800 may include process 1830. Process 1830, which may include computing one or more embedding values, may function to compute an embeddings inference 1950 for each unlabeled structured dataset underpinning the structured data corpus 2110. In some embodiments, as will be described in more detail herein, an embedding inference 1950 for the target unlabeled structured dataset 1910 may include one or more distinct embedding values corresponding to each feature token in the feature data corpus 1930 associated with the target unlabeled structured dataset 1910.

Token Vectorization Machine Learning Model

In some embodiments, to compute the embedding inference 1950 for the target unlabeled structured dataset 1910, the one or more processors of process 1830 may function to implement a token vectorization machine learning model 1940. The token vectorization machine learning model 1940, as generally illustrated in FIG. 19, may function to receive, as input, the feature data corpus 1930 computed for the target unlabeled structured dataset 1910 and, in turn, compute, as output, the embedding inference 1950 for the target unlabeled structured dataset 1910. In some embodiments, the embedding inference 1950 computed for the target unlabeled structured dataset 1910 may relate to an n-dimensional (numerical) vector whose values are based on n-dimensional space familiar to, known, and/or used by the token vectorization machine learning model 1940.

Furthermore, in some embodiments, as also illustrated in FIG. 19, the embedding inference 1950 computed for the target unlabeled structured dataset 1910 may include one or more distinct embedding values that correspond to the one or more distinct feature tokens underpinning the feature data corpus 1930 provided as input.

Computing Taxonomy Category Label Inferences

In some embodiments, the method 1800 may include process 1840. Process 1840, which may include computing one or more taxonomy category label inferences, may function to predict a taxonomy category label 1970 for each of the one or more unlabeled structured datasets underpinning the structured data corpus 2110. In some embodiments, as will be described in more detail herein, the taxonomy category label 1970 predicted for the target unlabeled structured dataset 1910 may indicate the taxonomy category in the target taxonomy 1502 likely associated with the target unlabeled structured dataset 1910. It shall be noted that, in some portions of the disclosure, predicting the taxonomy category label 1970 for each of the one or more unlabeled structured datasets underpinning the structured data corpus 2110 may also be referred to as "mapping each of the one or more unlabeled structured datasets to a taxonomy category in a target taxonomy" (or similar recitations).

Implementing a Hierarchical Taxonomy Classifier

Figure 20:
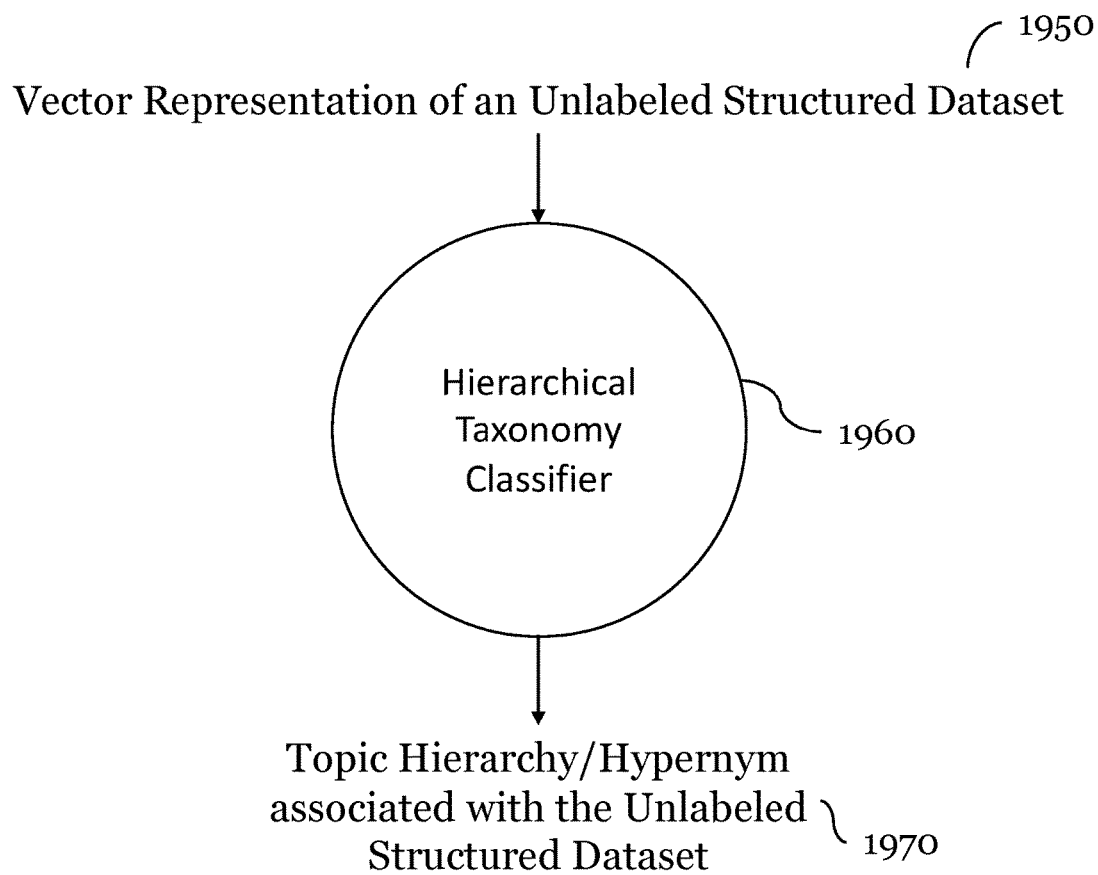
FIG. 20 illustrates an example schematic for classifying an unlabeled structured dataset via a taxonomy classifier, according to some embodiments of the present technology.

In some embodiments, as generally illustrated in FIGS. 19 and 20, to compute the taxonomy category label 1970 for the target unlabeled structured dataset 1910, the one or more processors of process 1840 may function to provide the embedding inference 1950 computed for the target unlabeled structured dataset 1910 as input into a hierarchical taxonomy classifier 1960. In one example of such embodiments, based on receiving the embedding inference 1950 as input, the taxonomy classifier 1960 may function to map the embedding inference 1950 to a respective taxonomy cluster of the plurality of taxonomy clusters associated with the taxonomy classifier 1960 and, in turn, associate the target unlabeled structured dataset 1910 with the taxonomy category related to the respective taxonomy cluster (as will be described in more detail herein).

It shall be noted that, in some embodiments, the one or more processors of process 1840 may function to construct the hierarchal taxonomy classifier 1960 in one or more ways described in the method 1400.

Centroid-Based Cluster Mapping

In a first implementation, mapping the embedding inference 1950 to one of the taxonomy clusters of the taxonomy classifier 1960 may include calculating a (e.g., Euclidean, cosine, or the like) distance between the embedding inference 1950 and a centroid of each taxonomy cluster of the taxonomy classifier 1960. It shall be noted that, in some portions of the disclosure, a distance between an embedding inference and a distinct taxonomy cluster of the taxonomy classifier 1960 may be referred to as a "distance metric" (or similar recitations).

Furthermore, in some embodiments of the first implementation, mapping the embedding inference 1950 to one of the taxonomy clusters of taxonomy classifier 1960 may include identifying a centroid of the plurality of centroids associated with the taxonomy classifier 1960 that has the smallest distance to the embedding inference 1950 and, in turn, labeling the target unlabeled structured dataset 1910 based on the taxonomy cluster associated with that respective centroid.

For instance, in a non-limiting example, if the hierarchical taxonomy classifier 1960 determines that a centroid of a first taxonomy cluster is closest (e.g., has the smallest distance) to the embedding inference 1950 associated with the target unlabeled structured dataset 1910, the hierarchical taxonomy classifier 1960 may function to associate the target unlabeled structured dataset 1910 with the same taxonomy category assigned to the first taxonomy cluster (as previously described in the method 1400). Conversely, in another non-limiting example, if the hierarchical taxonomy classifier 1960 determines that a centroid of a second taxonomy cluster is closest (e.g., has the smallest distance) to the embedding inference 1950 associated with the target unlabeled structured dataset 1910, the hierarchical taxonomy classifier 1960 may function to associate the target unlabeled structured dataset 1910 with the same taxonomy category assigned to the second taxonomy cluster.

Hypernym-Based Cluster Mapping

Additionally, or alternatively, in a second implementation, mapping the embedding inference 1950 to one of the taxonomy clusters of the taxonomy classifier 1960 may include calculating a (e.g., Euclidean, cosine, or the like) distance between the embedding inference 1950 and an embedding of a hypernym associated each taxonomy cluster of the taxonomy classifier 1960. It shall be noted that, in some portions of the disclosure, these computed distances may be referred to as "distance metrics" (or similar recitations).

Furthermore, in some embodiments of the second implementation, mapping the embedding inference 1950 to one of the taxonomy clusters of the taxonomy classifier 1960 may include identifying a hypernym of the plurality of hypernyms associated with the taxonomy classifier 1960 that has the smallest distance to the embedding inference 1950 and, in turn, labeling the target unlabeled structured dataset 1910 based on the taxonomy cluster associated with that hypernym.

For instance, in a non-limiting example, if the hierarchical taxonomy classifier 1960 determines that a hypernym embedding associated with a first taxonomy cluster is closest (e.g., has the smallest distance) to the embedding inference 1950 associated with the target unlabeled structured dataset 1910, the hierarchical taxonomy classifier 1960 may function to associate the target unlabeled structured dataset 1910 with the same taxonomy category assigned to the first taxonomy cluster (as described in the method 1400). Conversely, in another non-limiting example, if the hierarchical taxonomy classifier 1960 determines that a hypernym associated with a second taxonomy cluster is closest (e.g., has the smallest distance) to the embedding inference 1950 associated with the target unlabeled structured dataset 1910, the hierarchical taxonomy classifier 1960 may function to associate the target unlabeled structured dataset 1910 with the same taxonomy category assigned to the second taxonomy cluster.

Hyponym-Based Cluster Mapping

Additionally, or alternatively, in a third implementation, mapping the embedding inference 1950 to one of the taxonomy clusters of the taxonomy classifier 1960 may include calculating a (e.g., Euclidean, cosine, or the like) distance between the embedding inference 1950 and an embedding of one or more hyponyms associated with each taxonomy cluster of the taxonomy classifier 1960. It shall be noted that, in some portions of the disclosure, these computed distances may be referred to as "distance metrics" (or similar recitations).

Furthermore, in some embodiments of the third implementation, mapping the embedding inference 1950 to one of the taxonomy clusters of the taxonomy classifier 1960 may include identifying a respective hyponym of the plurality of hyponyms associated with the taxonomy classifier 1960 that has the smallest distance to the embedding inference 1950 and, in turn, labeling the target unlabeled structured dataset 1910 based on the taxonomy cluster corresponding to that respective hyponym.

For instance, in a non-limiting example, if the hierarchical taxonomy classifier 1960 determines that a hyponym embedding associated with a first taxonomy cluster is closest (e.g., has the smallest distance) to the embedding inference 1950 of the target unlabeled structured dataset 1910, the hierarchical taxonomy classifier 1960 may function to associate the target unlabeled structured dataset 1910 with the same taxonomy category assigned to the first taxonomy cluster. Conversely, in another non-limiting example, if the hierarchical taxonomy classifier 1960 determines that a hyponym embedding associated with a second taxonomy cluster is closest (e.g., has the smallest distance) to the embedding inference 1950 associated with the target unlabeled structured dataset 1910, the hierarchical taxonomy classifier 1960 may function to associate the target unlabeled structured dataset 1910 with the same taxonomy category assigned to the second taxonomy cluster.

Executing a Reclassification Labeling Workflow

In some embodiments, the distance between the embedding inference 1950 and the taxonomy clusters of the taxonomy classifier 1960 may be greater than a classification distance threshold. In one example of such embodiments, based on the one or more processors of process 1840 identifying that the distance between the embedding inference 1950 and the taxonomy clusters of the taxonomy classifier 1960 is greater than a classification distance threshold, the one or more processors of process 1840 may function to route the target unlabeled structured dataset to a reclassification workflow and, in turn, execute the reclassification workflow for the target unlabeled structured dataset 1910.

In some embodiments, the reclassification workflow, when executed, may function to generate, to a labeling source (e.g., a user), an annotation request for additional feature data relating to the target unlabeled structured dataset 1910 (e.g., additional data records, table keywords, column descriptions, and/or the like). It shall be noted that, in some examples, a labeling source, as generally referred to herein, may relate to a user, subscriber, database administrator, data curator, third-party labeling service, and/or the like.

Additionally, or alternatively, the reclassification workflow, when executed, may function to route the target unlabeled structured dataset 1910 to a semi-supervised machine learning pipeline. The semi-supervised machine learning pipeline may function to request user labeling of a pre-determined number of data records associated with the target unlabeled structured dataset 1910 (e.g., 1, 2, 4, 6, 10, or 20 data records) and, in turn, train or retrain one or more of the above-described machine learning models based on the user labeling.

Furthermore, in some embodiments, the reclassification labeling workflow, when executed, may additionally, or alternatively, function to compute a new taxonomy label for the target unlabeled structured dataset 1910 based on the new feature data collected for the target unlabeled structured dataset 1910 (e.g., by re-executing one or more of the techniques described in processes 1810-1840).

Executing an Active Learning-Based Workflow

In some embodiments, a plurality of taxonomy clusters of the taxonomy classifier 1960 may be within a classification threshold distance of the embedding inference 1950. In one example of such embodiments, based on the one or more processors of process 1840 identifying that a plurality of taxonomy clusters of the taxonomy classifier 1960 are within a threshold Euclidean distance, cosine distance, or the like of the embedding inference 1950 (e.g., a cosine distance threshold of 0.01, 0.1, 0.2, 0.5, 0.7, 0.9, or the like), the one or more processors of process 1840 may function to route the target unlabeled structured dataset 1910 to an active learning-based workflow and, in turn, execute the active learning-based workflow for the target unlabeled structured dataset 1910.

In some embodiments, the active learning-based workflow, when executed, may function to generate a validation request to a label validation source (e.g., a user, subscriber, database administrator, data curator, third-party labeling service, and/or the like). In one example of such embodiments, the validation request may include a user interface that displays the distances between the target unlabeled structured dataset 1910 and the plurality of taxonomy clusters of the taxonomy classifier 1960 that satisfy the classification threshold distance (e.g., the taxonomy clusters that are within the cosine distance threshold of 0.01, 0.1, 0.2, 0.5, 0.7, 0.9, or the like). Additionally, or alternatively, in some embodiments, the user interface may include one or more user interface elements that enable the label validation source to indicate the taxonomy cluster of the taxonomy classifier 1960 that is associated with the target unlabeled structured dataset 1910.

Furthermore, in some embodiments, based on the one or more processors of process 1840 identifying an input directed to one of the one or more user interface elements, the one or more processors of process 1840 may function to associate the target unlabeled structured dataset 1910 with the taxonomy cluster corresponding to the input. For instance, in a non-limiting example, if the one or more processors of process 1840 detect that the label validation source selected a user interface element associated with a first taxonomy cluster, the one or more processors of process 1840 may function to associate the target unlabeled structured dataset 1910 with a taxonomy category associated with the first taxonomy cluster. Conversely, in a second non-limiting example, if the one or more processors of process 1840 detect that the label validation source selected a user interface element associated with a second taxonomy cluster, the one or more processors of process 1840 may function to associate the target unlabeled structured dataset 1910 with a taxonomy category associated with the second taxonomy cluster.

Outputting the Taxonomy-Labeled Structured Datasets

Figure 21:
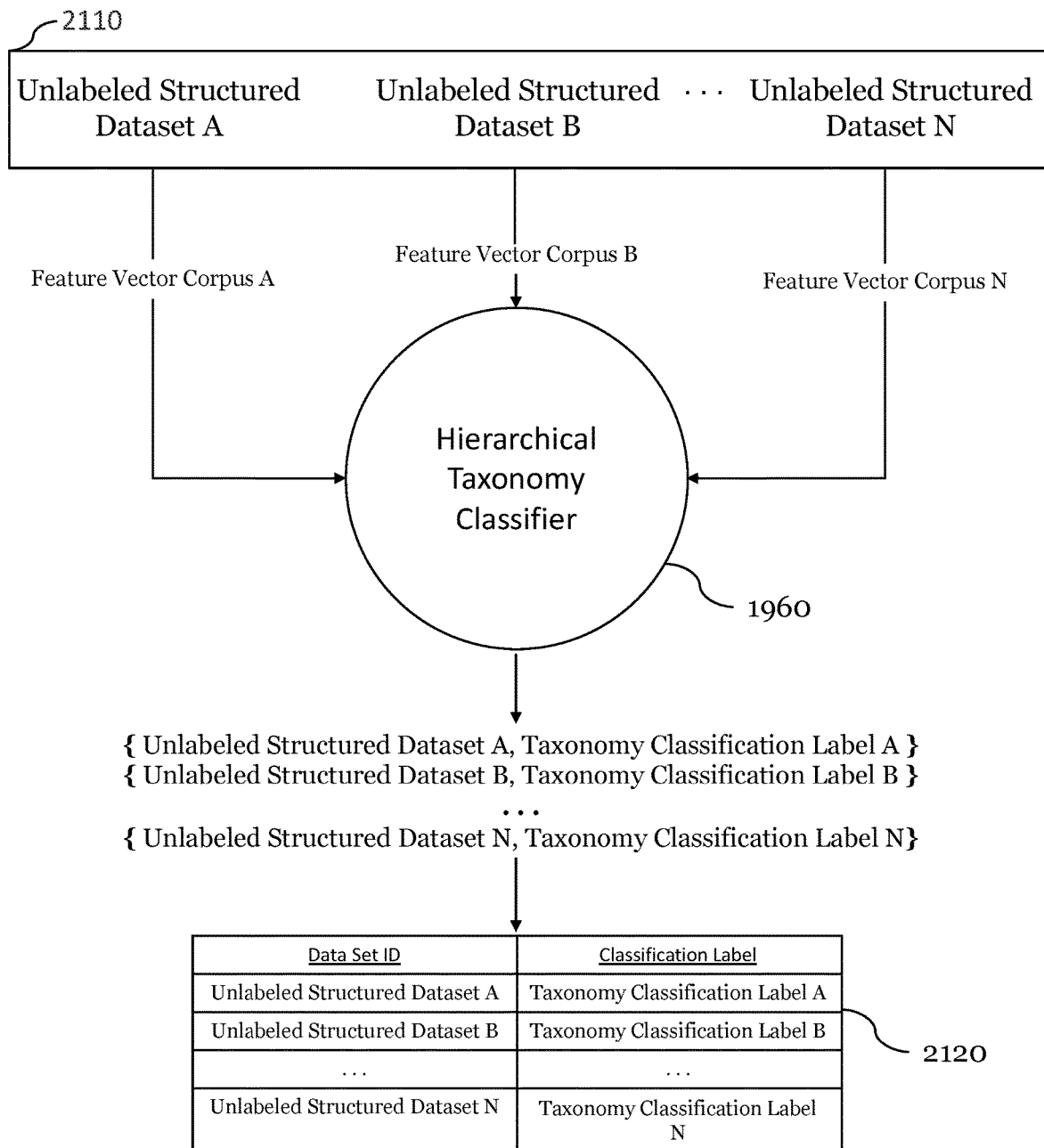
FIG. 21 illustrates an example schematic for classifying a plurality of unlabeled structured datasets via a taxonomy classifier, according to some embodiments of the present technology.

In some embodiments, as generally illustrated in FIG. 21, the one or more processors of process 1840 may function to store the taxonomy category label 1970 computed for each of the one or more unlabeled structured datasets underpinning the structured data corpus 2110 in a taxonomy category label-storing data structure 2120 (e.g., a database table, lookup table, and/or the like). In one example such embodiments, each entry (e.g., row) in the taxonomy category label-storing data structure 2120 may correspond to a distinct unlabeled structured dataset. Furthermore, in some embodiments, each entry in the taxonomy category label-storing data structure 2120 may include a name or ID of the distinct unlabeled structured dataset and the taxonomy category label 1970 associated with the distinct unlabeled structured dataset. It shall be noted that, in some portions of the disclose, an unlabeled structured dataset, once associated with a taxonomy category label, may be referred to as a "taxonomy-labeled structured dataset."

It shall also be noted that the above example is not intended to be limiting and that the one or more processors of process 1840 may function to store the taxonomy category label 1970 computed for each of the one or more unlabeled structured datasets underpinning the structured data corpus 2110 in a different manner without departing from the scope of the disclosure. For instance, in another non-limiting example, each entry (e.g., row) in the taxonomy category label-storing data structure 2120 may correspond to a distinct taxonomy category label and may store a name (or ID) of each unlabeled structured dataset of the one or more unlabeled structured datasets that relate to the distinct taxonomy category label. Similarly, in yet another non-limiting example, the one or more processors of process 1840 may function to construct a plurality of distinct category label-storing data structures 2120 and, in turn, (e.g., only) store unlabeled structured datasets that are associated with a common taxonomy category label in a same category label-storing data structure 2120.

Method for Implementing a Structured Data Classifier Interface

Figure 23:
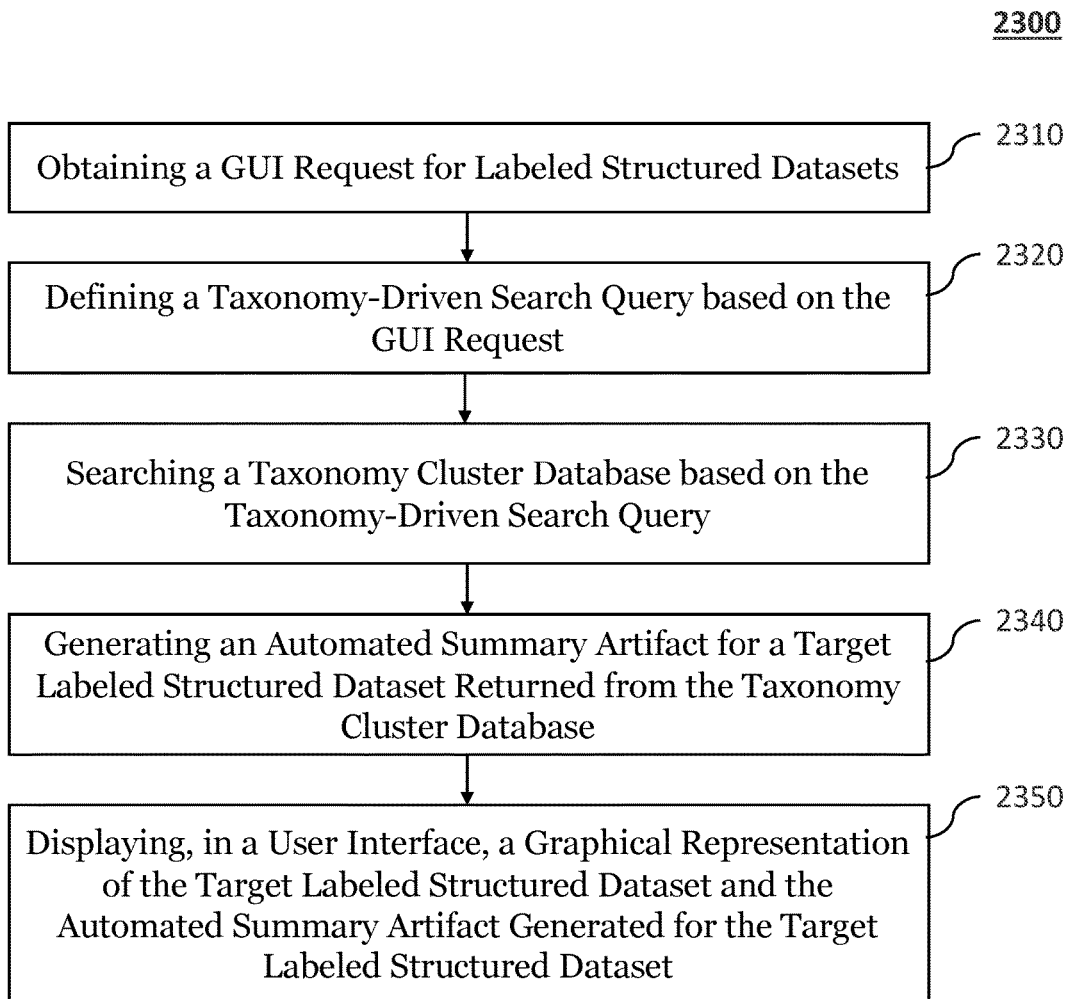
FIG. 23 illustrates a flow chart showing an example process for implementing a structured data classifier interface, according to some embodiments of the present technology.
Figure 24:
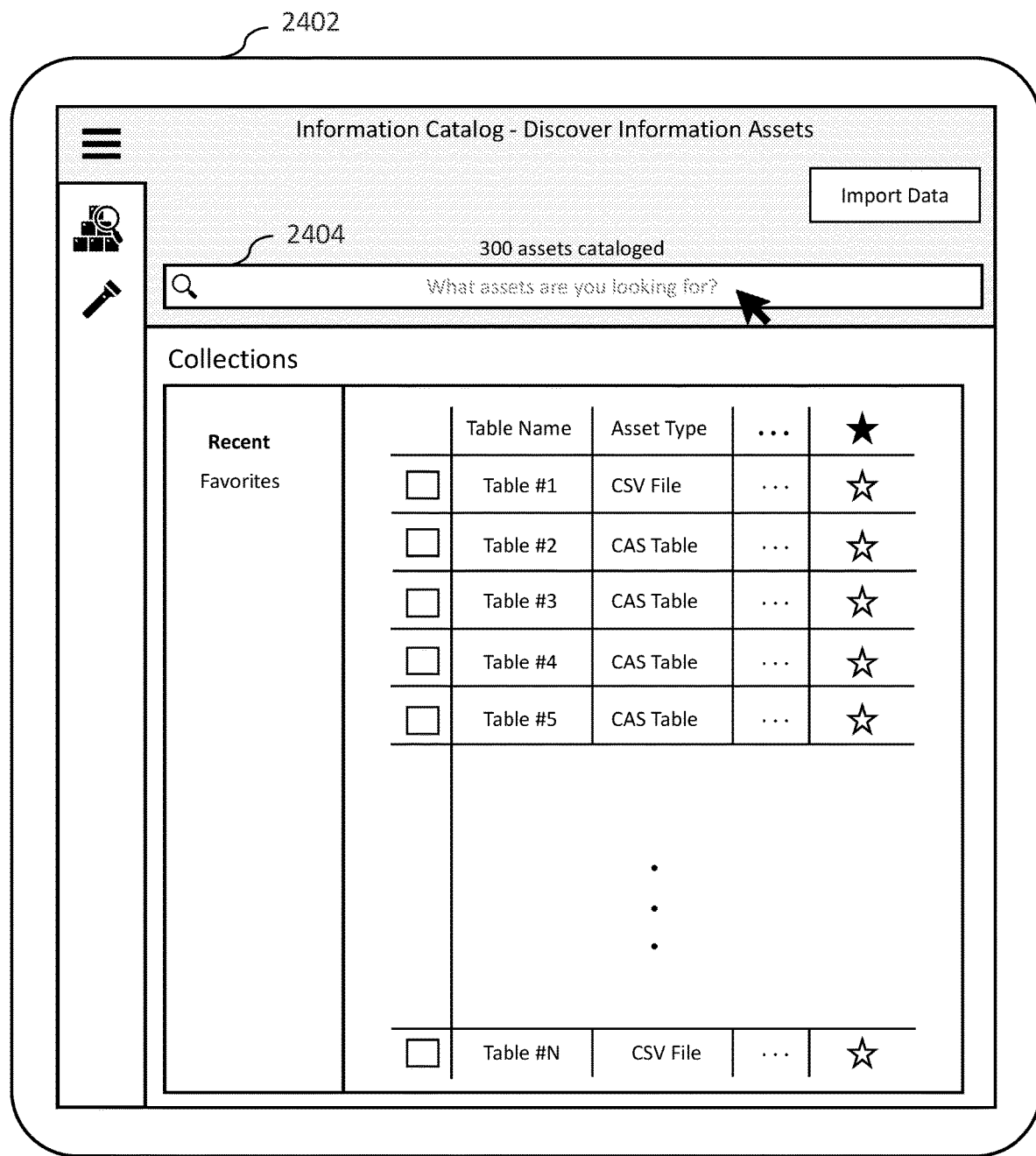
FIGS. 24-26 illustrate example graphical user interfaces for searching for one or more taxonomy-labeled datasets, according to some embodiments of the present technology.
Figure 25:
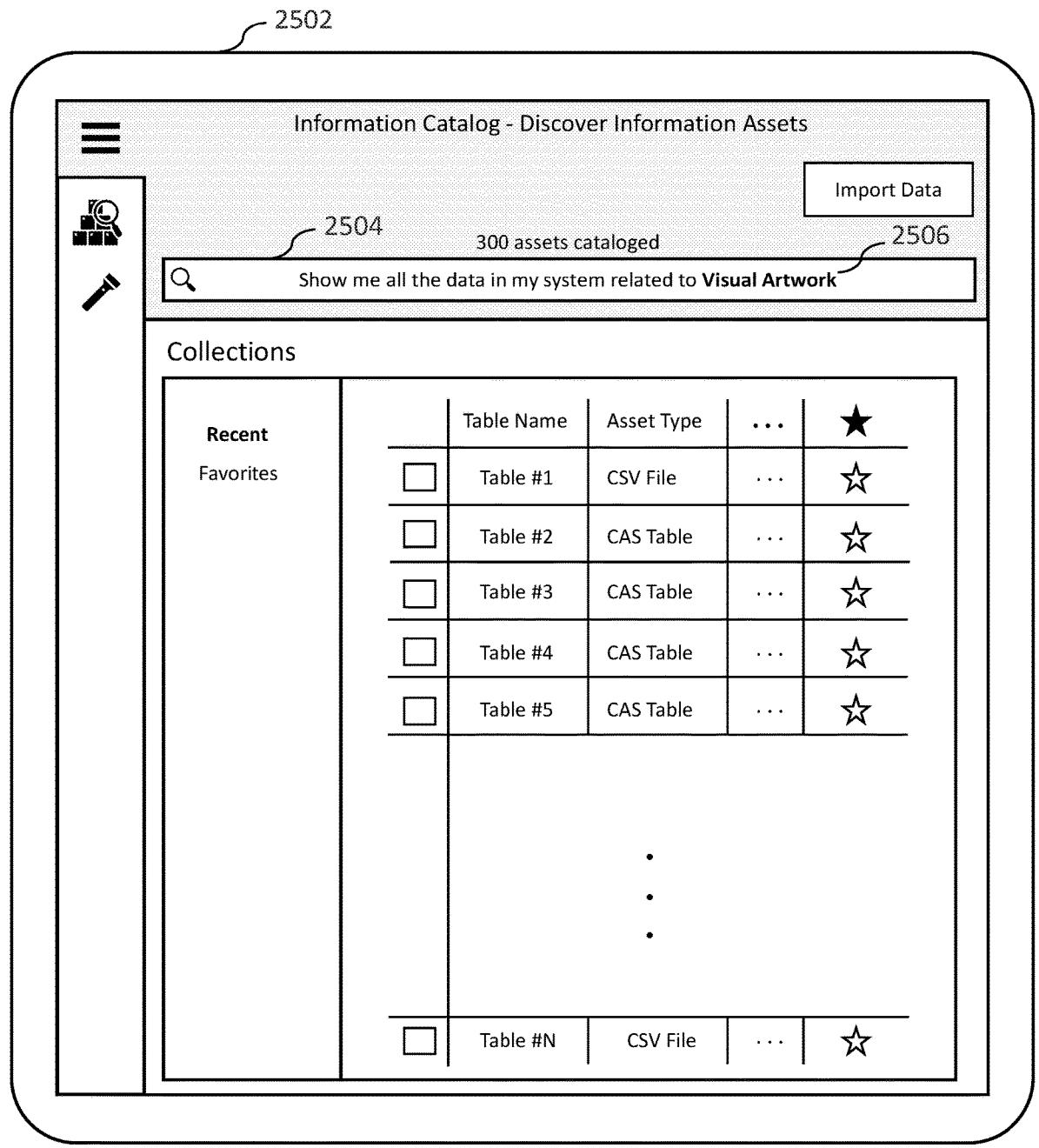

FIG. 23 illustrates one embodiment of a method 2300 for implementing a structured data classifier interface. It will be appreciated that other embodiments contemplated within the scope of the present disclosure may involve more operations, fewer operations, different operations, or a different order of operations than as shown in FIG. 23.

Identifying a Digital Asset Identification Request

In one or more embodiments, the method 2300 may include process 2310. Process 2310, which may include identifying a digital asset identification request, may function to obtain or detect, via a network or application programming interface, a digital asset identification request from one or more users using a system or service implementing the method 2300. A digital asset identification request, as generally referred to herein, may be a request from a user or the like to identify, locate, and/or discover one or more taxonomy-labeled structured datasets of a target type or characteristic from a database storing a plurality of distinct corpora of taxonomy-labeled structured datasets. It shall be recognized that the phrase "digital asset identification request" may be interchangeably referred to herein as a "data asset identification request", a "graphical user interface (GUI) request", a "data identification request", or the like.

Figure 31:
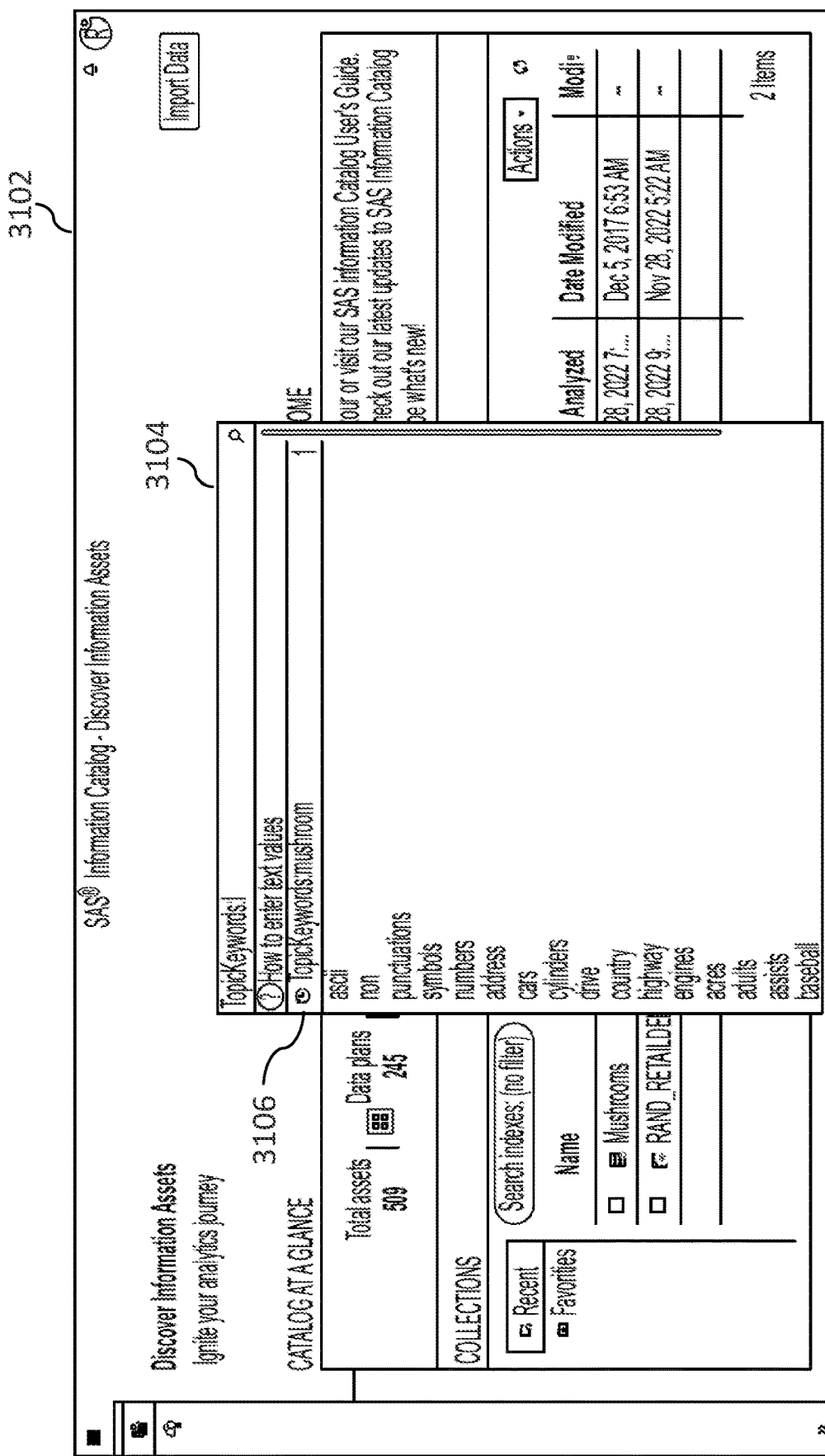

In one or more embodiments, based on receiving a digital asset identification request, one or more processors of process 2310 may function to route the digital asset identification request to one or more automated downstream operations that may cause a return of a subset of taxonomy-labeled structured datasets stored within the database that satisfies the digital asset identification request. For instance, in a non-limiting example, a digital asset identification request detected (or obtained) by one or more processors of process 2310 may be "show me all the data in my system related to creative works" and the one or more processors of process 2310 may function to route the digital asset identification request to one or more automated downstream operations (e.g., process 2320, process 2330, process 2340, and/or process 2350) that may cause a retrieval (or return) of one or more taxonomy-labeled structured datasets comprising creative work-type data. In another non-limiting example, a digital asset identification request detected (or obtained) by one or more processors of process 2310 may be "find me all the data related to decision support" and the one or more processors of process 2310 may route the digital asset identification request to one or more automated downstream operations (e.g., process 2320, process 2330, process 2340, and/or process 2350) that may cause a retrieval (or return) of one or more taxonomy-labeled structured datasets comprising decision support-type data. In another non-limiting example, one or more processors of process 2310 may function to receive a digital asset identification request comprising one or more hypernym tokens and/or one or more hyponyms tokens and, in turn, route the digital asset identification request to one or more automated downstream operations (e.g., process 2320, process 2330, process 2340, and/or process 2350) that may cause a retrieval (or return) of one or more taxonomy-labeled structured datasets associated with the one or more hypernym tokens and/or one or more hyponyms tokens, as shown generally by way of example in FIG. 31.

Digital Asset Identification Request Via a Graphical User Interface (GUI)

In a first implementation, one or more processors of process 2310 may function to obtain a digital asset identification request 2506, 3106 (e.g., a search query, a subscriber input, or the like) via a graphical user interface 2402, 2502, 3102 that may be digitally accessible by or provided to users of a service or system implementing the method 2300.

In one or more embodiments of the first implementation, the graphical user interface 2402, 2502, 3102 may include one or more graphical user interface objects that enables users to intuitively interact with the system or service. For instance, in a non-limiting example, the graphical user interface 2402, 2502, 3102 may implement a text input field (or search bar) 2404, 2504, 3106 into which one or more target subscribers may input one or more digital asset identification requests 2506, 3106, as shown generally by way of example in FIG. 24, FIG. 25, FIG. 30, and FIG. 31. In such embodiments, one or more processors of process 2310 may function to receive one or more digital asset identification requests 2506, 3106 (in the form of speech or utterance input, textual input, character input, numerical input, and/or any other suitable type of input) from a target user using the one or more graphical user interface objects.

It shall be further noted that, in one or more embodiments, the graphical user interface 2402, 2502, 3102 (e.g., intuitive data repository search interface, structured data classifier interface, Internet-accessible user interface, etc.) may be implemented via any suitable computing device including, but not limited to, a mobile computing device, a personal computing device, a web-browser (having a website displayed therein), and/or any system having a suitable interface for implementing the method 2300.

Digital Asset Identification Request Via an Application Programming Interface Call In a second implementation, one or more processors of process 2310 may function to receive a digital asset identification request 2506, 3106 via a network or application programming interface (API) call that may have originated from one or more distinct microservices and/or one or more distinct applications directly or indirectly associated with a system or service implementing the method 2300. In such implementations, the application programming interface (API) call may include a payload comprising the digital asset identification request 2506, 3106.

In one or more embodiments of the second implementation, the application programming interface (API) call may be system or service-generated by the one or more distinct microservices and/or the one or more distinct applications.

Additionally, or alternatively, in one or more embodiments of the second implementation, one or more processors of process 2310 may function to receive an application programming interface (API) call based on a user input causing an execution of a graphical user interface element implemented on a user interface of the one or more distinct microservices and/or the one or more distinct applications.

Defining and Executing a Taxonomy Token-Informed Search Operation

In one or more embodiments, the method 2300 may include process 2320. Process 2320, which may include defining and executing a taxonomy-token informed search operation, may function to define a taxonomy-token informed search operation based on the digital asset identification request 2506, 3106 provided by one or more processors of process 2310 and execute the taxonomy token-informed search operation to return one or more corpora of taxonomy-labeled structured datasets that satisfy the taxonomy-token informed search operation. It shall be recognized that the phrase "taxonomy token-informed search operation" may be interchangeably referred to herein as a "taxonomy-driven search query", a "token-informed search query", a "search query", or the like.

In one or more embodiments, for each digital asset identification request 2506, 3106 obtained by the system or service implementing the method 2300, one or more processors of process 2320 may function (on a per digital asset identification request 2506, 3106 basis) to extract taxonomy tokens from a subject digital asset identification request, define a taxonomy token-informed search operation based on the extracted taxonomy tokens, and/or execute the taxonomy token-informed search operation.

Extracting Taxonomy Tokens

In one or more embodiments, one or more processors of process 2320 may function to implement a taxonomy token extraction algorithm that may receive, as input, a digital asset identification request 2506, 3106, extract one or more taxonomy tokens (e.g., taxonomy hypernym tokens, taxonomy hyponym tokens, etc.) from the digital asset identification request 2506, 3106 based on token extraction characteristics of the taxonomy token extraction algorithm, and output the extracted taxonomy tokens. The extracted taxonomy tokens may be indicative of a target domain, a type, and/or a vocabulary of taxonomy-labeled structured datasets that a user may be attempting to identify, surface, and/or discover within the above-described database.

In a first implementation, the taxonomy token extraction algorithm may function to extract tokens (e.g., taxonomy tokens) from a subject digital asset identification request in accordance with a subscriber-defined taxonomy or a subscriber-provided taxonomy as described in the method 1400.

In a second implementation, the taxonomy token extraction algorithm may extract tokens (e.g., taxonomy tokens) from a subject digital asset identification request based on a system/service default taxonomy as described in the method 1400.

In a non-limiting example of the first implementation and/or the second implementation, a subject digital asset identification request obtained by one or more processors of process 2310 may be "show me all the data in my system related to places" and the taxonomy token extraction algorithm may extract the term "places" as a taxonomy token. In another non-limiting example, a subject digital asset identification request obtained by one or more processors of process 2310 may be "show me all the data in my system related to places and accommodations" and the taxonomy token extraction algorithm may extract the term "places" and "accommodations" as taxonomy tokens.

Defining a Taxonomy Token-Informed Search Operation

In one or more embodiments, based on or in response to extracting one or more taxonomy tokens (e.g., taxonomy hypernym tokens, taxonomy hyponym tokens, etc.) for a subject digital asset identification request, one or more processors of process 2320 may function to define a taxonomy token-informed search operation for the subject digital asset identification request.

Figure 29:
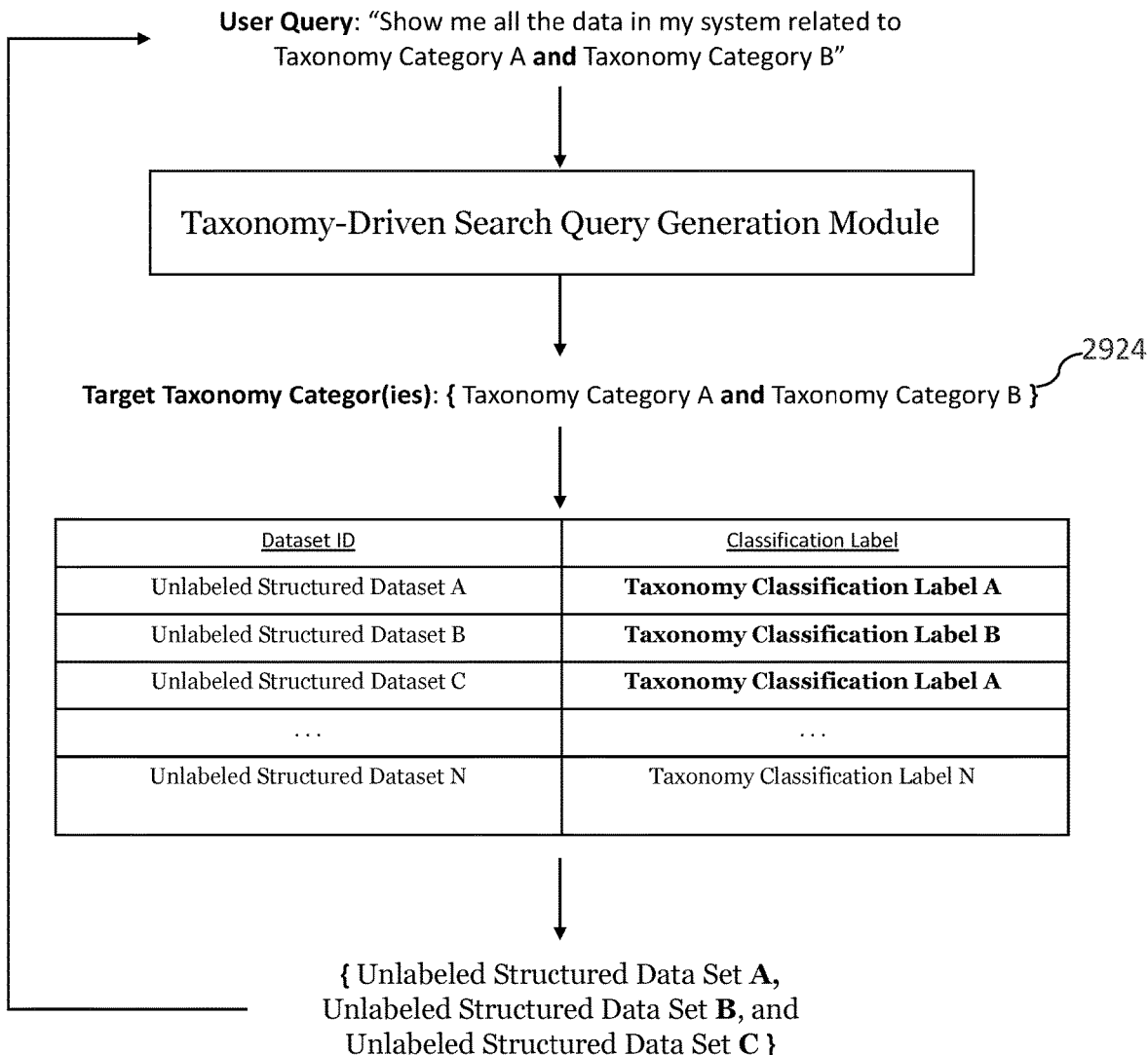
FIG. 29 illustrates an example schematic for defining and executing a taxonomy token-informed search operation, according to some embodiments of the present technology.

In a first implementation, one or more processors of process 2320 may function to automatically construct or define a Boolean search operation 2924 for a subject digital asset identification request. In such embodiments, the Boolean search operation 2924 may include, as search parameters, the extracted taxonomy tokens associated with a subject digital asset identification request, as shown generally by way of example in FIG. 29. In a non-limiting example, one or more processors of process 2320 may function to define a Boolean search operation 2924 using two or more taxonomy tokens. It shall be noted that the Boolean search when executed may return one or more distinct corpora of taxonomy-labeled structured datasets from the database that satisfy the Boolean search operation 2924.

Additionally, or alternatively, in a second implementation, one or more processors of process 2320 may function to automatically construct or define a cosine similarity search operation for a subject digital asset identification request. That is, in one or more embodiments, one or more processors of process 2320 may function to compute, using a word embeddings model, a distinct embeddings inference for each of the one or more extracted taxonomy tokens and define the cosine similarity search operation using the distinct embeddings inferences as search parameters. In other words, the cosine similarity search operation may include, as search parameters, an embeddings inference (e.g., embedding inference vector value or the like) corresponding to each of the one or more extracted taxonomy tokens associated with a subject digital asset identification request.

In one or more embodiments of the second implementation, the word embeddings model may be trained to produce embeddings inferences within an n-dimensional space that is informed by vocabulary associated with a target taxonomy (e.g., a target hierarchical taxonomy).

Additionally, or alternatively, in a third implementation, one or more processors of process 2320 may function to automatically construct or define a regular expression search operation for a subject digital asset identification request using the one or more extracted taxonomy tokens associated with the subject digital asset identification request as search parameters.

Executing the Taxonomy Token-Informed Search Operation and Returning Search Results In one or more embodiments, one or more processors of process 2320 may function to execute a taxonomy token-informed search operation that may cause a query or a search of a database storing a plurality of distinct corpora of taxonomy-labeled structured datasets and return one or more corpora of taxonomy-labeled structured datasets of the database that satisfy the distinct taxonomy token-informed search operation.

In a first implementation, based on or in response to executing a taxonomy token-informed search operation, one or more processors of process 2320 may function to evaluate one or more (e.g., each) of the one or more taxonomy tokens of a subject taxonomy token-informed search operation and/or a subject digital asset identification request against a distinct set of taxonomy tokens attributed to each of the plurality of distinct corpora of taxonomy-labeled structured datasets stored within the database to identify one or more taxonomy token matches (e.g., one or more exact matches, one or more semantic matches, and/or the like) between the one or more taxonomy tokens associated with a subject taxonomy token-informed search operation and the distinct set of taxonomy tokens attributed to each of the plurality of distinct corpora of taxonomy-labeled structured datasets.

Accordingly, for each of the one or more taxonomy token matches, one or more processors of process 2320 may function to return a distinct corpus of one or more taxonomy-labeled structured datasets that contributed or caused the distinct taxonomy token match (e.g., search results).

In a second implementation, based on or in response to executing a taxonomy token-informed search operation, one or more processors of process 2320 may function to compute an embeddings inference for one or more (e.g., each) taxonomy token of a subject digital asset identification request and/or taxonomy token-informed search operation via a token vectorization model configured or trained to produce embeddings inferences within a n-dimensional space that may be informed at least by vocabulary associated with a target taxonomy (e.g., a target subscriber-provided hierarchical taxonomy, a system default hierarchical taxonomy, etc.). In such second implementation, one or more processors of process 2320 may function to evaluate taxonomy embeddings value(s) corresponding to each of the plurality of distinct corpora of taxonomy-labeled structured datasets included within the database to identify one or more embeddings matches (e.g., one or more exact embedding matches, one or more substantially similar embeddings matches (e.g., within a threshold distance, etc.) between the embeddings inference for each of the one or more taxonomy tokens associated with the subject digital asset identification request and the taxonomy embeddings.

Accordingly, for each of the one or more embedding matches, one or more processors of process 2320 may function to return a distinct corpus of one or more taxonomy-labeled structured datasets that contributed or caused the distinct embeddings match (e.g., search results).

Identifying a Target Corpus of Taxonomy-Labeled Structured Datasets

In one or more embodiments, the method 2300 may include process 2330. Process 2330, which may include identifying a target corpus of taxonomy-labeled structured datasets, may function to identify at least one corpus of one or more taxonomy-labeled structured datasets from the search results that may be of a focus and/or interest to a user associated with a subject digital asset identification request (e.g., the digital asset identification request 2506, 3106 obtained by one or more processors of process 2310).

Displaying Search Results and Displaying Taxonomy-Labeled Structured Datasets

Figure 26:
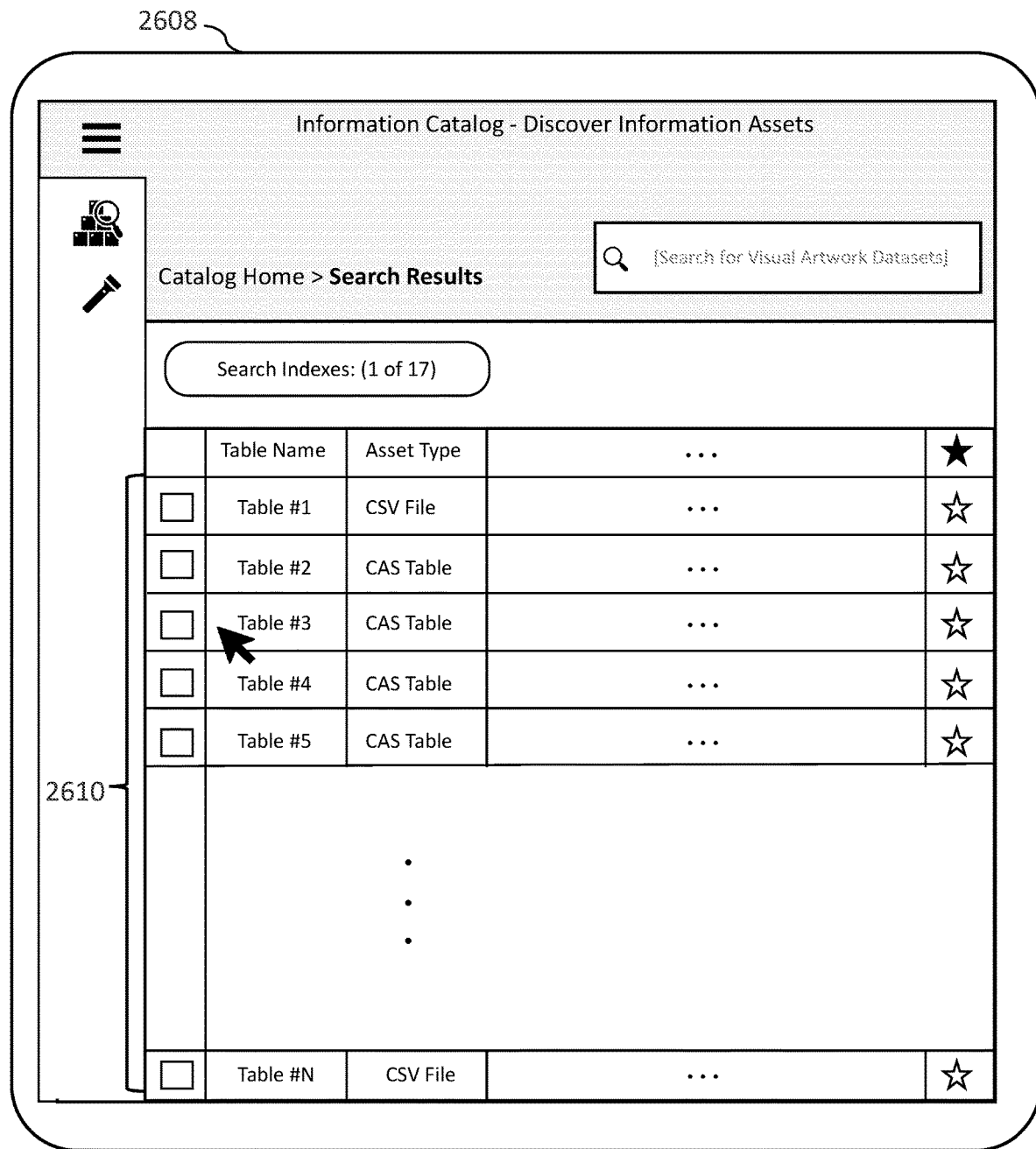

In one or more embodiments, one or more processors of process 2330 may function to display, via a search results graphical user interface 2608, 2708, 3008, 3408, the taxonomy-labeled structured dataset search results 2610, 2710, 3010, 3410 (or dataset representations of the taxonomy-labeled structured dataset search results) returned by the one or more processors of the process 2320 as a service or system response to a corresponding digital asset identification request, as shown generally by way of example in FIG. 26.

In a first implementation, one or more processors of process 2330 may function to display, via a search results user interface 2608, 2708, 3008, 3408, a selective subset of taxonomy-labeled structured dataset search results 2610, 2710, 3010, 3410 returned from a taxonomy-token informed search operation. In such implementation, the one or more processors of process 2330 may function to reduce or pare down the taxonomy-labeled structured dataset search results returned from the taxonomy-token informed search operation in accordance with a predetermined scoring or ranking system (e.g., identify the top five (5) taxonomy-labeled structured dataset search results, identify the top ten (10) taxonomy-labeled structured dataset search results, or any other suitable number) and display, via the search results user interface 2608, 2708, 3008, 3408, a distinct dataset representation for each distinct taxonomy-labeled structured dataset of the selective subset.

In a second implementation, one or more processors of process 2330 may function to display, via a search results user interface 2608, 2708, 3008, 3408, a distinct dataset representation for each distinct taxonomy-labeled structured dataset returned from a taxonomy-token informed search operation. In such implementation, the one or more processors of process 2330 may function to display, via the search results user interface 2608, 2708, 3008, 3408, a distinct dataset representation for each distinct taxonomy-labeled structured dataset returned from the taxonomy-token informed search operation. For instance, in a nonlimiting example, if the search results returned ten (10) distinct taxonomy-labeled structured datasets, the search results user interface 2608, 2708, 3008, 3408 may function to display a distinct dataset representation for each of the ten (10) distinct taxonomy-labeled structured datasets.

It shall be noted that, in one or more embodiments of the first implementation and/or the second implementation, one or more processors of process 2330 may function to compute a taxonomy match metric value for each of the plurality of distinct corpora of taxonomy-labeled structured datasets returned from the execution of the taxonomy token-informed search operation. In such embodiments, a taxonomy match metric value computed for each of the plurality of distinct corpora of taxonomy-labeled structured datasets may be based on a calculated embeddings distance between a corresponding corpus of taxonomy-labeled structured datasets and one or more of the one or more distinct embeddings inferences computed for each of the one or more extracted taxonomy tokens of a subject digital asset identification request (e.g., a small embeddings distance may correspond to a high taxonomy match metric value, a large embeddings distance may correspond to a low taxonomy match metric value, etc.). Accordingly, one or more processors of process 2330 may function to display, via a display generation component, the plurality of distinct corpora of labeled structured datasets (or dataset representations) on the search results user interface 2608, 2708, 3008, 3408 in an arrangement informed by the prioritization (e.g., highest taxonomy match metric value to lowest taxonomy match metric value).

Figure 34:
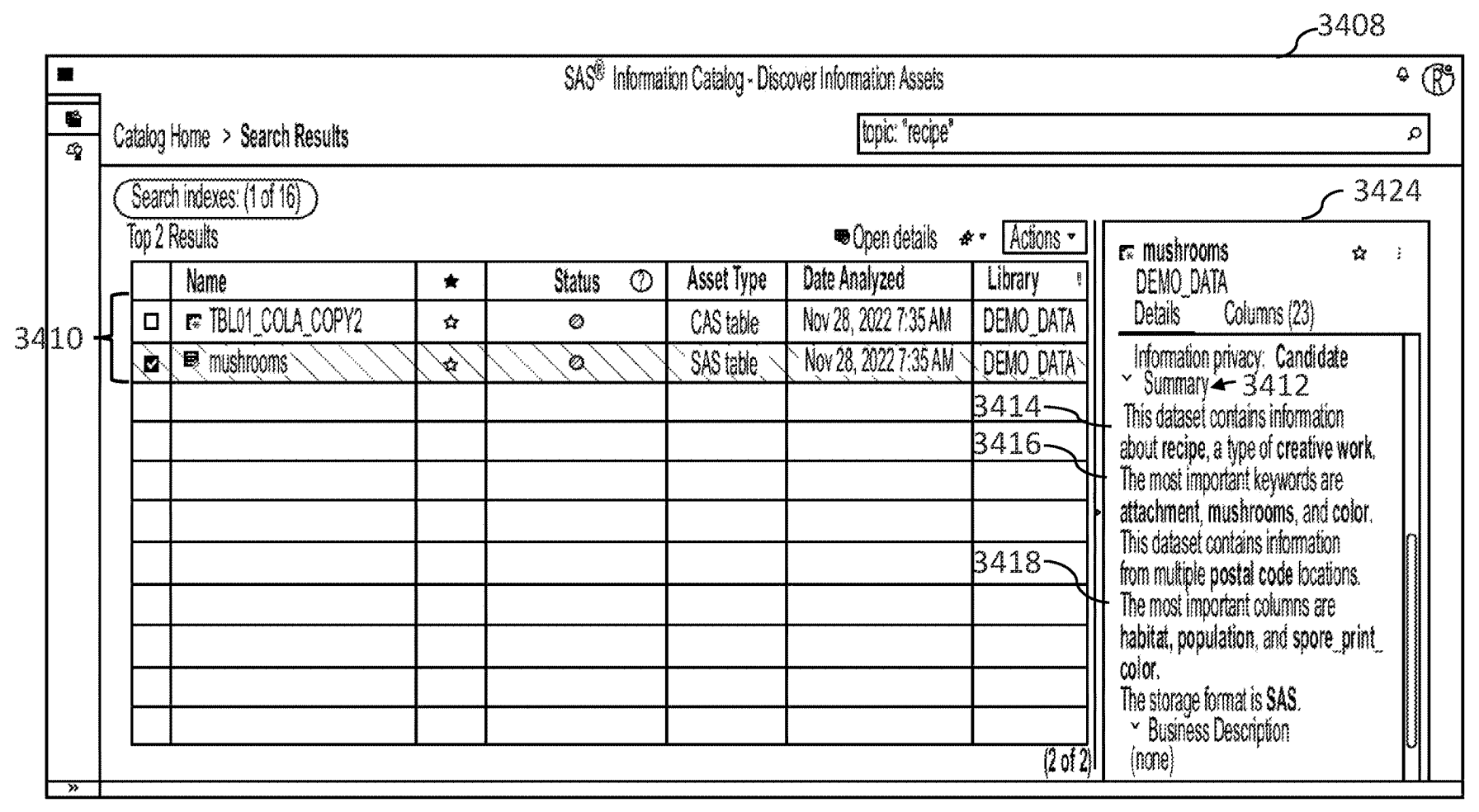

It shall be noted that, in one or more embodiments of the first implementation and/or the second implementation, each distinct dataset representation displayed on the search results user interface 2608, 2708, 3008, 3408 may include one or more attributes or characteristics of the corresponding taxonomy-labeled structured dataset (e.g., dataset name, a status, an asset type, a dataset size, etc.), as shown generally by way of example in FIG. 26 and FIG. 34.

Receiving Subscriber Input Selecting a Target Corpus of Taxonomy-Labeled Structured Datasets In one or more embodiments, while displaying the taxonomy-labeled structured datasets (or dataset representations of the taxonomy-labeled structured datasets) on the search results user interface 2608, 2708, 3008, 3408, one or more processors of process 2330 may function to receive a user input selecting one or more of the taxonomy-labeled structured datasets (or one or more dataset representations of the taxonomy-labeled structured datasets) to obtain further context or information relating to the one or more selected taxonomy-labeled structured datasets (or the one or more selected dataset representations of the taxonomy-labeled structured datasets).

In a first implementation, while displaying the dataset representations of the taxonomy-labeled structured datasets on the search results graphical user interface 2608, 2708, 3008, 3408, one or more processors of process 2330 may function to receive a user input selecting one of the taxonomy-labeled structured dataset representations to obtain further context or information relating to the taxonomy-labeled structured dataset that corresponds to the selected one of the taxonomy-labeled structured dataset representations.

In a second implementation, while displaying the dataset representations of the taxonomy-labeled structured datasets on the search results graphical user interface 2608, 2708, 3008, 3408, one or more processors of process 2330 may function to receive a user input selecting a plurality (e.g., at least two) of the taxonomy-labeled structured dataset representations to obtain further context or information relating to the taxonomy-labeled structured datasets associated with the selected plurality of taxonomy-labeled structured dataset representations.

It shall be noted that, in one or more embodiments of the first implementation and/or the second implementation, a taxonomy-labeled structured dataset that corresponds to the selected one of the taxonomy-labeled structured dataset representations may include one or more taxonomy-labeled structured datasets (e.g., only one taxonomy-labeled structured dataset, a plurality of distinct taxonomy-labeled structured datasets, or any number of taxonomy-labeled structured datasets, etc.).

Computing an Automated Summary Artifact for the Target Corpus of Taxonomy-Labeled Structured Datasets In one or more embodiments, the method 2300 may include process 2340. Process 2340, which may include computing an automated summary artifact 2712, 2812, 3212, 3312, 3412, may function to generate or compute, by one or more processors, a distinct automated summary artifact 2712, 2812, 3212, 3312, 3412 for one or more target corpora of taxonomy-labeled structured datasets provided by the one or more processors of process 2330. In one or more embodiments, computing or generating an automated summary artifact 2712, 2812, 3212, 3312, 3412 for a target corpus of taxonomy-labeled structured datasets may include one or more of sourcing a precis template (e.g., a natural language generation template), extracting one or more pieces of taxonomy metadata attributed to the target corpus of taxonomy-labeled structured datasets, and interleaving the one or more taxonomy classification labels attributed to the target corpus of taxonomy-labeled structured datasets into the precis template.

Figure 32:
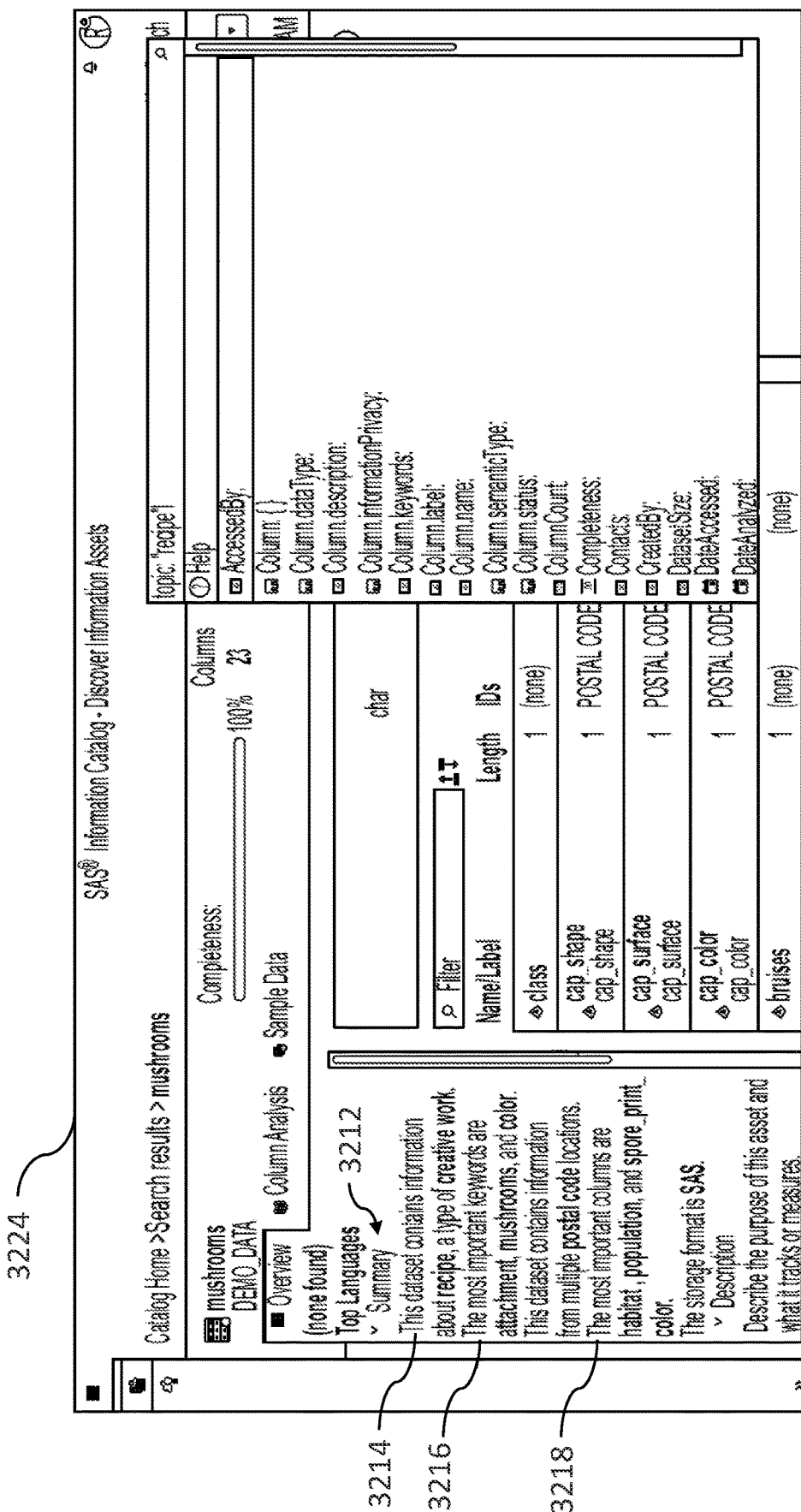

At least one technical advantage of generating an automated summary artifact 2712, 2812, 3212, 3312, 3412 for a target corpus of taxonomy-labeled structured datasets may accelerate a user's understanding or knowledge of the target corpus without requiring the user to manually inspect or investigate data samples (e.g., data records) underpinning the target corpus of taxonomy-labeled structured datasets. Stated another way, an automated summary artifact 2712, 2812, 3212, 3312, 3412 computed or generated for a target corpus of one or more taxonomy-labeled structured datasets may provide an intelligent overview or summary of the scope of the data included within the target corpus of the one or more taxonomy-labeled structured datasets, as shown generally by way of example in FIG. 32 and FIG. 33.

In a first implementation, one or more processors of process 2340 may function to automatically generate an automated summary artifact 2712, 2812, 3212, 3312, 3412 for a target corpus of taxonomy-labeled structured datasets based on the system or service receiving (or detecting) a user input selecting at least one dataset representation displayed on the search results user interface 2608, 2708, 3008, 3408 that corresponds to the target corpus of taxonomy-labeled structured datasets as described above.

In a second implementation, one or more processors of process 2340 may function to automatically generate an automated summary artifact 2712, 2812, 3212, 3312, 3412 for a target corpus of taxonomy-labeled structured datasets contemporaneously with the execution of a taxonomy-token informed search operation.

It shall be noted that, a natural language generation template or precis template, as generally referred to herein, may include one or more prefabricated components or sections designed for slot filling that, when generated, provides a textual overview for a target corpus of taxonomy-labeled structured datasets (e.g., a target corpus of one or more taxonomy-labeled structured datasets).

Taxonomy Classification Component of a Precis Template

In one or more embodiments, one or more processors of process 2340 may function to source a natural language generation template that may include a taxonomy (or topic) classification component. In such embodiments, the taxonomy (or topic) classification component 2714, 2814, 3214, 3314, 3414 may include one or more prefabricated sentences that, when generated, provides a textual overview of the taxonomy classification labels attributed to a target corpus of taxonomy-labeled structured datasets that may be of a user focus, as shown generally by way of example in FIG. 27 and FIG. 28. In a non-limiting example, the one or more prefabricated sentences of the taxonomy classification component 2714, 2814, 3214, 3314, 3414 may include one or more slots configured for slot filling, such as "the dataset contains information about [Taxonomy Hyponym Label], a type of [Taxonomy Hypernym Label]." The slots [Taxonomy Hyponym Label] and [Taxonomy Hypernym Label] may be sourced, collected, and/or extracted from hierarchical taxonomy metadata associated with the target corpus of taxonomy-labeled structured datasets to which the automated summary corresponds.

Accordingly, in response to extracting a hierarchal taxonomy label pair (e.g., a taxonomy hyponym label and taxonym hypernym label) from taxonomy metadata associated with the target corpus of taxonomy-labeled structured datasets, one or more processors of process 2340 may function to interleave each distinct taxonomy classification label of the hierarchal taxonomy label pair into a corresponding slot of the taxonomy (or topic) classification component 2714, 2814, 3214, 3314, 3414 of the natural language generation template (e.g., the dataset contains information about visual artwork, a type of creative work).

Explainable Taxonomy Classification Component of a Precis Template

Additionally, or alternatively, in one or more embodiments, one or more processors of process 2340 may function to source a natural language generation template that may include an explainable taxonomy classification component. In such embodiments, the explainable taxonomy classification component 2716, 2816, 3216, 3316, 3416 may include one or more prefabricated sentences that, when generated, provides a taxonomy classification rationale underpinning the taxonomy classification component, as shown generally by way of example in FIG. 27 and FIG. 28. In a non-limiting example, the one or more prefabricated sentences of the explainable taxonomy classification component 2716, 2816, 3216, 3316, 3416 may include one or more slots configured for slot filling, such as "the most important keywords are [Slot 1], [Slot 2], and [Slot 3]." The slots [Slot 1], [Slot 2], and [Slot 3] may be filled to include the dominant features (e.g., dominant keywords, phrases, etc.) that contributed to machine learning-based taxonomy classification of the subject data corpus.

That is, in one or more embodiments, based on identifying the salient features that contributed to a machine learning-based taxonomy classification of the subject data corpus, one or more processors of process 2340 may function to interleave a predetermined number of features (e.g., top three (3), top five (5), top ten (10) or any suitable number) into respective, distinct slots of the explainable taxonomy classification component 2716, 2816, 3216, 3316, 3416 of the natural language generation template (e.g., the most important keywords are description, boro, and catalog).

Additionally, or alternatively, in one or more embodiments, one or more processors of process 2340 may function to identify a predetermined number of probative terms or phrases (e.g., top three (3), top five (5), top ten (10) or any suitable number) and interleave the predetermined number of probative terms or phrases into one or more distinct slots of the explainable taxonomy classification component 2716, 2816, 3216, 3316, 3416 of the natural language generation template. In such embodiments, the predetermined number of probative terms or phrases may be obtained and/or identified based on identifying the terms and/or phrases included in a target or subject dataset that are proximal (e.g., closest) to a centroid of a target taxonomy corresponding to the subject or target dataset.

Intelligent Dataset Structure Component

Additionally, or alternatively, in one or more embodiments, one or more processors of process 2340 may function to source a natural language generation template that may include an intelligent dataset structure component. In such embodiments, the intelligent dataset structure component 2718, 2818, 3218, 3418 may include one or more prefabricated sentences that, when generated, provides an intelligent summary of database fields (e.g., database columns) within the target corpus of taxonomy-labeled structured datasets that is predicted to have a high or likely correlation with one or more other database fields (e.g., database columns) that exceeds a threshold correlation value, as shown generally by way of example in FIG. 27 and FIG. 28. In a non-limiting example, the one or more prefabricated sentences of the dataset structure intelligence component 2718, 2818, 3218, 3418 may include one or more slots configured for slot filling, such as "the most important columns are [Slot 1], [Slot 2], and [Slot 3]."

Accordingly, based on executing a data structure information value algorithm or the like, one or more processors of process 2340 may function to interleave a predetermined number of highly-correlated columns (e.g., top three (3), top five (5), top ten (10) or any suitable number) outputted from the data structure information value algorithm into the corresponding slots of the intelligent dataset structure component 2718, 2818, 3218, 3418 of the natural language generation template (e.g., the most important columns are phone, score, and building).

Additionally, or alternatively, in one or more embodiments, one or more processors of process 2340 may function to identify a predetermined number of highly-correlated columns (e.g., top three (3), top five (5), top ten (10) or any suitable number) and interleave the predetermined number of highly-correlated columns into one or more distinct slots of the intelligent dataset structure component 2718, 2818, 3218, 3418 of the natural language generation template. In such embodiments, the predetermined number of highly-correlated columns may be obtained and/or identified based on identifying the column headers or column identifiers in a target or subject dataset that are proximal (e.g., closest) to a centroid of a target taxonomy corresponding to the subject or target dataset.

Dataset Time Span Component

Additionally, or alternatively, in one or more embodiments, one or more processors of process 2340 may function to source a natural language generation template that may include a dataset time span component 2720, 2820. In such embodiments, the dataset time span component 2720, 2820 may include one or more prefabricated sentences that, when generated, provides an intelligent summary of data records or data samples included within the target corpus of taxonomy-labeled structured datasets with respect to time, as shown generally by way of example in FIG. 27 and FIG. 28. In a non-limiting example, the one or more prefabricated sentences of the dataset structure intelligence component 2720, 2820 may include one or more slots configured for slot filling, such as "the data was collected between [First Data Entry Occurrence] and [Last Data Entry Occurrence]."

Accordingly, based on executing a data record time extraction algorithm or the like, one or more processors of process 2340 may function to interleave the time value corresponding to the initial or first data record entry and the time value corresponding to the latest or most recent data record entry of the target corpus of taxonomy-labeled structured datasets that may have been outputted from the data record time extraction algorithm into corresponding slots of the dataset time span component 2720, 2820 of the natural language generation template (e.g., the data was collected between Sep. 26, 2013 and Dec. 6, 2017).

Sensitive Data Information Component

Additionally, or alternatively, in one or more embodiments, one or more processors of process 2340 may function to source a natural language generation template that may include a sensitive data information component 2722 (e.g., personally identifiable information component). In such embodiments, the sensitive data information component 2722 may include one or more prefabricated sentences that, when generated, provides an indication of whether the data samples (e.g., data records) included within a target corpus of one or more taxonomy-labeled structured datasets may be of sensitive data or personally identifiable information (PII), as shown generally by way of example in FIG. 27.

In a first implementation, based on or in response to determining at a database field level (e.g., database column level) that one or more column headers of a subject corpus of taxonomy-labeled structured datasets may be associated with sensitive data or personally identifiable information, one or more processors of process 2340 may function to generate an automated summary artifact 2712, 2812, 3212, 3312, 3412 that includes a sensitive data information component 2722 (e.g., the data has values that could be considered private). For instance, in a non-limiting example, one of the column headers of a subject corpus of taxonomy-labeled structured datasets may be entitled "driver license" and, based on one or more processors of process 2340 determining that the column header entitled "driver license" may relate to data values of a sensitive or personally identifiable information type, the one or more processors of process 2340 may function to generate an automated summary artifact 2712, 2812, 3212, 3312, 3412 (for the subject corpus of taxonomy-labeled structured datasets) that includes the sensitive data information component 2722 (e.g., the data has values that could be considered private). It shall be noted that if the database fields (e.g., column headers) are not detected to relate to sensitive or personally identifiable information, one or more processors of process 2340 may function to generate an automated summary artifact 2712, 2812, 3212, 3312, 3412 for the target corpus of taxonomy-labeled structure datasets that excludes the sensitive data information component 2722.

In a second implementation, based on or in response to determining that at a data record level that one or more data values of the target corpus of taxonomy-labeled structured datasets may be in a structure (or form) that conforms or maps to a structure of a likely sensitive data type or personally identifiable type, one or more processors of process 2340 may function to generate an automated summary artifact 2712, 2812, 3212, 3312, 3412 that includes a sensitive data information component 2722 (e.g., the data has values that could be considered private). For instance, in a non-limiting example, one of the data values of the target corpus of taxonomy-labeled structured datasets may be in the form "###-##-####" and, the system or service implementing the method 1400, the method 1800, and/or the method 2300 may determine the data value may relate to social security-type data. Accordingly, in such embodiments, one or more processors of process 2340 may function to generate an automated summary artifact 2712, 2812, 3212, 3312, 3412 (for the target corpus of taxonomy-labeled structured datasets) that includes the sensitive data information component 2722. It shall be noted that if the data values are not detected to relate to sensitive or personally identifiable information, one or more processors of process 2340 may function to generate an automated summary artifact 2712, 2812, 3212, 3312, 3412 for the target corpus of taxonomy-labeled structure datasets that excludes or does not include the sensitive data information component 2722.

In a third implementation, one or more processors of process 2340 may function to evaluate the hierarchal metadata attributed to a target corpus of taxonomy-labeled structured datasets against a subscriber data governance policy to identify whether one or more taxonomy-labeled structured datasets of the target corpus includes sensitive data based on the evaluation of the subscriber data governance policy. In one or more embodiments of the third implementation, sensitive data may relate to data that is within a purview of access restrictions as defined by a subscriber of a subscriber data governance policy. Accordingly, if one or more taxonomy-labeled structured datasets satisfy sensitive data criteria of the subscriber data governance policy, one or more processors of process 2340 may function to automatically indicate, via the web-accessible GUI, the one or more labeled structured datasets as including sensitive data in analogous ways as described above.

It shall be recognized that, in one or more embodiments, the automated summary artifact 2712, 2812, 3212, 3312, 3412 may be translated from a source language (e.g., English) into a target language (e.g., French, German, etc.).

It shall be further recognized that, in one or more embodiments, the identified labels (e.g., column headers, etc.) that may be inserted, populated, and/or filled into one or more of the above-mentioned slots may not be in a native language (e.g., English) of the system or service implementing the method 2300. In such embodiments, the identified labels that are not in the native language may be translated to the native language (e.g., English) and subsequently translated to a target language (e.g., French, German, etc.).

It shall be further recognized that, to bypass translating the automated summary artifact into a target language, the service or system implementing the method 2300 may function to implement one or more language-specific machine learning models that are trained on the target language. That is, in one or more embodiments, the one or more language-specific machine learning models may be used to identify slot values for any one of the above-mentioned slots.

Displaying a Dataset Summary Graphical User Interface for the Target Corpus of Taxonomy-Labeled Structured Datasets In one or more embodiments, the method 2300 may include process 2350. Process 2350, which may include displaying a dataset summary graphical user interface, may function to display a dataset summary graphical user interface for a target corpus of one or more taxonomy-labeled structure datasets. In one or more embodiments, the dataset summary graphical user interface may include a display of an automated summary artifact 2712, 2812, 3212, 3312, 3412 and/or a display of at least a subset of data records included in a target corpus of one or more taxonomy-labeled structure datasets to provide a capability of accelerating a data assessment, data maintenance, and/or data exploration of the target corpus of the one or more taxonomy-labeled structure datasets to which the dataset summary graphical user interface corresponds. One or more processors of process 2350 may function to generate and/or display, via a display generation component or the like, a dataset summary graphical user interface for a target corpus of taxonomy-labeled structured datasets in a variety of modes as described in more detail herein.

In one or more embodiments, an arrangement or layout of a dataset summary graphical user interface may include a plurality of distinct sections or regions that may collectively enable subscribers to accelerate a contextual understanding of the scope of data samples (e.g., data records) underpinning a target corpus of one or more taxonomy-labeled structure datasets (e.g., target corpus of taxonomy-labeled structured datasets).

Figure 27:
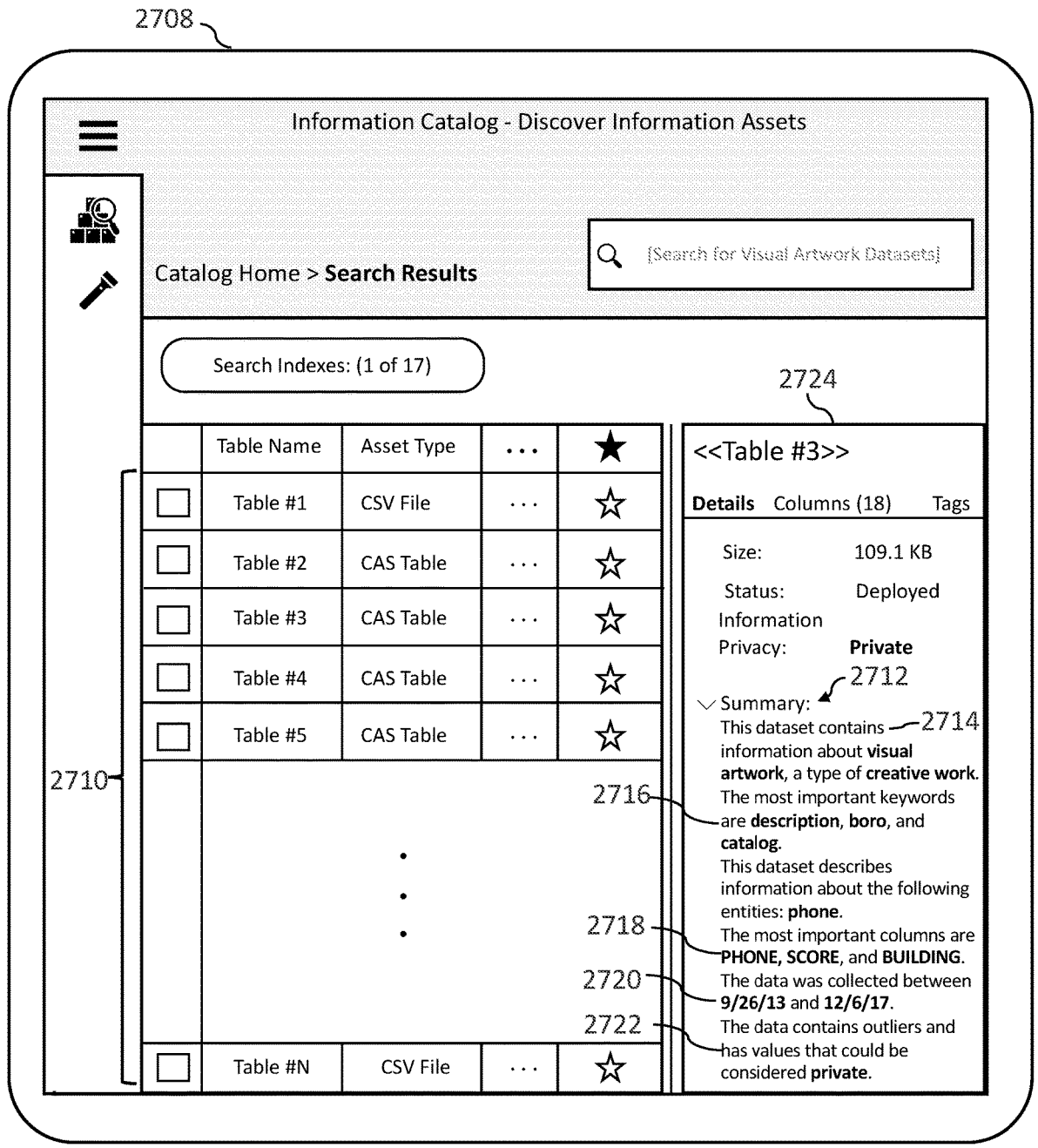
Figure 28:
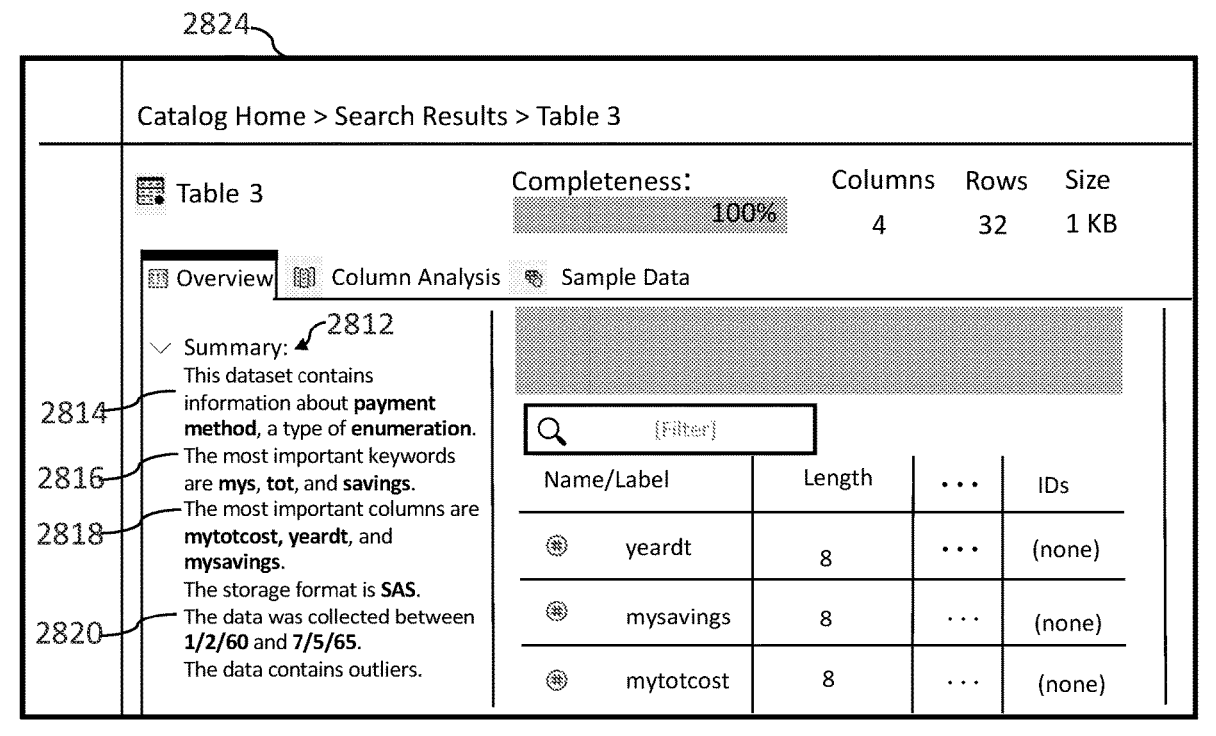

In one or more embodiments, one or more processors of process 2350 may function to display, via a display generation component or the like, a dataset summary graphical user interface 2724, 2824, 3224, 3324, 3424 for a target corpus of taxonomy-labeled structured datasets that may include multiple distinct sections, as shown generally by way of example in FIG. 27 and FIG. 28. In such non-limiting example, the dataset summary graphical user interface 2724, 2824, 3224, 3324, 3424 may include a first section that, when selected, may display information associated with an automated summary artifact of a target corpus of taxonomy-labeled structured datasets. Additionally, or alternatively, in such non-limiting example, the dataset summary graphical user interface 2724, 2824, 3224, 3324, 3424 may include a second section that, when selected, may display information (e.g., data samples, a subset of data samples, or the like) associated with the plurality of taxonomy-labeled structured datasets of the target corpus of taxonomy-labeled structure datasets.

In a first implementation, one or more processors of process 2350 may function to display, via a display generation component or the like, a dataset summary graphical user interface 2724, 2824, 3224, 3324, 3424 for a target corpus of taxonomy-labeled structured datasets in response to detecting an input from a user or the like selecting a dataset representation displayed on the search results graphical user interface 2608, 2708, 3008, 3408 associated with the target corpus of taxonomy-labeled structured datasets. In such implementation, the one or more processors of process 2350, via the display generation component, may function to display the dataset summary graphical user interface 2724, 2824, 3224, 3324, 3424 on at least a portion of the search results user interface 2608, 2708, 3008, 3408 where the input from the subscriber was detected. For instance, based on detecting the user input at the search results graphical user interface, one or more processors of process 2350 may function to concurrently and/or simultaneously display, via the display generation component, both the search results user interface 2608, 2708, 3008, 3408 and the dataset summary graphical user interface 2724, 2824, 3224, 3324, 3424, as shown generally by way of example in FIG. 27 and FIG. 34.

Figure 33:
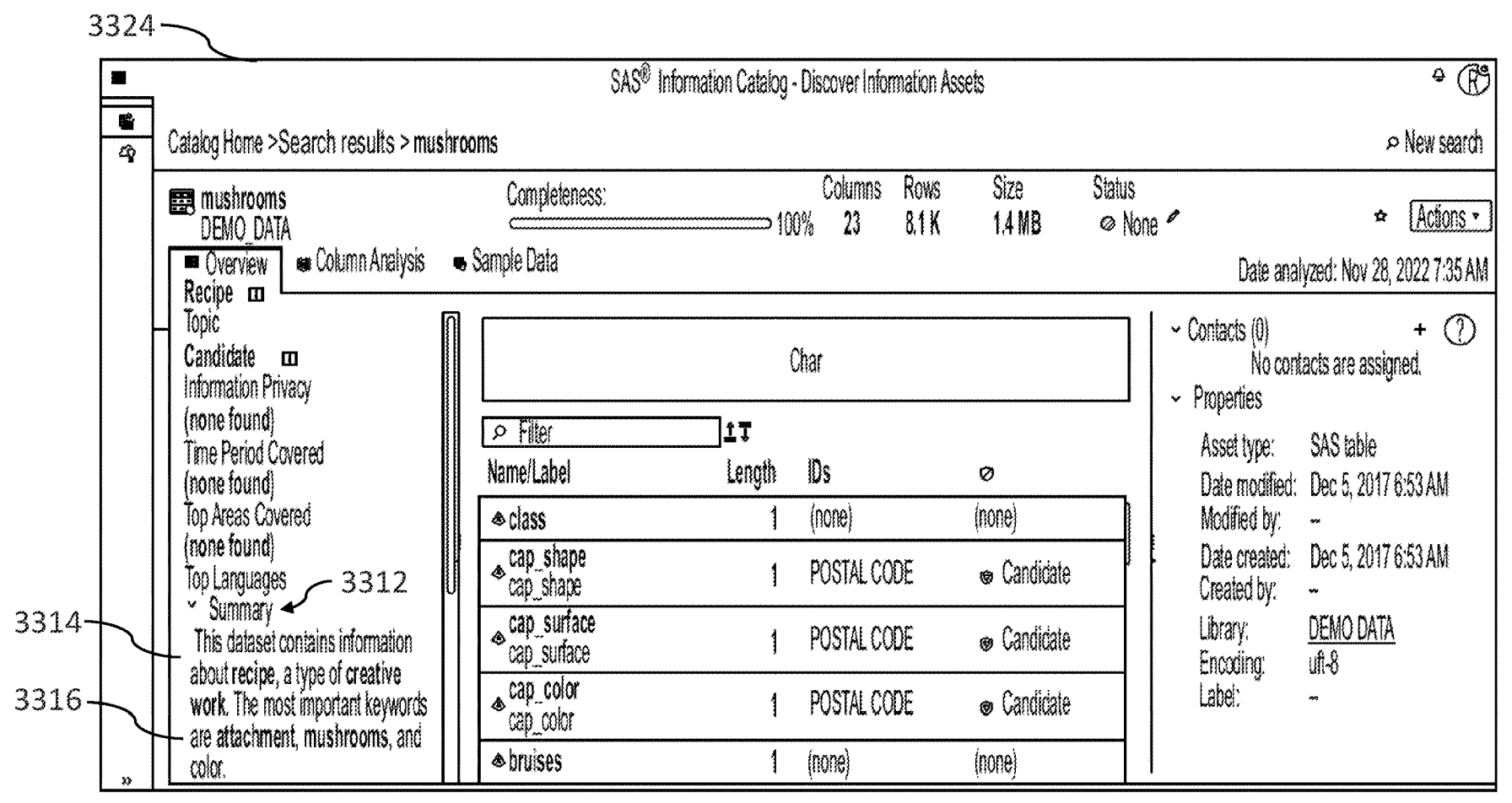

In a second implementation, in response to detecting an input from a user or the like selecting a dataset representation associated with a target corpus of taxonomy-labeled structured datasets that may be displayed on the search results graphical user interface 2608, 2708, 3008, 3408, one or more processors of process 2350 may function to display, via a display generation component or the like, the dataset summary graphical user interface 2724, 2824, 3224, 3324, 3424 on a user interface different from the search results user interface 2608, 2708, 3008, 3408, as shown generally by way of example in FIG. 28 and FIG. 33. In such implementation, the dataset summary graphical user interface 2724, 2824, 3224, 3324, 3424 may be displayed on any suitable user interface and at any position on those suitable user interfaces.

In one or more embodiments of the first implementation and/or the second implementation, the system or service implementing the method 2300 may function to display a dataset summary graphical user interface 2724, 2824, 3224, 3324, 3424 corresponding to a target corpus of taxonomy-labeled structured datasets as a response to a digital asset identification request 2506, 3106 (e.g., graphical user interface request or the like). In such embodiments, the response may include automatically populating the automated summary artifact 2712, 2812, 3212, 3312, 3412 (e.g., a computer-generated precis) for the target corpus of taxonomy-labeled structured datasets into a first distinct section of the dataset summary graphical user interface 2724, 2824, 3224, 3324, 3424 and automatically populating the plurality of taxonomy-labeled structured datasets (or a subset of data records for one or more of the plurality of taxonomy-labeled structured datasets based on a sampling) into a second distinct section of the dataset summary graphical user interface 2724, 2824, 3224, 3324, 3424.

Additionally, or optionally, in one or more embodiments of the first implementation or the second implementation, the system or service implementing the method 2300 may function to compute one or more taxonomy metrics for a target corpus of taxonomy-labeled structured datasets. In such embodiments, for each distinct hyponym label associated with the target corpus, the system or service may function to count a number of taxonomy-labeled structured datasets of the target corpus having an attribution of the distinct hyponym taxonomy label and display, via a display of a web-accessible graphical user interface (e.g., dataset summary graphical user interface 2724, 2824, 3224, 3324, 3424), each distinct hyponym taxonomy label associated with the target corpus associatively with a distinct count corresponding to the each distinct hyponym taxonomy label.

Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

The systems and methods of the preferred embodiments may be implemented on an integrated data analytics software application and/or software architecture such as that are offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A computer-program product embodied in a non-transitory machine-readable storage medium storing computer instructions that, when executed by one or more processors, perform operations comprising:
    obtaining, via a graphical user interface (GUI) of a computer system, a GUI request for one or more taxonomy-labeled structured datasets;
    extracting, from the GUI request, one or more taxonomy tokens;
    defining a taxonomy token-informed search operation based on the one or more taxonomy tokens;
    executing, by one or more processors based on a token vectorization model, the taxonomy token-informed search operation for searching a database comprising a plurality of distinct corpora of labeled structured datasets, wherein each distinct corpus of the plurality of distinct corpora of labeled structured datasets includes a grouping of taxonomy-labeled structured datasets having an attribution of distinct hierarchical taxonomy metadata, and wherein the executing the taxonomy token-informed search operation includes:
        evaluating the one or more taxonomy tokens of the GUI request against a distinct dataset of taxonomy tokens attributed to said each distinct corpus of the plurality of distinct corpora of labeled structured datasets, and identifying taxonomy token matches including one or more exact matches or one or more semantic matches between the evaluated one or more taxonomy tokens of the GUI request and the distinct dataset of taxonomy tokens attributed to said each distinct corpus of the plurality of distinct corpora of labeled structured datasets;
    identifying a target corpus of taxonomy-labeled structured datasets of the plurality of distinct corpora of labeled structured datasets based on the execution of the taxonomy token-informed search operation and selecting a target corpus of taxonomy-labeled structured datasets having a subject distinct set of taxonomy tokens contributing to the taxonomy token matches;
    computing contemporaneously with the execution of taxonomy-token informed search operation, by the one or more processors, a summary artifact that is derived based on the distinct hierarchical taxonomy metadata attributed to the identified target corpus of taxonomy-labeled structured datasets, wherein the summary artifact includes slots of a precis template and a computer-generated precis derived based on content included in the identified target corpus of the taxonomy-labeled structured datasets; and
    returning, via a display of the GUI, a response to the GUI request that includes a plurality of taxonomy-labeled structured datasets from the target corpus of taxonomy-labeled structured datasets and the summary artifact based on the identification of the identified target corpus of taxonomy-labeled structured datasets and the computing of the summary artifact.

2. The computer-program product according to claim 1, wherein:
    executing the taxonomy token-informed search operation includes:
        computing, by a token vectorization model, an embeddings value for each taxonomy token of the one or more taxonomy tokens of the GUI request, wherein the token vectorization model comprises a word embeddings model that has been trained to produce embeddings values within a n-dimensional space informed at least by vocabulary associated with a target hierarchical taxonomy;
        evaluating the embeddings values for each taxonomy token of the one or more taxonomy tokens against embeddings values associated with each distinct corpus of the plurality of distinct corpora of labeled structured datasets; and
        identifying one or more exact matches or one or more semantic matches between the embeddings value for each taxonomy token of the one or more taxonomy tokens and the embedding values for each taxonomy token of the one or more taxonomy tokens; and
    identifying the target corpus of taxonomy-labeled structured datasets is further based on selecting the target corpus of taxonomy-labeled structured datasets having one or more embeddings values causing the one or more exact matches or the one or more semantic matches.

3. The computer-program product according to claim 2, further comprising computer instructions for performing operations including:
    sampling a subset of taxonomy-labeled structured datasets from the target corpus of taxonomy-labeled structured datasets based on the one or more exact matches or the one or more semantic matches, wherein the plurality of taxonomy-labeled structured datasets of the response comprises the subset of taxonomy-labeled structured datasets.

4. The computer-program product according to claim 2, further comprising computer instructions for performing operations including:

computing a taxonomy match metric value for each distinct corpus of the plurality of distinct corpora of labeled structured datasets based on the one or more exact matches or the one or more semantic matches for each distinct corpus of the plurality of distinct corpora of labeled structured datasets, wherein computing the taxonomy match metric value is based on a cumulative embeddings distance between the embeddings value for each taxonomy token of the one or more taxonomy tokens and the embedding values for each taxonomy token of the one or more taxonomy tokens; and prioritizing the plurality of distinct corpora of labeled structured datasets based on the taxonomy match metric value computed for each distinct corpus of the plurality of distinct corpora of labeled structured datasets, wherein returning, via the display of the web-accessible GUI, the response includes displaying each distinct corpus of the plurality of distinct corpora of labeled structured datasets in an arrangement informed by the prioritization.

5. The computer-program product according to claim 1, wherein defining the taxonomy token-informed search operation includes:

constructing a cosine similarity search using embeddings values of the one or more taxonomy tokens for performing search of the database, constructing a Boolean search using two or more taxonomy tokens extracted from the GUI request for performing the search of the database, or constructing a regular expression search using the one or more taxonomy tokens for performing the search of the database.

6. The computer-program product according to claim 1, further comprising computer instructions for performing operations including:

extracting, from the distinct hierarchical taxonomy metadata associated with the target corpus of taxonomy-labeled structured datasets, a hierarchical taxonomy label pair, wherein the hierarchical taxonomy label pair includes a taxonomy hypernym label and a taxonomy hyponym label attributed to the target corpus, wherein computing the summary artifact includes interleaving into two or more slots of a precis template of the hierarchical taxonomy label pair including filling a first slot of the two or more slots with the taxonomy hyponym label and filling a second slot of the two or more slots with the taxonomy hypernym label.

7. The computer-program product according to claim 1 further comprising computer instructions for performing operations including:

computing taxonomy metrics for the target corpus of taxonomy-labeled structured datasets, wherein computing the taxonomy metrics includes computing, for each distinct hyponym taxonomy label associated with the target corpus, a count of a number of taxonomy-labeled structured datasets having an attribution of a target hyponym taxonomy label, wherein returning, via the display of the web-accessible GUI, includes outputting each distinct hyponym taxonomy label associated with the target corpus associatively with the count of the number of taxonomy-labeled structured datasets having the each distinct hyponym taxonomy label.

8. The computer-program product according to claim 1, further comprising computer instructions for performing operations including:

evaluating the distinct hierarchical metadata attributed to the target corpus of taxonomy-labeled structured datasets against a subscriber data governance policy; and identifying whether one or more taxonomy-labeled structured datasets of the target corpus includes sensitive data based on the evaluation of the subscriber data governance policy, wherein sensitive data relates to data that is within a purview of access restrictions as defined by a subscriber associated with the subscriber data governance policy, wherein if the one or more taxonomy-labeled structured datasets satisfy sensitive data criteria of the subscriber data governance policy, automatically indicating, via the GUI, the one or more labeled structured datasets as including sensitive data.

9. The computer-program product according to claim 1, wherein:

the display of the GUI includes multiple distinct sections including a first section dedicated to automated summary artifact and a second section dedicated to the plurality of taxonomy-labeled structured datasets, and returning, via the display of the GUI, the response includes:

automatically populating the computer-generated precis to the first section of the display of the GUI, and automatically populating the plurality of taxonomy-labeled structured datasets to the second section of the display of the GUI.

10. A computer-implemented method comprising:

obtaining, via a graphical user interface (GUI) of a computer system, a GUI request for one or more taxonomy-labeled structured datasets;

extracting, from the GUI request, one or more taxonomy tokens;

defining a taxonomy token-informed search operation based on the one or more taxonomy tokens;

executing, by one or more processors based on a token vectorization model, the taxonomy token-informed search operation for searching a database comprising a plurality of distinct corpora of labeled structured datasets, wherein each distinct corpus of the plurality of distinct corpora of labeled structured datasets includes a grouping of taxonomy-labeled structured datasets having an attribution of distinct hierarchical taxonomy metadata, and wherein the executing the taxonomy token-informed search operation includes:

evaluating the one or more taxonomy tokens of the GUI request against a distinct dataset of taxonomy tokens attributed to said each distinct corpus of the plurality of distinct corpora of labeled structured datasets, and identifying taxonomy token matches including one or more exact matches or one or more semantic matches between the evaluated one or more taxonomy tokens of the GUI request and the distinct dataset of taxonomy tokens attributed to said each distinct corpus of the plurality of distinct corpora of labeled structured datasets;

identifying a target corpus of taxonomy-labeled structured datasets of the plurality of distinct corpora of labeled structured datasets based on the execution of the taxonomy token-informed search operation and selecting a target corpus of taxonomy-labeled structured datasets having a subject distinct set of taxonomy tokens contributing to the taxonomy token matches;

computing contemporaneously with the execution of taxonomy-token informed search operation, by the one or more processors, a summary artifact that is derived based on the distinct hierarchical taxonomy metadata attributed to the identified target corpus of taxonomy-labeled structured datasets, wherein the summary artifact includes slots of a precis template and a computer-generated precis derived based on content included in the identified target corpus of the taxonomy-labeled structured datasets; and returning, via a display of the GUI, a response to the GUI request that includes a plurality of taxonomy-labeled structured datasets from the target corpus of taxonomy-labeled structured datasets and the summary artifact based on the identification of the identified target corpus of taxonomy-labeled structured datasets and the computing of the summary artifact.

11. The computer-implemented method according to claim 10, wherein:

executing the taxonomy token-informed search operation includes:

computing, by a token vectorization model, an embeddings value for each taxonomy token of the one or more taxonomy tokens of the GUI request, wherein the token vectorization model comprises a word embeddings model that has been trained to produce embeddings values within a n-dimensional space informed at least by vocabulary associated with a target hierarchical taxonomy;

evaluating the embeddings values for each taxonomy token of the one or more taxonomy tokens against embeddings values associated with each distinct corpus of the plurality of distinct corpora of labeled structured datasets; and identifying one or more exact matches or one or more semantic matches between the embeddings value for each taxonomy token of the one or more taxonomy tokens and the embedding values for each taxonomy token of the one or more taxonomy tokens; and identifying the target corpus of taxonomy-labeled structured datasets is further based on selecting the target corpus of taxonomy-labeled structured datasets having one or more embeddings values causing the one or more exact matches or the one or more semantic matches.

12. The computer-implemented method according to claim 11, further comprising:

sampling a subset of taxonomy-labeled structured datasets from the target corpus of taxonomy-labeled structured datasets based on the one or more exact matches or the one or more semantic matches, wherein the plurality of taxonomy-labeled structured datasets of the response comprises the subset of taxonomy-labeled structured datasets.

13. The computer-implemented method according to claim 11, further comprising:

computing a taxonomy match metric value for each distinct corpus of the plurality of distinct corpora of labeled structured datasets based on the one or more exact matches or the one or more semantic matches for each distinct corpus of the plurality of distinct corpora of labeled structured datasets, wherein computing the taxonomy match metric value is based on a cumulative embeddings distance between the embeddings value for each taxonomy token of the one or more taxonomy tokens and the embedding values for each taxonomy token of the one or more taxonomy tokens; and prioritizing the plurality of distinct corpora of labeled structured datasets based on the taxonomy match metric value computed for each distinct corpus of the plurality of distinct corpora of labeled structured datasets, wherein returning, via the display of the web-accessible GUI, the response includes displaying each distinct corpus of the plurality of distinct corpora of labeled structured datasets in an arrangement informed by the prioritization.

14. The computer-implemented method according to claim 10, wherein defining the taxonomy token-informed search operation includes:

constructing a cosine similarity search using embeddings values of the one or more taxonomy tokens for performing the search of the database, constructing a Boolean search using two or more taxonomy tokens extracted from the GUI request for performing the search of the database, or constructing a regular expression search using the one or more taxonomy tokens for performing the search of the database.

15. The computer-implemented method according to claim 10 further comprising:

extracting, from the distinct hierarchical taxonomy metadata associated with the target corpus of taxonomy-labeled structured datasets, a hierarchical taxonomy label pair, wherein the hierarchical taxonomy label pair includes a taxonomy hypernym label and a taxonomy hyponym label attributed to the target corpus, wherein computing the summary artifact includes interleaving into two or more slots of a precis template of the hierarchical taxonomy label pair including filling a first slot of the two or more slots with the taxonomy hyponym label and filling a second slot of the two or more slots with the taxonomy hypernym label.

16. The computer-implemented method according to claim 10 further comprising:

computing taxonomy metrics for the target corpus of taxonomy-labeled structured datasets, wherein computing the taxonomy metrics includes computing, for each distinct hyponym taxonomy label associated with the target corpus, a count of a number of taxonomy-labeled structured datasets having an attribution of a target hyponym taxonomy label, wherein returning, via the display of the web-accessible GUI, includes outputting each distinct hyponym taxonomy label associated with the target corpus associatively with the count of the number of taxonomy-labeled structured datasets having the distinct hyponym taxonomy label.

17. The computer-implemented method according to claim 10 further comprising:

evaluating the distinct hierarchical metadata attributed to the target corpus of taxonomy-labeled structured datasets against a subscriber data governance policy; and identifying whether one or more taxonomy-labeled structured datasets of the target corpus includes sensitive data based on the evaluation of the subscriber data governance policy, wherein sensitive data relates to data that is within a purview of access restrictions as defined by a subscriber associated with the subscriber data governance policy, wherein if the one or more taxonomy-labeled structured datasets satisfy sensitive data criteria of the subscriber data governance policy, automatically indicating, via the GUI, the one or more labeled structured datasets as including sensitive data.

18. The computer-implemented method according to claim 10, wherein:
the display of the GUI includes multiple distinct sections including a first section dedicated to automated summary artifact and a second section dedicated to the plurality of taxonomy-labeled structured datasets, and
returning, via the display of the GUI, the response includes:
automatically populating the computer-generated precis to the first section of the display of the GUI, and
automatically populating the plurality of taxonomy-labeled structured datasets to the second section of the display of the GUI.

19. A computer-implemented system comprising:
one or more processors;
a computer-readable medium operably coupled to the one or more processors, the computer-readable medium having computer-readable instructions stored thereon that, when executed by the one or more processors, cause a computing device to perform operations comprising:
obtaining, via a graphical user interface (GUI) of a computer system, a GUI request for one or more taxonomy-labeled structured datasets;
extracting, from the GUI request, one or more taxonomy tokens;
defining a taxonomy token-informed search operation based on the one or more taxonomy tokens;
executing, by one or more processors based on a token vectorization model, the taxonomy token-informed search operation for searching a database comprising a plurality of distinct corpora of labeled structured datasets, wherein each distinct corpus of the plurality of distinct corpora of labeled structured datasets includes a grouping of taxonomy-labeled structured datasets having an attribution of distinct hierarchical taxonomy metadata, and wherein the executing the taxonomy token-informed search operation includes:
evaluating the one or more taxonomy tokens of the GUI request against a distinct dataset of taxonomy tokens attributed to said each distinct corpus of the plurality of distinct corpora of labeled structured datasets, and
identifying taxonomy token matches including one or more exact matches or one or more semantic matches between the evaluated one or more taxonomy tokens of the GUI request and the distinct dataset of taxonomy tokens attributed to said each distinct corpus of the plurality of distinct corpora of labeled structured datasets;
identifying a target corpus of taxonomy-labeled structured datasets of the plurality of distinct corpora of labeled structured datasets based on the execution of the taxonomy token-informed search operation and selecting a target corpus of taxonomy-labeled structured datasets having a subject distinct set of taxonomy tokens contributing to the taxonomy token matches;
computing contemporaneously with the execution of taxonomy-token informed search operation, by the one or more processors, a summary artifact that is derived based on the distinct hierarchical taxonomy metadata attributed to the identified target corpus of taxonomy-labeled structured datasets, wherein the summary artifact includes slots of a precis template and a computer-generated precis derived based on content included in the identified target corpus of the taxonomy-labeled structured datasets; and
returning, via a display of the GUI, a response to the GUI request that includes a plurality of taxonomy-labeled structured datasets from the target corpus of taxonomy-labeled structured datasets and the summary artifact based on the identification of the identified target corpus of taxonomy-labeled structured datasets and the computing of the summary artifact.

20. The computer-implemented system according to claim 19, wherein:
executing the taxonomy token-informed search operation includes:
computing, by a token vectorization model, an embeddings value for each taxonomy token of the one or more taxonomy tokens of the GUI request, wherein the token vectorization model comprises a word embeddings model that has been trained to produce embeddings values within a n-dimensional space informed at least by vocabulary associated with a target hierarchical taxonomy;
evaluating the embeddings values for each taxonomy token of the one or more taxonomy tokens against embeddings values associated with each distinct corpus of the plurality of distinct corpora of labeled structured datasets; and
identifying one or more exact matches or one or more semantic matches between the embeddings value for each taxonomy token of the one or more taxonomy tokens and the embedding values for each taxonomy token of the one or more taxonomy tokens; and
identifying the target corpus of taxonomy-labeled structured datasets is further based on selecting the target corpus of taxonomy-labeled structured datasets having one or more embeddings values causing the one or more exact matches or the one or more semantic matches.

21. The computer-implemented system according to claim 20, the computer-readable medium further comprising computer-readable instructions that, when executed by the one or more processors, perform operations comprising:
sampling a subset of taxonomy-labeled structured datasets from the target corpus of taxonomy-labeled structured datasets based on the one or more exact matches or the one or more semantic matches, wherein the plurality of taxonomy-labeled structured datasets of the response comprises the subset of taxonomy-labeled structured datasets.

22. The computer-implemented system according to claim 20, the computer-readable medium further comprising computer-readable instructions that, when executed by the one or more processors, perform operations comprising:
computing a taxonomy match metric value for each distinct corpus of the plurality of distinct corpora of labeled structured datasets based on the one or more exact matches or the one or more semantic matches for each distinct corpus of the plurality of distinct corpora of labeled structured datasets, wherein computing the taxonomy match metric value is based on a cumulative embeddings distance between the embeddings value for each taxonomy token of the one or more taxonomy tokens and the embedding values for each taxonomy token of the one or more taxonomy tokens; and
prioritizing the plurality of distinct corpora of labeled structured datasets based on the taxonomy match metric value computed for each distinct corpus of the plurality of distinct corpora of labeled structured datasets, wherein returning, via the display of the web-accessible GUI, the response includes displaying each distinct corpus of the plurality of distinct corpora of labeled structured datasets in an arrangement informed by the prioritization.

23. The computer-implemented system according to claim 19, wherein defining the taxonomy token-informed search operation includes:

constructing a cosine similarity search using embeddings values of the one or more taxonomy tokens for performing search of the database, constructing a Boolean search using two or more taxonomy tokens extracted from the GUI request for performing the search of the database, or constructing a regular expression search using the one or more taxonomy tokens for performing the search of the database.

24. The computer-implemented system according to claim 19, the computer-readable medium further comprising computer-readable instructions that, when executed by the one or more processors, perform operations comprising:

extracting, from the distinct hierarchical taxonomy metadata associated with the target corpus of taxonomy-labeled structured datasets, a hierarchical taxonomy label pair, wherein the hierarchical taxonomy label pair includes a taxonomy hypernym label and a taxonomy hyponym label attributed to the target corpus, wherein computing the summary artifact includes interleaving into two or more slots of a precis template of the hierarchical taxonomy label pair including filling a first slot of the two or more slots with the taxonomy hyponym label and filling a second slot of the two or more slots with the taxonomy hypernym label.

25. The computer-implemented system according to claim 19, the computer-readable medium further comprising computer-readable instructions that, when executed by the one or more processors, perform operations comprising:

computing taxonomy metrics for the target corpus of taxonomy-labeled structured datasets, wherein computing the taxonomy metrics includes computing, for each distinct hyponym taxonomy label associated with the target corpus, a count of a number of taxonomy-labeled structured datasets having an attribution of a target hyponym taxonomy label, wherein returning, via the display of the web-accessible GUI, includes outputting each distinct hyponym taxonomy label associated with the target corpus associatively with the count of the number of taxonomy-labeled structured datasets having the distinct hyponym taxonomy label.

26. The computer-implemented system according to claim 19, the computer-readable medium further comprising computer-readable instructions that, when executed by the one or more processors, perform operations comprising:

evaluating the distinct hierarchical metadata attributed to the target corpus of taxonomy-labeled structured datasets against a subscriber data governance policy; and identifying whether one or more taxonomy-labeled structured datasets of the target corpus includes sensitive data based on the evaluation of the subscriber data governance policy, wherein sensitive data relates to data that is within a purview of access restrictions as defined by a subscriber associated with the subscriber data governance policy, wherein if the one or more taxonomy-labeled structured datasets satisfy sensitive data criteria of the subscriber data governance policy, automatically indicating, via the GUI, the one or more labeled structured datasets as including sensitive data.

27. The computer-implemented system according to claim 19, wherein:

the display of the GUI includes multiple distinct sections including a first section dedicated to automated summary artifact and a second section dedicated to the plurality of taxonomy-labeled structured datasets, and returning, via the display of the GUI, the response includes:

automatically populating the computer-generated precis to the first section of the display of the GUI, and automatically populating the plurality of taxonomy-labeled structured datasets to the second section of the display of the GUI.

* * * * *